(12) United States Patent
Lee et al.

(10) Patent No.: US 11,140,018 B2
(45) Date of Patent: Oct. 5, 2021

(54) METHOD AND APPARATUS FOR INTRA-SYMBOL MULTI-DIMENSIONAL MODULATION

(71) Applicant: Quantumsine Acquisitions Inc., Grand Cayman (KY)

(72) Inventors: Arthur E. Lee, Round Rock, TX (US); Francis Onochie, Austin, TX (US); Sina Rafati, Austin, TX (US); Jeffrey Stuart Koonce, Kyle, TX (US); Wei Ming Lim, Singapore (SG); Michael Tembeck, Wettenberg (DE); Jan C. Brandberg, Vellinge (SE); Caroline Brandberg, Vellinge (SE)

(73) Assignee: QuantumSine Acquisitions Inc., Grand Cayman (KY)

( * ) Notice: Subject to any disclaimer, the term of this patent is extended or adjusted under 35 U.S.C. 154(b) by 0 days.

(21) Appl. No.: 16/524,002

(22) Filed: Jul. 26, 2019

(65) Prior Publication Data

US 2020/0021476 A1 Jan. 16, 2020

Related U.S. Application Data

(63) Continuation-in-part of application No. 15/714,996, filed on Sep. 25, 2017, now Pat. No. 10,382,246, (Continued)

(51) Int. Cl.
*H04L 27/34* (2006.01)
*H04L 1/00* (2006.01)
*H04L 27/36* (2006.01)

(52) U.S. Cl.
CPC ........ *H04L 27/3405* (2013.01); *H04L 1/0041* (2013.01); *H04L 27/36* (2013.01)

(58) Field of Classification Search
None
See application file for complete search history.

(56) References Cited

U.S. PATENT DOCUMENTS

| 102,007 A | * | 4/1870 | Hull ............... B68B 11/00 231/2.1 |
| 102,013 A | * | 4/1870 | Kellogg et al. ......... B41B 1/08 101/374 |

(Continued)

FOREIGN PATENT DOCUMENTS

| AU | 2015204973 A1 * | 8/2016 | .......... H04L 27/345 |
| AU | 2018202397 A1 * | 4/2018 | .............. H03C 5/00 |

(Continued)

OTHER PUBLICATIONS

Australian Patent Office; Office Action for corresponding AU Serial No. 2015204973; dated Mar. 24, 2017; 3 pages; Phillip ACT; AU.

(Continued)

*Primary Examiner* — Berhanu Tadese
(74) *Attorney, Agent, or Firm* — Ross D. Snyder

(57) ABSTRACT

In accordance with at least one embodiment, a method, apparatus, and communication system provide intra-symbol multi-dimensional modulation (ISMM). A modulator can be provided modulate data according to ISMM for transmission. The modulator can include a dimensional mapper configured to receive transmit data to provide a plurality of outputs for a plurality of different dimensions; a plurality of dimensional modulators coupled to the dimension mapper, the plurality of dimensional modulators configured to receive the plurality of outputs and to provide a plurality of modulated outputs for the plurality of different dimensions, the plurality of dimensional modulators configured to convey data distributed among a plurality of discrete locations within a symbol; a combiner configured coupled to the plurality of dimensional modulators, the combiner config- (Continued)

US 11,140,018 B2

Page 2 ured to receive the plurality of modulated outputs, to combine the plurality of plurality of modulated outputs, and to provide a transmit signal; and a transmit filter.

17 Claims, 38 Drawing Sheets

Related U.S. Application Data which is a continuation-in-part of application No. 15/205,473, filed on Jul. 8, 2016, now Pat. No. 9,774,348, which is a continuation-in-part of application No. 14/574,577, filed on Dec. 18, 2014, now Pat. No. 9,407,203.

(60) Provisional application No. 61/924,304, filed on Jan. 7, 2014.

(56) References Cited

U.S. PATENT DOCUMENTS

| | | | | |
|---|---|---|---|---|
| 1,943,198 A * | 1/1934 | John | B21H 1/00 | 29/527.7 |
| 1,998,208 A * | 4/1935 | Abram | F16H 61/18 | 74/473.22 |
| 4,149,123 A * | 4/1979 | Richmond | H03G 3/00 | 327/175 |
| 4,605,902 A * | 8/1986 | Harrington | H01P 5/16 | 327/355 |
| 5,093,636 A * | 3/1992 | Higgins, Jr. | H03F 1/0294 | 332/100 |
| 5,142,552 A * | 8/1992 | Tzeng | H03H 17/06 | 375/232 |
| 5,159,607 A * | 10/1992 | Read | H04L 27/0008 | 375/130 |
| 5,225,795 A * | 7/1993 | Iinuma | H04L 27/2092 | 332/100 |
| 5,258,987 A * | 11/1993 | Wei | H04L 27/3433 | 714/758 |
| 5,329,551 A * | 7/1994 | Wei | H04L 27/3433 | 375/286 |
| 5,412,351 A * | 5/1995 | Nystrom | H03B 27/00 | 329/305 |
| 5,561,401 A * | 10/1996 | Mineo | H04L 27/2064 | 332/103 |
| 5,706,312 A * | 1/1998 | Wei | H03M 13/2936 | 375/298 |
| 5,767,750 A * | 6/1998 | Yamaji | H03C 1/00 | 332/103 |
| 5,805,242 A * | 9/1998 | Strolle | H04L 25/061 | 348/726 |
| 6,385,442 B1 * | 5/2002 | Vu | H03D 3/007 | 327/238 |
| 6,480,477 B1 * | 11/2002 | Treadaway | H04L 1/0003 | 370/314 |
| 7,046,740 B2 * | 5/2006 | Dowling | H04L 25/03343 | 375/260 |
| 7,046,741 B2 * | 5/2006 | Brown | H04L 27/00 | 375/268 |
| 7,054,375 B2 * | 5/2006 | Kannan | H04L 1/0025 | 375/260 |
| 7,173,957 B2 * | 2/2007 | Shakeri | G01S 19/29 | 342/357.27 |
| 7,245,886 B2 * | 7/2007 | Sorrells | H03C 1/62 | 455/115.1 |
| 7,340,012 B2 * | 3/2008 | Brown | H03J 1/005 | 375/268 |
| 7,352,821 B2 * | 4/2008 | Kannan | H04L 1/0025 | 375/260 |
| 7,469,027 B2 * | 12/2008 | Liu | H04N 21/438 | 375/355 |
| 7,630,456 B2 * | 12/2009 | Mogre | H03M 13/2909 | 370/252 |
| 7,773,693 B2 * | 8/2010 | Brobston | H03F 1/0294 | 375/298 |
| 7,941,091 B1 * | 5/2011 | Doherty | H04H 40/90 | 455/3.01 |
| 7,978,782 B2 * | 7/2011 | Rofougaran | H04L 27/361 | 375/271 |
| 8,009,605 B1 * | 8/2011 | Snodgrass | H04B 1/0007 | 370/318 |
| 8,044,744 B2 * | 10/2011 | Graham | H03K 7/00 | 332/112 |
| 8,068,547 B2 * | 11/2011 | Schenk | H04L 27/3416 | 375/260 |
| 8,254,514 B1 * | 8/2012 | Zhang | H03M 1/0836 | 375/355 |
| 8,508,309 B2 * | 8/2013 | McCune, Jr. | H03C 5/00 | 332/103 |
| 8,509,351 B1 * | 8/2013 | Khlat | H03C 5/00 | 375/302 |
| 8,751,910 B2 * | 6/2014 | Farhoodfar | H03M 13/2707 | 714/782 |
| 8,804,874 B2 * | 8/2014 | Wang | H04L 7/0331 | 375/302 |
| 9,385,905 B2 * | 7/2016 | Arambepola | H04L 1/0071 | |
| 9,397,702 B2 * | 7/2016 | Farhoodfar | H03M 13/2918 | |
| 9,407,203 B2 * | 8/2016 | Lee | H04L 27/04 | |
| 9,768,989 B2 * | 9/2017 | Lincoln | H04L 25/067 | |
| 9,774,348 B2 * | 9/2017 | Lee | H04L 27/04 | |
| 9,813,115 B2 * | 11/2017 | Frederick | H04B 5/0031 | |
| 10,149,179 B2 * | 12/2018 | Barsoum | H04L 1/0009 | |
| 10,382,246 B2 * | 8/2019 | Lee | H04L 27/362 | |
| 10,511,466 B2 * | 12/2019 | Loghin | H04B 17/336 | |
| 2002/0075949 A1 * | 6/2002 | Banerjea | H04L 5/023 | 375/222 |
| 2002/0085117 A1 * | 7/2002 | Harris | G06Q 30/02 | 348/473 |
| 2002/0085118 A1 * | 7/2002 | Harris | H04H 20/31 | 348/473 |
| 2002/0122499 A1 * | 9/2002 | Kannan | H04L 5/0044 | 375/260 |
| 2003/0016762 A1 * | 1/2003 | Martin | H04L 27/2007 | 375/308 |
| 2003/0169828 A1 * | 9/2003 | Roberts | H04L 27/0004 | 375/295 |
| 2004/0198257 A1 * | 10/2004 | Takano | H03G 3/3047 | 455/108 |
| 2004/0213351 A1 * | 10/2004 | Shattil | H04L 27/2614 | 375/260 |
| 2004/0235435 A1 * | 11/2004 | Barabash | H03F 1/0277 | 455/104 |
| 2004/0255758 A1 * | 12/2004 | Klefenz | G10H 1/00 | 84/603 |
| 2005/0074073 A1 * | 4/2005 | Yuan | H03C 1/36 | 375/268 |
| 2005/0110590 A1 * | 5/2005 | Korol | H03C 5/00 | 332/149 |
| 2005/0143028 A1 * | 6/2005 | Zheng | H03G 3/3052 | 455/127.1 |
| 2005/0207514 A1 * | 9/2005 | Hayashi | H04L 27/3872 | 375/326 |
| 2006/0105723 A1 * | 5/2006 | Anvari | H04B 1/0475 | 455/114.2 |
| 2006/0109925 A1 * | 5/2006 | Kannan | H04L 5/0044 | 375/260 |
| 2006/0160518 A1 * | 7/2006 | Seendripu | H03D 3/007 | 455/323 |
| 2006/0198468 A1 * | 9/2006 | Brown | H04L 27/24 | 375/320 |
| 2006/0274838 A1 * | 12/2006 | Feher | H04B 7/0602 | 375/259 |
| 2007/0015472 A1 * | 1/2007 | Murtojarvi | H04L 27/08 | 455/102 |
| 2007/0171714 A1 * | 7/2007 | Wu | G06F 11/1072 | 365/185.09 |

(56) References Cited

U.S. PATENT DOCUMENTS

| | | | |
|---|---|---|---|
| 2007/0290749 A1* | 12/2007 | Woo | H03F 1/0205 330/149 |
| 2008/0043884 A1* | 2/2008 | Zhu | H04L 25/03057 375/340 |
| 2008/0090531 A1* | 4/2008 | Jungerman | H04B 1/0475 455/126 |
| 2008/0096508 A1* | 4/2008 | Luff | H03D 7/1433 455/209 |
| 2008/0143562 A1* | 6/2008 | Huang | H04L 27/364 341/118 |
| 2008/0205549 A1* | 8/2008 | Rofougaran | H04L 27/3405 375/299 |
| 2008/0212656 A1* | 9/2008 | Feher | H04L 7/0008 375/150 |
| 2009/0174473 A1* | 7/2009 | Woo | H03F 1/3247 330/10 |
| 2010/0085101 A1* | 4/2010 | Walker | G08C 19/16 327/306 |
| 2010/0105341 A1* | 4/2010 | Chen | H03C 5/00 455/102 |
| 2010/0264996 A1* | 10/2010 | Chang | H03B 27/00 331/137 |
| 2011/0150130 A1* | 6/2011 | Kenington | H03F 3/24 375/296 |
| 2012/0057650 A1* | 3/2012 | Felix | H04B 1/707 375/296 |
| 2012/0266051 A1* | 10/2012 | Farhoodfar | H03M 13/2918 714/782 |
| 2012/0294388 A1* | 11/2012 | Choi | H03C 5/00 375/308 |
| 2012/0302192 A1* | 11/2012 | Seendripu | H03D 7/1475 455/314 |
| 2014/0035693 A1* | 2/2014 | Li | H03C 5/00 332/103 |
| 2014/0145787 A1* | 5/2014 | Verlinden | H03F 3/189 330/124 R |
| 2014/0237325 A1* | 8/2014 | Farhoodfar | H04L 1/0057 714/782 |
| 2014/0247803 A1* | 9/2014 | Arambepola | H04L 27/2608 370/330 |
| 2014/0334579 A1* | 11/2014 | Lincoln | H04L 25/067 375/346 |
| 2015/0194930 A1* | 7/2015 | Lee | H04L 27/04 332/103 |
| 2015/0270835 A1* | 9/2015 | Hati | H03C 5/00 332/146 |
| 2015/0280841 A1* | 10/2015 | Gudovskiy | H04L 27/0014 375/226 |
| 2016/0112225 A1* | 4/2016 | Slay | H04L 27/156 375/239 |
| 2016/0308558 A1* | 10/2016 | Farhoodfar | H03M 13/2906 |
| 2016/0344452 A1* | 11/2016 | Frederick | H04L 27/367 |
| 2017/0041020 A1* | 2/2017 | Lee | H04L 27/20 |
| 2018/0013469 A1* | 1/2018 | Frederick | H04B 5/0031 |
| 2018/0013603 A1* | 1/2018 | Lee | H04L 27/36 |
| 2018/0234285 A1* | 8/2018 | Djordjevic | H04B 10/70 |
| 2019/0007137 A1* | 1/2019 | Djordjevic | H04L 63/08 |
| 2019/0075002 A1* | 3/2019 | Loghin | H04L 27/0008 |
| 2019/0103942 A1* | 4/2019 | Wu | H04L 5/0048 |
| 2019/0215222 A1* | 7/2019 | Cheng | H04L 27/38 |
| 2019/0319743 A1* | 10/2019 | Wang | H04L 1/0003 |
| 2020/0021476 A1* | 1/2020 | Lee | H04L 1/0042 |

FOREIGN PATENT DOCUMENTS

| | | | | |
|---|---|---|---|---|
| BR | 112016015913 | A2 * | 6/2018 | H04L 27/345 |
| CA | 2935926 | A1 * | 7/2015 | H03C 99/00 |
| CN | 1943198 | | 4/2007 | |
| CN | 1998208 | | 7/2007 | |
| CN | 106165365 | A * | 11/2016 | H04L 27/04 |
| EP | 3092763 | A1 * | 11/2016 | H04L 27/04 |
| EP | 3092763 | A4 * | 9/2017 | H03C 5/00 |
| EP | 3092763 | B1 * | 3/2020 | H04L 27/20 |
| JP | 2008507157 | | 3/2008 | |
| KR | 10-2007-0009708 | | 1/2007 | |
| KR | 10-2013-0124192 | | 11/2013 | |
| KR | 20160107239 | A * | 9/2016 | H04L 27/20 |
| MX | 2016008870 | A * | 12/2016 | H04L 27/36 |
| MX | 361566 | B * | 12/2018 | H04L 27/36 |
| WO | 2002075949 | | 9/2002 | |
| WO | WO-2019060923 | A1 * | 3/2019 | H04L 27/34 |

OTHER PUBLICATIONS

Australian Patent Office; Office Action for corresponding AU Serial No. 2015204973; dated Mar. 23, 2018; 4 pages; Phillip ACT; AU.

Brazil Patent Office; Office Action for corresponding BR Serial No. 112016015916-6; dated Aug. 8, 2020; Rio de Janeiro; BR.

China Patent Office; Office Action for corresponding CN 201580012427.6; dated Sep. 26, 2018; Shanghai; CN.

China Patent Office; Office Action for corresponding CN 201580012427.6; dated Mar. 14, 2019; Shanghai; CN.

European Patent Office; Office Action for corresponding EP 15735414.3; dated Jul. 11, 2018, 5 pages; Munich; DE.

European Patent Office; Extended European Search Report for corresponding EP 15735414.3; dated Aug. 10, 2017, 10 pages; Munich; DE.

Japanese Patent Office; Office Action for corresponding CN 2016-562468; dated Dec. 5, 2018; 5 pages; Tokyo, JP.

Singapore Patent Office; Supplemental Search Report for corresponding SG 11201605496T; dated Jan. 28, 2019; 5 pages; SG.

United States International Searching Authority; International Search Report & Written Opinion for PCT/US2015/010104; 7 pages; dated Apr. 28, 2015; Alexandria, VA; US.

United States International Searching Authority; International Search Report & Written Opinion for PCT/US2018/052757; 11 pages; dated Dec. 13, 2018; Alexandria, VA; US.

\* cited by examiner (ATM Modulation)

(ATM Options for the Positive Cycle)

(ATM Options for the Negative Cycle)

(8 Bit Per Symbol ATM Signal)

(Channel Relationship)

(Creating the Qsine Complex Modulation Signal)

(QAM 256 Constellation)

(QAM 1024 Constellation)

| Dim # | INTRA-SYMBOL MULTI-DIMENSIONAL MODULATION DEFINITIONS | |
|---|---|---|
| | 0° ·········································· 360° | |
| 1 | DISTINCT VALUES AT DISCRETE POSITIONS WITHIN CARRIER CYCLE FOR DIMENSION 1 | |
| 2 | DISTINCT VALUES AT DISCRETE POSITIONS WITHIN CARRIER CYCLE FOR DIMENSION 2 | |
| 3 | DISTINCT VALUES AT DISCRETE POSITIONS WITHIN CARRIER CYCLE FOR DIMENSION 3 | |
| 4 | DISTINCT VALUES AT DISCRETE POSITIONS WITHIN CARRIER CYCLE FOR DIMENSION 4 | |
| 5 | DISTINCT VALUES AT DISCRETE POSITIONS WITHIN CARRIER CYCLE FOR DIMENSION 5 | |
| 6 | DISTINCT VALUES AT DISCRETE POSITIONS WITHIN CARRIER CYCLE FOR DIMENSION 6 | |
| 7 | DISTINCT VALUES AT DISCRETE POSITIONS WITHIN CARRIER CYCLE FOR DIMENSION 7 | |
| 8 | DISTINCT VALUES AT DISCRETE POSITIONS WITHIN CARRIER CYCLE FOR DIMENSION ... | |
| ... | | |
| n | DISTINCT VALUES AT DISCRETE POSITIONS WITHIN CARRIER CYCLE FOR DIMENSION n | |

| Dim # | Bit Value | INTRA-SYMBOL MULTI-DIMENSIONAL MODULATION DEFINITIONS 0° ··············· 360° |
|---|---|---|
| 1 | 1 | DISTINCT VALUES AT DISCRETE POSITIONS WITHIN CARRIER CYCLE FOR DIMENSION 1 |
| 2 | 0 | DISTINCT VALUES AT DISCRETE POSITIONS WITHIN CARRIER CYCLE FOR DIMENSION 1 |
| 3 | 1 | DISTINCT VALUES AT DISCRETE POSITIONS WITHIN CARRIER CYCLE FOR DIMENSION 1 |
| 4 | 0 | DISTINCT VALUES AT DISCRETE POSITIONS WITHIN CARRIER CYCLE FOR DIMENSION 1 |
| 5 | 1 | DISTINCT VALUES AT DISCRETE POSITIONS WITHIN CARRIER CYCLE FOR DIMENSION 1 |
| 6 | 0 | DISTINCT VALUES AT DISCRETE POSITIONS WITHIN CARRIER CYCLE FOR DIMENSION 1 |
| 7 | 0 | DISTINCT VALUES AT DISCRETE POSITIONS WITHIN CARRIER CYCLE FOR DIMENSION 1 |
| 8 | 1 | DISTINCT VALUES AT DISCRETE POSITIONS WITHIN CARRIER CYCLE FOR DIMENSION 1 |
| ⋮ | n/a | DISTINCT VALUES AT DISCRETE POSITIONS WITHIN CARRIER CYCLE FOR DIMENSION 1 |
| n | n/a | DISTINCT VALUES AT DISCRETE POSITIONS WITHIN CARRIER CYCLE FOR DIMENSION 1 |

| Dim # | INTRA-SYMBOL MULTI-DIMENSIONAL MODULATION DEFINITIONS | |
|---|---|---|
| 1 | 0°·············360° | 256QAM |
| | DISTINCT VALUES AT DISCRETE POSITIONS WITHIN CARRIER CYCLE FOR DIMENSION 1 | |
| 2 | 256QAM | |
| | DISTINCT VALUES AT DISCRETE POSITIONS WITHIN CARRIER CYCLE FOR DIMENSION 2 | |
| 3 | 256QAM | |
| | DISTINCT VALUES AT DISCRETE POSITIONS WITHIN CARRIER CYCLE FOR DIMENSION 3 | |
| 4 | 256QAM | |
| | DISTINCT VALUES AT DISCRETE POSITIONS WITHIN CARRIER CYCLE FOR DIMENSION 4 | |
| | ··· | |
| N | 256QAM | |
| | DISTINCT VALUES AT DISCRETE POSITIONS WITHIN CARRIER CYCLE FOR DIMENSION N | |

FIG. 36

| DIMENSION | INTRA-SYMBOL ORTHONORMAL SUB-DIMENSIONAL DEFINITIONS | | | | |
|---|---|---|---|---|---|
| | 0°..........................................................................................360° | | | | |
| 1 | DIMENSION $1_1$ | DIMENSION $1_2$ | DIMENSION $1_3$ | ... | DIMENSION $1_n$ |
| 2 | DIMENSION $2_1$ | DIMENSION $2_2$ | DIMENSION $2_3$ | ... | DIMENSION $2_n$ |
| 3 | DIMENSION $3_1$ | DIMENSION $3_2$ | DIMENSION $3_3$ | ... | DIMENSION $3_n$ |
| 4 | DIMENSION $4_1$ | DIMENSION $4_2$ | DIMENSION $4_3$ | ... | DIMENSION $4_n$ |
| ⋮ | ⋮ | ⋮ | ⋮ | ⋮ | ⋮ |
| N | DIMENSION $N_1$ | DIMENSION $N_2$ | DIMENSION $N_3$ | ... | DIMENSION $N_n$ |

FIG. 38

METHOD AND APPARATUS FOR INTRA-SYMBOL MULTI-DIMENSIONAL MODULATION

CROSS-REFERENCE TO RELATED APPLICATION(S)

This application is a continuation-in-part of non-provisional patent application Ser. No. 15/714,996, filed Sep. 25, 2017, which is a continuation-in-part of non-provisional patent application Ser. No. 15/205,473, filed Jul. 8, 2016, which is a continuation-in-part of non-provisional patent application Ser. No. 14/574,577, filed Dec. 18, 2014, which claims priority to provisional patent application Ser. No. 61/924,304, filed Jan. 7, 2014, (entitled "NuSine"), which applications are incorporated herein by reference.

BACKGROUND

Field of the Disclosure

The present disclosure relates generally to data transmission, and more particularly, to sine wave modulation techniques offering increased data transmission rates.

Background of the Disclosure

Transmission of digital data is typically accomplished from point to point by modulating a sine wave utilized as a carrier wave through modification of one or more of the characteristic properties of the wave amplitude, frequency, and phase.

Amplitude modulation of sine waves has classically been implemented by directly varying the amplitude of the sine wave as a carrier wave in relationship to the source to be transmitted. A typical signal sine wave is characterized by its amplitude, frequency, and phase. Sine waves are used to transmit data over a host of different media. For amplitude modulated (AM) radio, the broadcasted carrier (sine) wave is modulated with voice, and a simple AM receiver can separate the voice from the carrier signal with a diode, amplify the voice and play it through a speaker. AM radio suffers from signal noise byproducts that limit the signal range, quality, and reliability. Typically, modulation or other changes to a pure sine wave will cause byproducts including harmonics, side band, reflections, and electromagnetic interference.

Direct modulation of sine waves as carrier waves produces significant noise that is difficult to filter, frequency modulation techniques have typically been implemented by encoding information in a sine wave as a carrier wave by varying the instantaneous frequency of the wave. Phase modulation techniques have typically been implemented by encoding information on a sine wave as a carrier wave by variations in the instantaneous phase of the carrier wave.

Hybrid modulations schemes have been developed and include QAM, SM, and SSB. These hybrid modulation schemes established improved data transmission but still suffered from significant noise and other modulation byproducts that reduce the actual transmission rates and use excess spectrum resources.

Accordingly, improvements are sought in wave modulation encoding of data.

SUMMARY OF THE DISCLOSURE

While the way that the present invention addresses the disadvantages of the prior art will be discussed in greater detail below, in general, the present invention provides novel modulation techniques offering significantly enhanced signal-to-noise ratio (i.e., data-produced energy over the channel noise energy), reduced bandwidth requirements, increased noise immunity in recovering data at a given Bit Error Rate (BER), and improved dynamic control of the modulation process.

Phase/amplitude-time modulation offers significant increases in data transmission rates compared to prior modulation methods/techniques. The new technique can be applied to any frequency and most existing wired and wireless telecommunications infrastructure.

One aspect of the invention features, in some applications, a modulation method for combining amplitude-time and variable phase modulation of a sine wave. The amplitude-time modulation avoids the majority of spurious emissions exhibited by legacy modulation techniques through small phase variation distortions of the sine wave amplitude. In some implementations, the amplitude-time modulation is described as a step-porch distortion based on small per-bit modifications exhibited as step- or porch-like phase changes to the sine wave during amplitude-time modulation.

Legacy modulation schemes are typically limited to a small number of bits of information per cycle due to noise and other modulation byproducts. In contrast, amplitude-time modulation is capable of 1 to n bits per cycle, n being limited only by the communication hardware device architecture, and peak and crossing phases. Each collection of n bits may comprise a bit set located at set phase angles of each wave. Additionally, more bits per cycle can be transmitted with the reduced noise signature of amplitude-time modulation. Typically a 'zero' value bit is represented by no change in the sine wave value and a 'one' value bit is represented by increasing or decreasing (slightly) the sine wave amplitude at a given position on the wave. Classical encoding techniques such as inverting alternate bits and adaptive altering may also be applied to amplitude-time modulation.

Combinations of amplitude-time modulation with reduced noise can increase the density of variable phase shifted signals and allow a plurality of sine wave carriers 1 to n to be placed at pie-determined phase location periods along the sine wave. Placement can be at any location on the wave, where the value of n is depending, e.g., on device hardware architecture, peak and crossing phases, and clock, speed. The addition of variable phase modulation of sine waves can be implemented to increase data content within a transmission. Variable phase modulation data can also facilitate additional data bits and/or control bits to improve the amount and security of data transmitted within a given bandwidth.

The amplitude-time modulated sine wave is combined with the 1 to n degrees of variable phase modulation sine wave(s) to form a compound signal wave for communication purposes. The compound signal wave can be formatted, modulated, and transmitted over most any form of communication system. The compound signal wave can then be demodulated and deciphered as typical communications data. Any combination of wired and wireless communications system may benefit from the Phase/amplitude-time modulation techniques.

Phase/Amplitude-time modulation can be employed with classical electronic hardware utilizing lists and look up tables, and with custom devices or software solutions in various applications.

Accordingly, the disclosed Phase/amplitude-time modulation techniques offer significantly enhanced signal-tonoise ratio, reduced bandwidth requirements, increased noise immunity, and improved control of the modulation process.

One embodiment provides a method for encoding digital data. The method includes generating an amplitude-time modulated sine wave. The method includes generating, a phase-modulated sine wave. The method includes summing the amplitude-time modulated sine wave and the phase-modulated sine wave to generate a compound sine wave. In some embodiments, the phase-modulated sine wave includes generating a phase-modulated carrier wave, and generating the compound sine wave includes generating a transmittable complex wave.

Another embodiment provides a system for encoding digital data. The system includes an amplitude-time modulator for generating an amplitude-time modulated sine wave. The system includes a phase modulator for generating a phase-modulated carrier wave. The system includes a summing module for summing the amplitude-time modulated sine wave with the phase-modulated sine wave to generate a compound sine wave.

Another embodiment provides a method for multi-dimensional modulation of a network protocol including control data and payload data. The method includes encoding a first sine wave with the control data. The method includes encoding a second sine wave with the payload data. The method includes summing, the first and second sine waves to generate a compound sine wave. In some embodiments, encoding the first sine wave includes encoding the first sine wave with header information for a first Ethernet packet and post-payload data for a second Ethernet packet, and encoding the second sine wave includes encoding the second sine wave with payload data for the second Ethernet packet. In some embodiments, encoding the first sine wave includes encoding an amplitude-time modulated sine wave, and encoding the second sine wave includes encoding a phase-modulated sine wave.

Other aspects of the invention will become apparent by consideration of the detailed description and accompanying drawings.

BRIEF DESCRIPTION OF THE DRAWINGS

The present disclosure may be better understood, and its numerous features and advantages made apparent to those skilled in the art by referencing the accompanying drawings.

FIG. 33 is a tabular diagram illustrating an array of intra-symbol multi-dimensional definitions in accordance with at least one embodiment.

FIG. 34 is a block diagram illustrating an array of intra-symbol multi-dimensional definitions in accordance with at least one embodiment.

FIG. 36 is a block diagram illustrating an array of intra-symbol multi-dimensional definitions implemented using quadrature amplitude modulation (QAM) in accordance with at least one embodiment.

FIG. 38 is a block diagram illustrating an array of intra-symbol multi-dimensional definitions comprising sub-dimensional definitions in accordance with at least one embodiment.

The use of the same reference symbols in different drawings indicates similar or identical items.

DETAILED DESCRIPTION OF THE DRAWINGS

The following description is of exemplary embodiments of the invention only, and is not intended to limit the scope, applicability, or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciate that the description herein may be adapted to be employed with alternatively configured devices having different components, modulation/demodulation mechanisms and the like and still fall within the scope of the present invention. Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily tall referring to the same embodiment.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely hardware. However, one of ordinary skill in the art, and based on a reading of this detailed description, would recognize that, in at least one embodiment, the electronic based aspects of the invention may be implemented in software (that is, stored on non-transitory computer-readable medium) executable by one or more electronic processors. Furthermore, and as described in subsequent paragraphs, the specific mechanical configurations illustrated in Me drawings are intended to exemplify embodiments of the invention and that other alternative mechanical configurations are possible. Also, "controllers" and "processing units" described in the specification can include processing components, such as one or more electronic processors (e.g., microprocessors, digital signal processors (DSP), field programmable gate arrays (FPGA), application specific integrated circuits (ASIC), and the like), non-transitory computer-readable memory modules, input/output interfaces, and various connections (e.g., a system bus) connecting the components.

Figure 1:
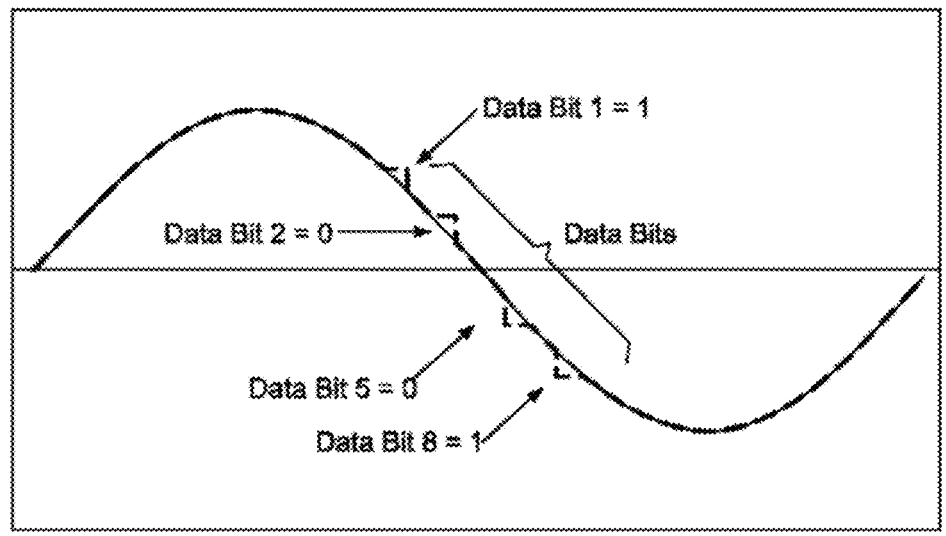
FIG. 1 illustrates a sine wave with digital information encoded through amplitude-time modulation (ATM).

With reference to FIG. 1, a low-distortion, digitally synthesized sine wave is, illustrated with data imposed or encoded on this sine wave using a step function characterized by the presence or absence of data bits in the data stream. The digital information can be encoded through amplitude-time modulation displayed as step-porch type wave distortions. In various embodiments, this step function is referred to as Amplitude-Time Modulation ("ATM") or the ATM Component. The step-porch distortions encoding of information mitigates signal distortions compared to legacy AM signals. Additional benefits of the reduced distortions include larger word size (1 to n), more data per cycle, and efficient use of the available spectrum.

A representative sine wave can be generated using a sine lookup table, imposed on a D to A converter.

The novel modulation techniques described herein are referred to as Phase/amplitude time modulation. Phase/amplitude-time modulation of sine waves offers reduced noise and increased data densities. Accordingly, embodiments of the present invention may be used to efficiently encode data for transmission over communications systems.

Phase/amplitude-time modulation further introduces a varying phase, quadrature signal ("Phase Component") that allows data instantiated on the signal to be programmable by the user. Phase/amplitude-time modulation may thus be described in terms of the ATM Component and the Phase Component.

Figure 2:
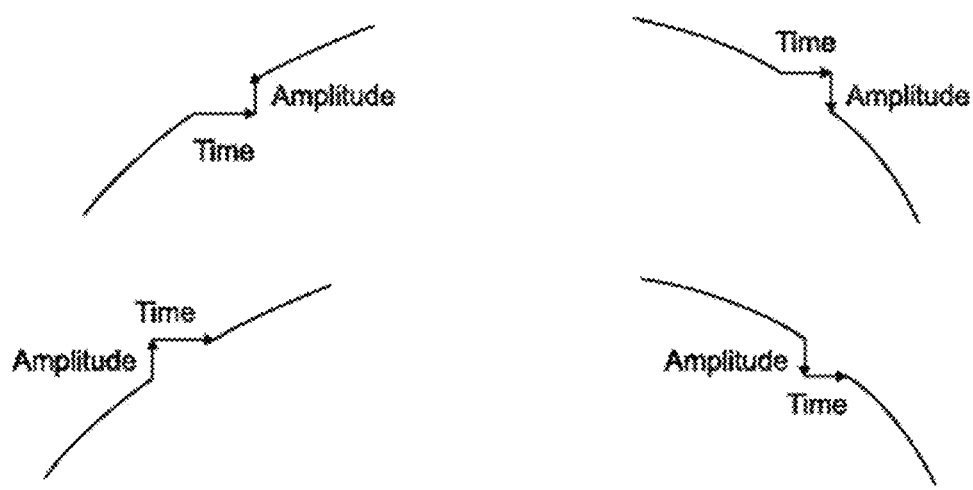
FIG. 2 illustrates positive cycle ATM encoding options.
Figure 3:
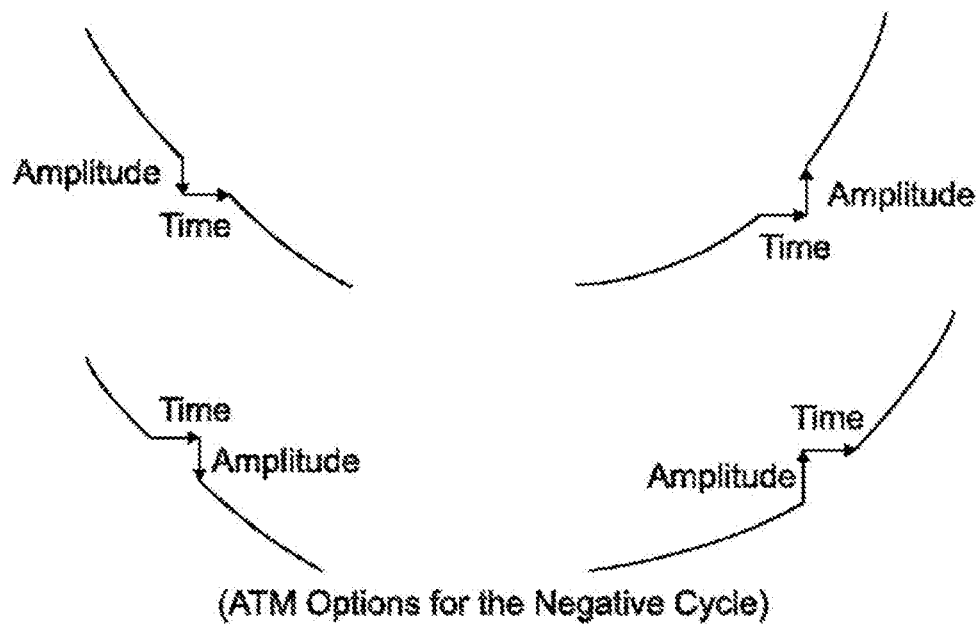
FIG. 3 illustrates negative cycle ATM encoding options.

The primary data channel in Phase/amplitude-time modulation is the ATM modulated sine wave or the ATM Component. In telecommunication, each cycle is commonly referred to as a "Symbol." While 16 bits per symbol data rates have been achieved on this channel using ATM, higher data rates are anticipated as the technology is further developed. The orientation of the ATM modulation, or the way that the data bit is represented on the ATM sine wave, is fully programmable by the user. FIGS. 2 and 3 illustrate options that can selectively represent either a data value of 1 or 0. Again, the number of bits per symbol, from 1 to n, is variable and selectable by the user, as is the location and orientation of the data.

At a receiver, raw bits of an n-bit word can then be separated from the sine wave, with peaks and valleys representing 0 and 1 data bits controlled by preamble or control word instructions. In addition to the orientation and the number of bits per symbol (i.e., cycle), the location of the bit on the cycle, i.e., the angle on the wave where the bit resides, is also programmable. This raw data can be normalized, conditioned, and stored as appropriate.

Figure 4:
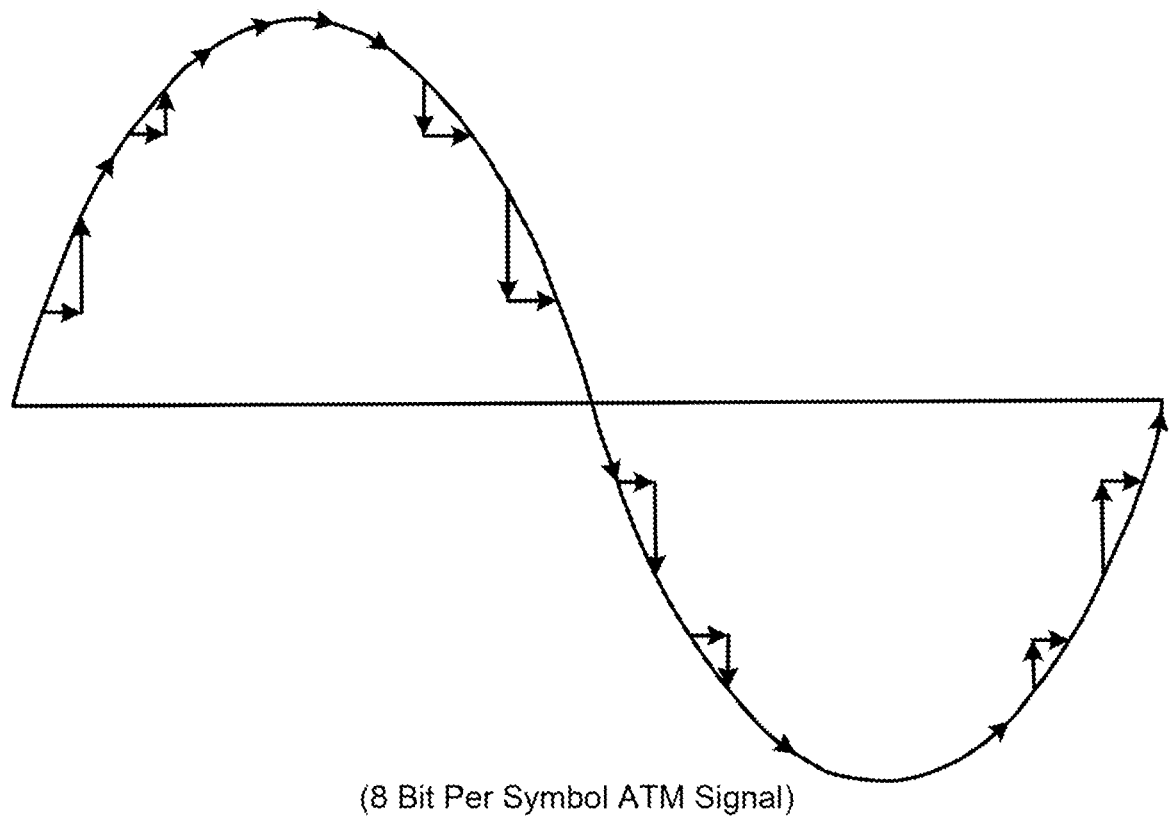
FIG. 4 illustrates an 8 bit per symbol ATM signal.

With reference to FIG. 4, the ATM bit orientation may be selected to represent the value to be encoded. An associated receiver may be informed of this configuration to properly determine the intended value. Finally, the duration of the ATM modulation at each location is also programmable. Note that the bit duration may not overlap the start of the subsequent bit.

Turning now to description of the Phase Component of Phase/amplitude-time modulation, unlike the ATM channel/component (i.e., the ATM channel) that contains actual data values, the Phase/amplitude-time Phase channel/component (i.e., the phase channel) is a "representation" of either a data value or a control message. This channel in the Phase-amplitude-time modulation scheme is created by the introduction of a phase shift to the ATM channel by summing the two waves. This additional channel allows the value of the phase shift to be used as a way of either adding additional data bits to the symbol or sending control signals between the transmitter and the receiver regarding the format of the ATM channel data. For example, an introduction of a specific phase shift could indicate to the receiver that subsequent ATM channel modulation will indicate that: the orientation of the modulation will be inverted until further notice; the position of the Most Significant Bit (MSB) will be opposite of the current configuration until further notice; the data bit locations will change to a predefined format until further notice; a custom configuration created by the user will be in effect until further notice; or future phase information will represent additional data bits for the symbol until further notice.

The number of data bits represented by the phase channel is configuration dependent, e.g., depending on division of the phase channel into four possible values, 45, 90, 135 and 180 degrees of shift. In this use case, the user can add two additional data bits per symbol, 45.degree.=00, 90.degree.=01, 135.degree.=10, and 180.degree=11. The additional bits are detected and added to the data transmitted on the ATM modulation channel during the same symbol. More possible phase values allow for more data bits.

The phase channel may also be used as a means of syncing the data being transmitted with a specific shift representing the beginning or end of a data byte, word, or even packet. This allows for more actual data payload efficiency by not requiring the extensive preamble control bits to be sent to coordinate the transmission as in other modulation techniques. Implementation of these various features can create customized proprietary protocols or to satisfy unique application requirements. This capability creates additional benefits in the effective data rate of the system utilizing tins technique.

Figure 5:
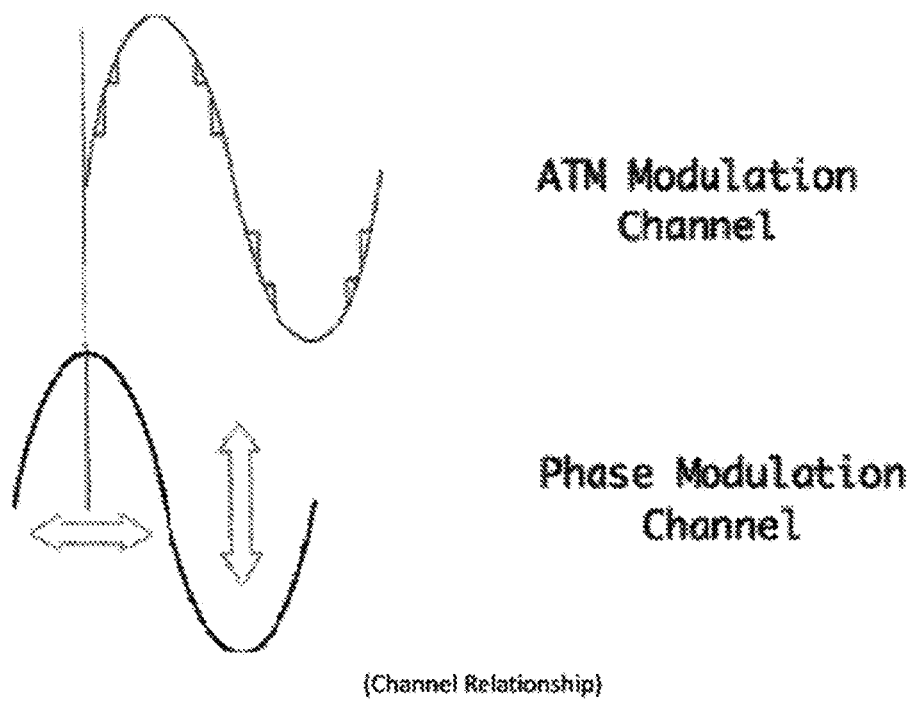
FIG. 5 illustrates the relationship between the ATM channel and phase modulated channel signals.

With reference to FIG. 5, a relationship of the phase channel to the ATM channel is illustrated in which the phase channel is in quadrature (i.e., 90 degrees out of phase) with the ATM channel. The values of the two waves are independently encoded. The combination of phase and amplitude characteristics of the phase channel reflects the data/control information for the given symbol.

Figure 6:
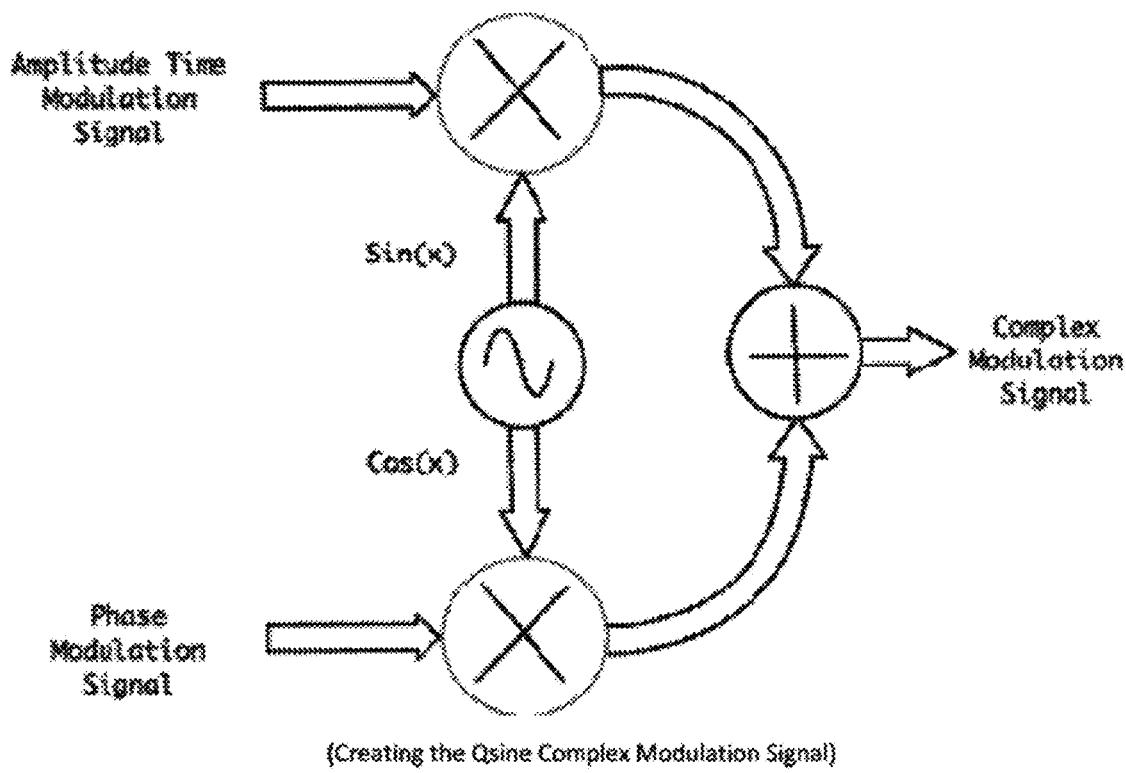
FIG. 6 illustrates a combiner for combining ATM and phase modulation signals.

With reference to FIG. 6, the combined data value of the symbol encoding is referred to as the Complex Modulated Signal. FIG. 5 represents the two channels being created by the technology. The top channel is the ATM (Amplitude Time Modulation) channel, which is used as the primary data channel. The presence or absence of the modulation described in FIGS. 1, 2 and 3 to encode one to n data bits per symbol on the data channel (i.e., the ATM channel).

The bottom channel is the phase channel, which is used to add either additional bits and/or control bits to the technology. The phase and/or amplitude of the phase channel are modulated to represent the desired information, or data bits, to be encoded on the signal. This combination of phase and amplitude modulation is used to represent n number of values on the phase channel. The number of bits per symbol on this channel is limited only by the transmitting and receiving circuitry's ability to respond rapidly enough to create and recognize the data values being encoded/decoded.

The two channels are in quadrature with each other (i.e., 90 degrees out of phase with each other). The combining (i.e., summing) of these two signals creates a complex modulation signal (i.e., a Phase/Amplitude-Time Modulated Signal) that contains the transmitted data, the control information, or both, which signal can be transmitted from a transmitting device to a receiving device.

In some embodiments, data may be encoded solely in the ATM channel, i.e., with a 00 phase shift or 0 bits of data on the Phase Channel.

Turning now to descriptions of implementations of transmission of the Phase/Amplitude-Time Modulated Signal, the modulated sine wave is sent to a gain block (not shown) to produce a harmonic component, e.g., at the 3 dB compression point. The block acts as a soft mixer, mixing the data rate and the sine wave carrier rate to produce energy at the 3rd, 5th, and 7th harmonics of the carrier.

A phase/amplitude-time modulated signal may be transmitted using primarily the harmonic and its AM and PM components. The generated signal energy is put through a band pass filter centered at the harmonic component frequency. All but the harmonic is filtered out, as this is the spectrum having the AM and PM saw tooth energy components necessary to recover the transmitted information. These components are complementary to each other and symmetrically opposite to each other in the same time slot.

Conventional forms of modulation in use today are typically in-band or sideband energy producing, i.e., the energy produced is in the channel along with the noise and other by-products produced. This typically causes a reduction in the SNR or Eb/No.

In contrast, Phase/amplitude-time modulation produces little to no in-band noise products since it uses primarily the energy in the harmonic portion of the spectrum. All the sideband and carrier energy is removed with the band pass filter centered at the harmonic frequency. For example, if the carrier frequency is 100 kHz and has 9 bits (or steps) per vertical slope, the data rate will be 18 times the carrier rate or 1.8 Mb/s. A Gaussian distributed concentration of energy is produced at the harmonic frequency and has a unit value amplitude and phase, crossing at the bit rate. This energy is then demodulated with a DSP (Digital Signal Processing) engine or an equivalent circuit implementation that is configured to act as a phase and amplitude detector for both the ATM and Phase channels.

The theoretical noise floor limit, known as kTB, for 100 kHz is −124 dBm at room temperature, but the peak power of the data is practically −70 dBm. This produces SNR of greater than 50 dB RMS.

It should be noted that this data rate would normally require an Eb/No of near 100 dB for a BER of 10e−8.

However, since Phase amplitude-time produces no in-channel noise or artifacts and sends only the difference data bits, it takes less than 70 dB Eb/No.

Turning to description of reception of Phase/amplitude-time modulated signals, the harmonic carrier, i.e., the harmonic itself, plus the energy associated around the carrier, is input into a quadrature detector. This can be done using a pair of double balanced mixers with a 90-degree phase shift in the local oscillator, creating an IQ demodulator. Locking the local oscillator on the harmonic divided by value of the harmonic, we now have time-slot data information coming out of the quadrature and incident ports of the double balanced mixers, or IQ demodulator. When the phase and amplitude components cross each other a "1" or "0" is output depending on whether the data has been inverted.

Another way to configure a detector is to take the original frequency of the carrier wave, input it into a double balanced mixer, and input another sine wave without data in the local oscillator port at the same frequency. This configuration serves as a differential detector since the data output of the double balanced mixer is the difference between those two carriers. Thus any phase shift or amplitude shift in either one of those carriers can be used to produce a data stream. The carriers and sideband components can be discarded, reducing noise and spectrum requirements. In this implementation, only the harmonic distortion component for the first group of carriers is used. If more than one sine wave is passed down stream, only one is used as the clock, e.g., usually the top or bottom sine wave.

In a multi-channel environment, only one of the harmonics is sent. As long as the signals all begin at the same phase, one signal can be used for a frame clock for all channels as in ATM modes when the signals are again phase coherent. Phase/amplitude-time thus is more efficient moving from single channel to multi-channel use.

One of the primary advantages of Phase amplitude-time technology is the capacity to communicate more information than current technologies in a given bandwidth. Currently, commercially available forms of modulation can achieve around 10 bits per Hertz over existing, industry-standard infrastructure. Legacy modulation technologies often sacrifice bit error rate to increase information rate per Hertz, with industry standards requiring about 10 to the minus 8, bit error rate (BER 10e–8).

Figure 7:
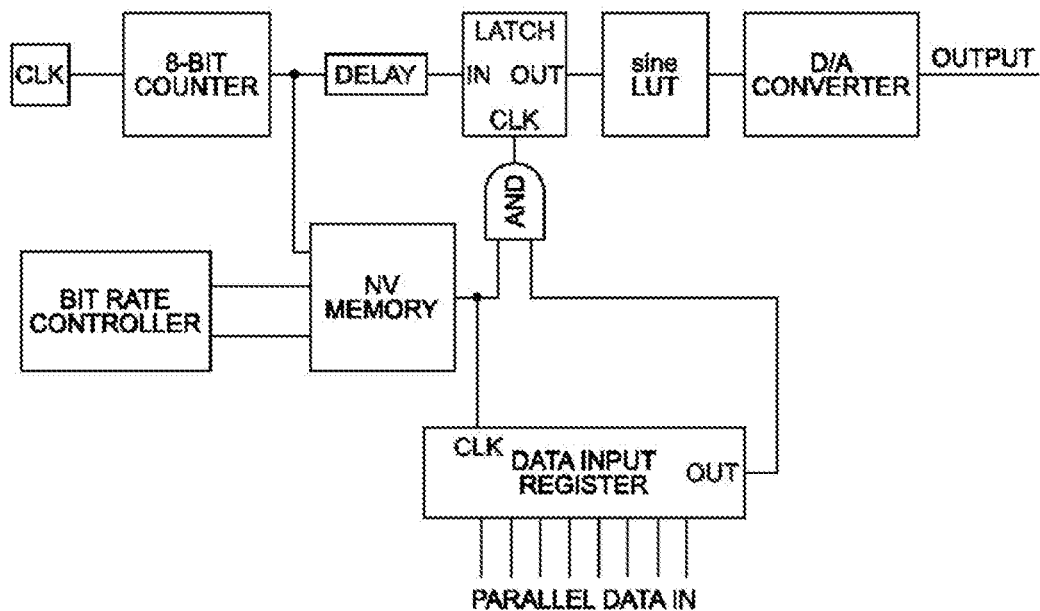
FIG. 7 illustrates block diagram of a typical modulator circuit for generating a modulated sine wave carrier signal.

FIG. 7 is block diagram of a typical modulator circuit for generating a modulated sine wave carrier signal. The displayed block diagram is the functional basis for implementing amplitude-time modulation. While classical block functions are shown, other signal processing techniques such as programmed micros, digital signal processors, and state machines are also appropriate to this task. The sine wave look up table (LUT) drives a D/A converter. The phase angles 0 to 360 degrees are quantized to n number of discrete values. A multi-bit counter continuously counts through these discrete values at a clock rate. The output of the multi-bit counter addresses the sine-function lookup table that provides the digital encoded sine-function value for each quantized phase angle. The D/A converter outputs a voltage proportional to the sine of the discrete phase angle at the input of the lookup table. The clock generator is shown driving, the multi-bit counter with a delay element and latch the value when high being transparent when the value is low. The output drives the lookup table. The lookup table drives the D/A converter. Modulation implementing the step-porch amplitude-time modulation techniques by holding input to the lookup table for the desired number of clock pulses equal to time interval implementing the phase period desired.

Information to be encoded is introduced to a data input register. Data input size is n depending on device hardware and clock speeds. The data input register is clocked by the memory. The data are preloaded and initial data bits appear on the output (serial) of the data input register, if the counter and data input register as they appear, at the And function both contain a value of 1 the output of the D/A converter will remain constant. During operation the counter continues and the output sequentially addresses the contents of the memory. D/A output will only change when a difference in value between counter and register are detected. Many variations can be employed to implement the encoding of digital information that, minimizes signal distortions while maximizing data throughput. The bit rate controller can be adaptively configured to alter the bit rate or phase intervals to adapt to the communication channel conditions. Additionally, the bit rate controller can be adapted to implement security and control functions for the data transmission.

Figure 8:
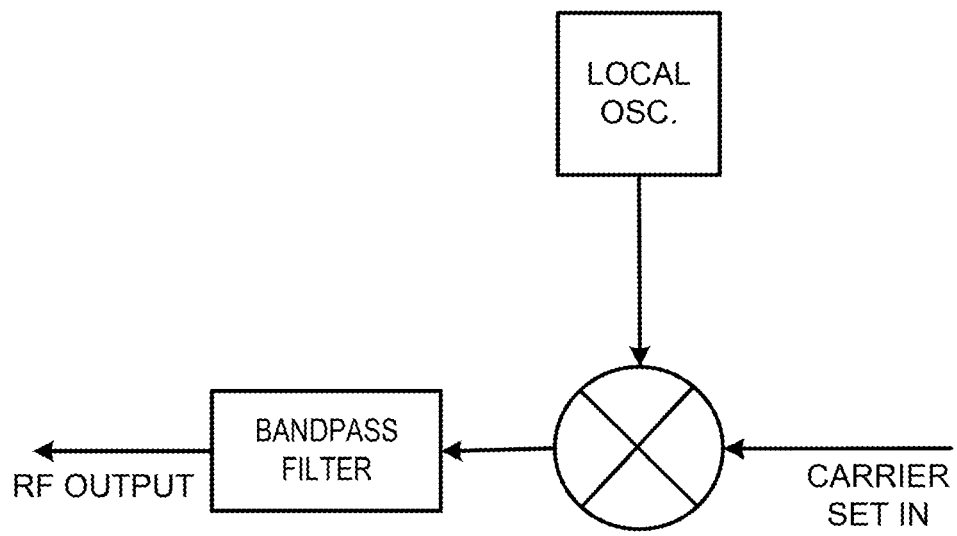
FIG. 8 is a block diagram of a typical frequency up converter for communicating a sine wave carrier signal.

FIG. 8 is a block diagram of a typical frequency up converter for communicating a sine wave carrier signal. A local oscillator drives one input of a balanced mixer. A modulated sine wave carrier set is mixed from the other input of the balanced mixer. The output of the balanced mixer is connected to a band pass filter. The output of the band pass filter is ready to be transmitted through the appropriate driver circuitry.

Figure 9:
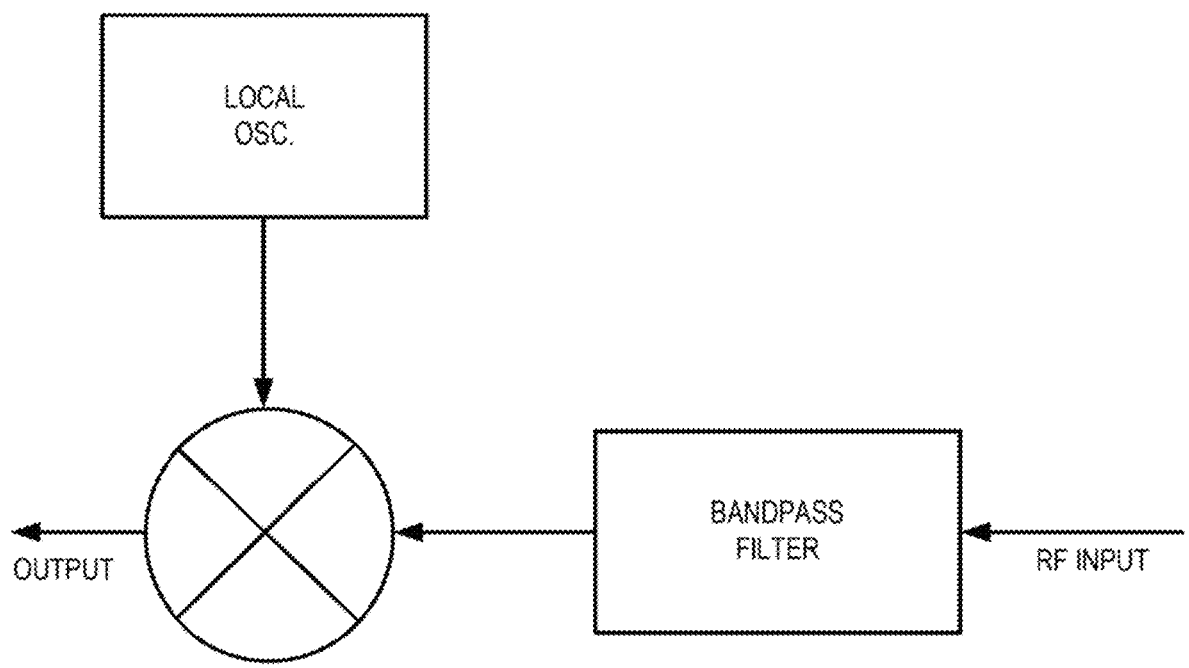
FIG. 9 is a block diagram of a typical frequency down converter for communicating a sine wave carrier signal.

FIG. 9 is a block diagram of a typical frequency down converter for communicating a sine wave carrier signal. A local oscillator drives one input of a balanced mixer. Received RF input is mixed into the other input of the balanced mixer. The output of the balanced mixer is passed to a detector for deciphering and conditioning.

Figure 10:
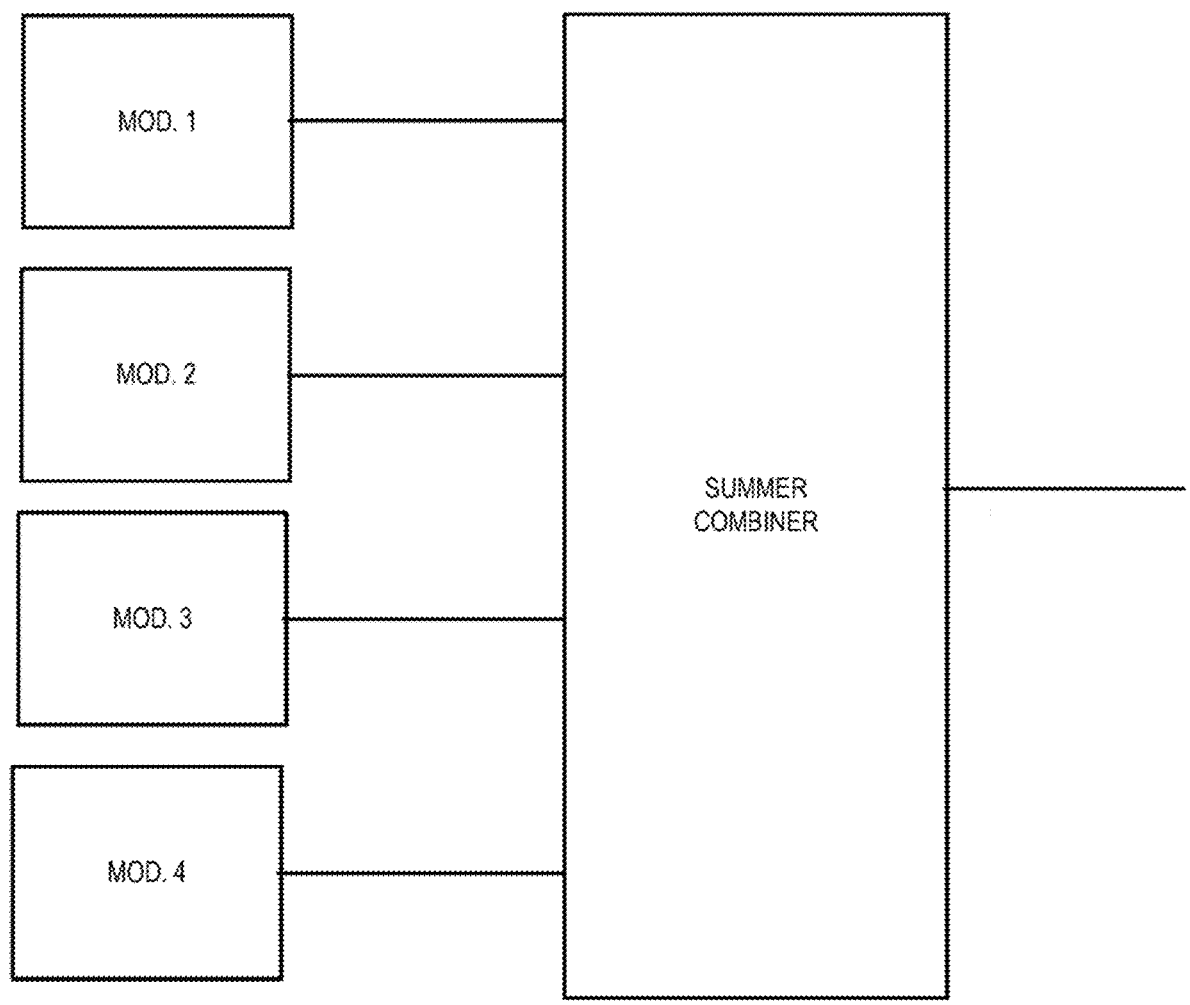
FIG. 10 is a block diagram of a typical modulator circuit, featuring individually modulated sine wave carriers with outputs mixed together to form a compound signal wave.
Figure 11:
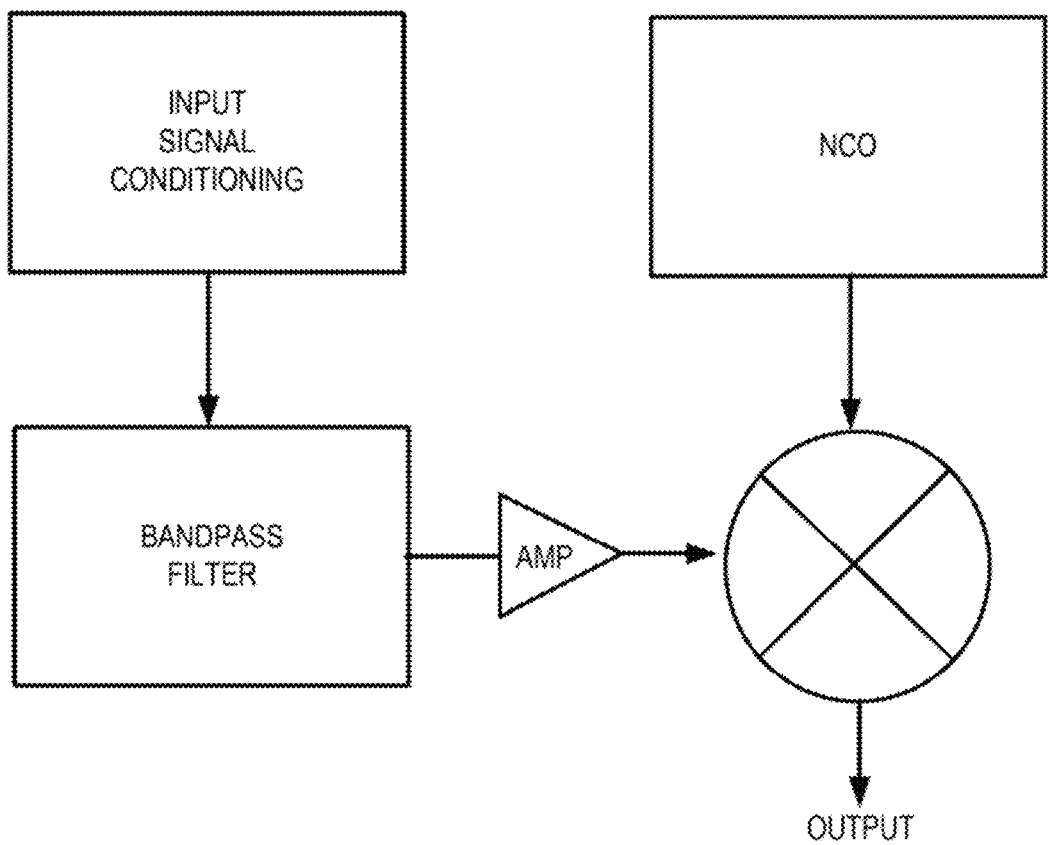
FIG. 11 is a block diagram of a typical demodulator circuit for extracting encoded information from a modulated sine wave.

FIG. 10 is a block diagram of a typical modulator circuits, featuring individually modulated sine wave carriers with outputs mixed together to form a compound signal wave. As shown a modular circuit(s) (MOD.1, MOD.2, MOD.3, and MOD.4) represent amplitude-time modulated sine wave carriers. These modular circuit(s) are fed into a summer/combiner for mixing into a composite waveform for conditioning, transmission and receiving/deciphering. The summer/combiner outputs are connected in serial or parallel to a data convoluter for transmission. The positioning of variable sine wave carriers can be varied by lists, look up tables, or software control as shown in FIG. 4 and FIG. 11. While 4 modular circuits are shown up to n circuits may be employed limited only by hardware device architecture, and clock speed.

The FIG. 11 is a block diagram of a typical demodulator circuit for extracting encoded information from a modulated sine wave. Initially, incoming modulated sine wave carrier is input to the input signal conditioning block. Various signal conditioning functions will be utilized within the signal conditioning block as appropriate to the type of transmission. Types of transmission include but are not limited to twisted pair, wireless, microwave, or differential lines. The output of the signal conditioning block is connected to a bandpass filter. The bandpass filter is typically centered on the carrier frequency with a Q>100. The signal from the bandpass filter is amplified by the Amp block and inserted into the balanced mixer block. The mixer block mixes the amplified signal with a numerically controlled oscillator, NCO block. The numerically controlled oscillator frequency and phase are set to the frequency and phase of one of the amplitude-time modulated sine waves within the passband of the bandpass filter.

Figure 12:
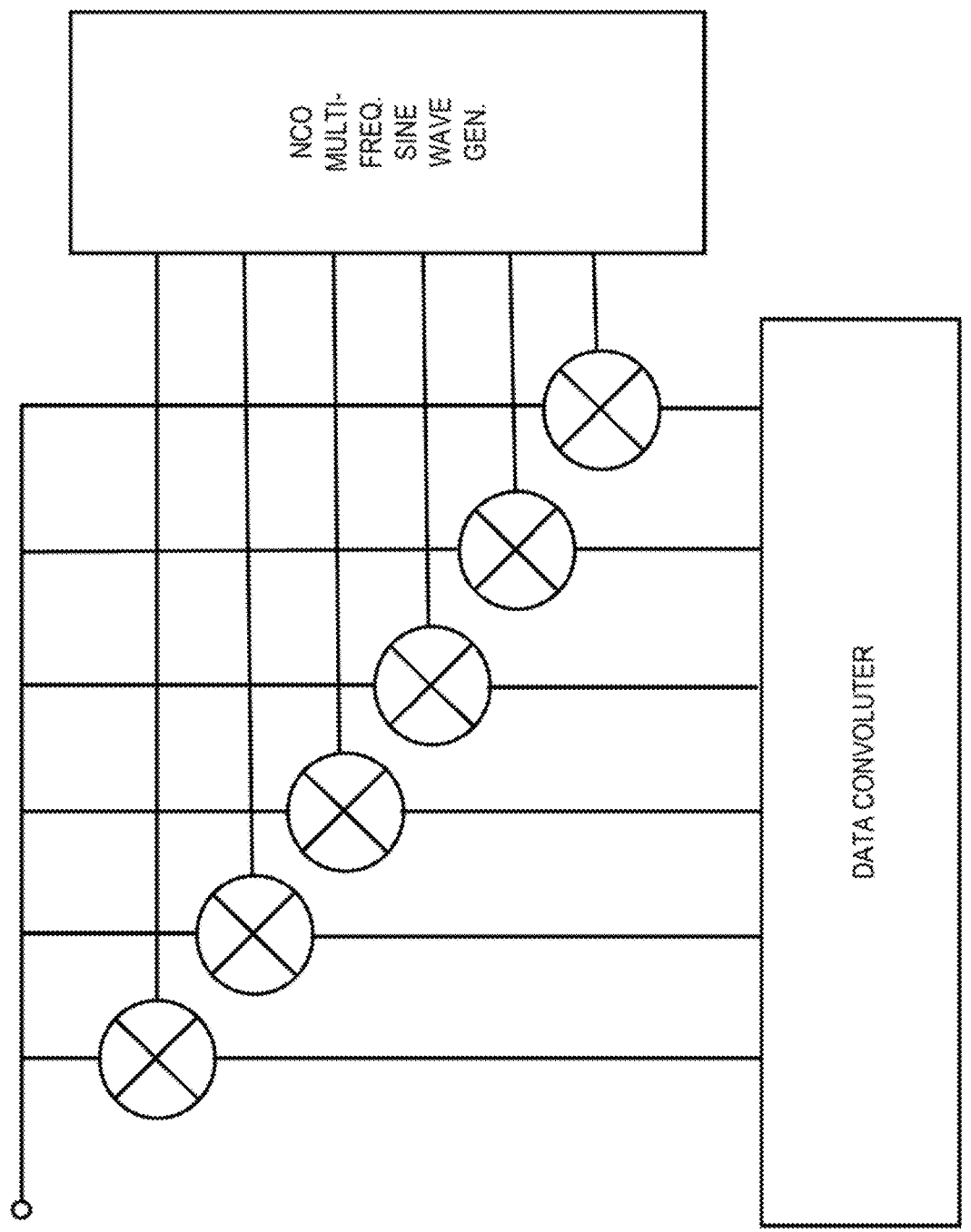
FIG. 12 is a block diagram of a typical demodulator circuit with n-multiple phase modulation streams.

FIG. 12 is a block diagram of a typical demodulator circuit with n-multiple phase modulation streams. Shown is a plurality of modulated carriers within a communications channel with separate demodulation of each carrier to decipher the encoded data. A collection of six balanced mixers are shown but n mixers can be implemented with the limitation of hardware device architecture, and clock speed. The input line(s) feed all balanced mixers. Each balanced mixer has a unique connection to a numerically controlled oscillator multi-frequency sine wave generator. The generator's output lines transmit at the specific frequency of the carrier wave data are to be extracted from. The mixer(s) output is the information from the carrier wave and is also connected to a data convoluter. The data convoluter reassembles the digital data from the individual amplitude-time modulated sine wave signal(s). The incoming carrier waves can be of different frequencies and data rates by utilizing adaptable control information.

Figure 13:
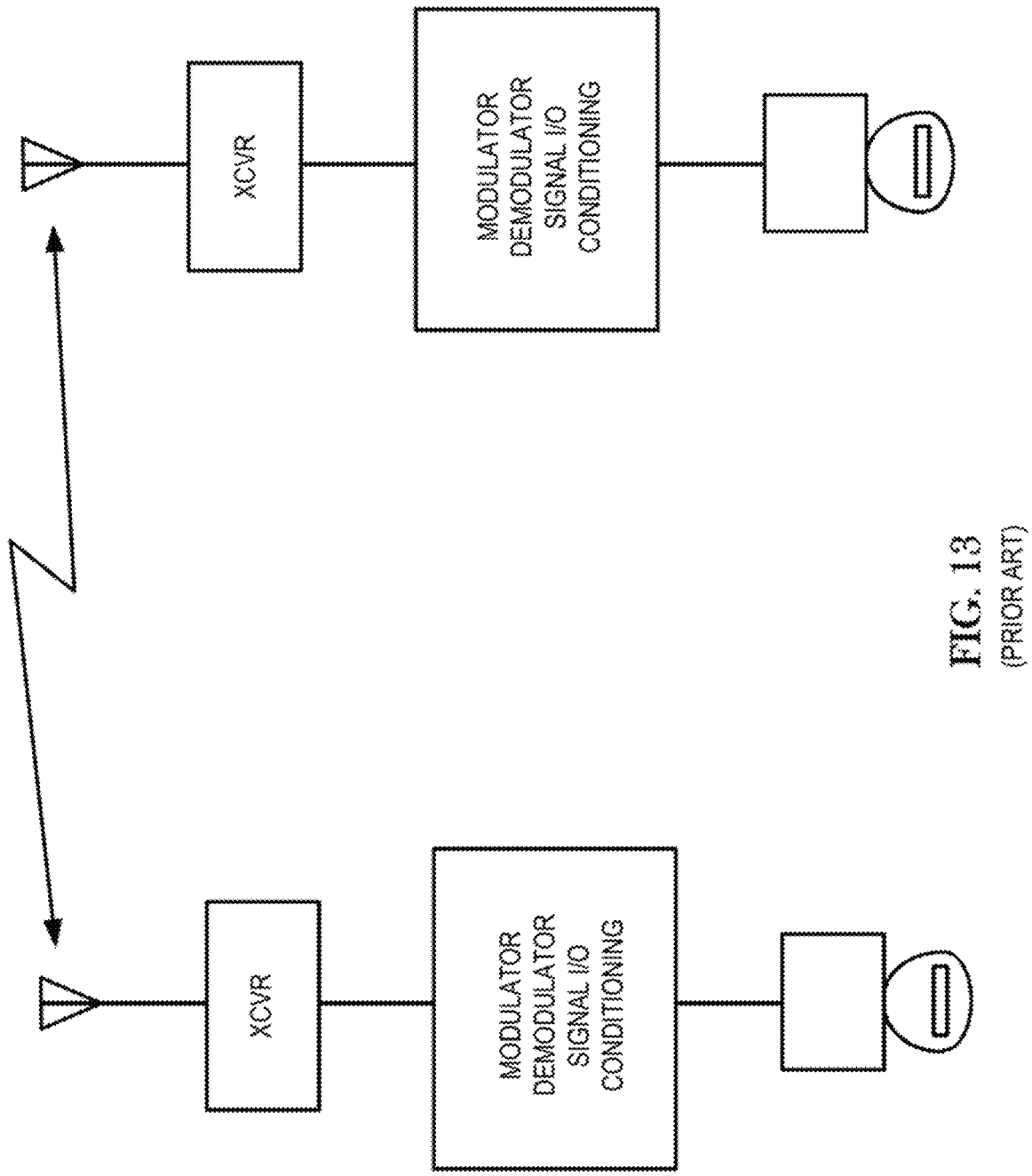
FIG. 13 is a drawing of a typical classical transmit/receive communication system with amplitude-time encoding.

FIG. 13 is a drawing of a typical transmit/receive communication system with amplitude-time encoding. As an example a RF wireless communications end to end block diagram is shown. Each station has a user interface for controlling communications functions. Additionally, each has a modulator/demodulator function for encoding/decoding of signals. Also, each has a transceiver to modulate/demodulate the carrier signals to be transmitted/received. Any final stage conditioning and transceiver function is appropriate to the modulation communications techniques.

Figure 14:
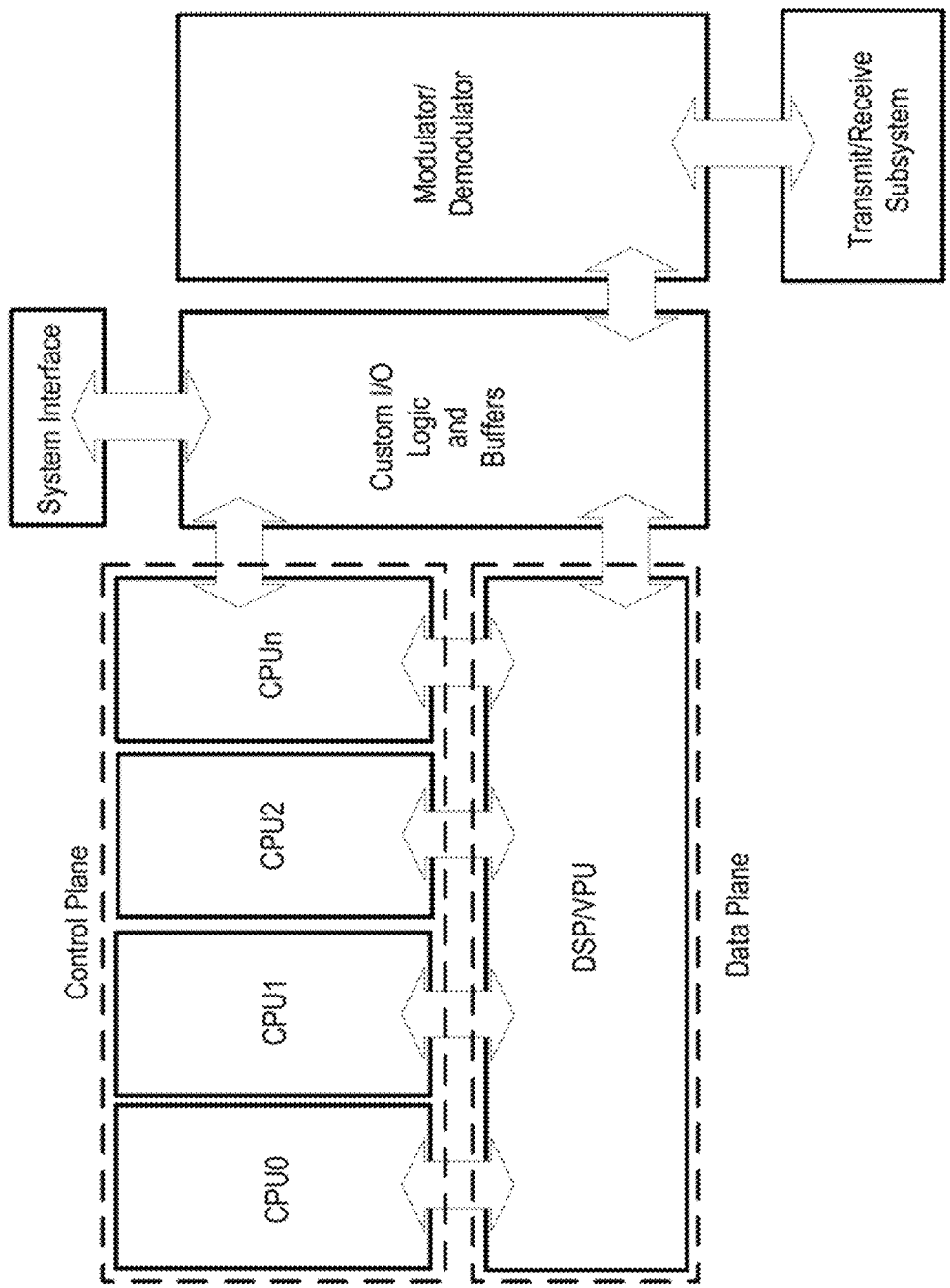
FIG. 14 is a block diagram of a typical interface circuit for implementing a software configurable method for generating a compound signal wave.

FIG. 14 is a block diagram of an example of an interface circuit for implementing a software configurable method for generating a compound signal wave. The present block diagram is a hardware function that can be software configured to adapt to most any communications system. The interface circuit is implemented with a control plane that is a collection of CPUs (number n) interfacing with the I/F signal controlled by a GPU. The GPU represents the data plane and operates the transform receive and transmit functions. The control plane and data plane interface to a FPGA that contains custom I/O logic and buffers. The FPGA also facilitates a system interface. The FPGA also interfaces to the modulator/demodulator for signal transmission preparation, the modulator/demodulator also interfaces to an RF interface for signal transmit and receive functions. The illustrated CPU/GPU implementation may be replaced with a Digital Signal Processor (DSP) that is programmed to perform the same functions.

An important specification in any modulation technology is the Signal-to-Noise Ratio (SNR). This is the required signal strength, measured in decibels (DBs), above the ambient noise and often stated in relationship with the BER realized at that level. In other words, with a given signal strength above the noise, the modulation technology can reliably produce a specific BER.

Symbol Error Rate (SER) takes into consideration the number of bits per symbol. A stronger signal may be required to produce a lower BER. In the case of 256 QAM, this would be 8 Bits per symbol, so the SER is calculated by dividing the BER by the 8 bits per symbol. The more complex modulation schemes are typically more susceptible to noise. Thus, the signal must be increasingly higher than the noise in order to be reliably detected and correctly interpreted. When the receiver incorrectly interprets the transmitted signal, it can implement a forward error-correcting algorithm in software based on the error detection and correction scheme being used or it can request that the transmitter resold the data. Both of these options can negatively affect the performance of the network that is relying on the technology. Thus, it is advantageous to produce the lowest BER at the smallest possible SNR.

While QAM (QAM16, QAM64 up to QAM1024) is currently considered the best conventional modulation, its inherent limitation is that QAM generates artifacts and noise in the channels. With QAM, any attempt to increase the signal to noise ratio by amplifying the signal, amplifies the noise by the same factor. Therefore, Shannon's Limit is always reached. In summary, the smallest QAM step generally has to be greater than 6 dB above the noise in the channel. If there is noise in the channel, it is necessary to amplify the signal before encountering the noise. In fact, QAM's limitations also apply to other existing forms of modulation, as they also use in-band, sideband, or related-component types of modulation.

Amplitude Modulation (AM) is in-band and has two side bands, although the carrier is not needed, so the carrier and one of the side bands are filtered out in the receiver, leaving only a single sideband to provide transmitted information. While Frequency Modulation (FM) has some advantages in terms of immunity to noise, it does not conserve spectrum.

QAM is generally considered superior to PCM, BPSK, AFSK and other forms of modulation. QAM employs quadrature movement of the sine wave and an amplitude step of each sine wave. Depending on the rate of the sine wave, there is an AM component shifted forward or backward in phase with an in-band noise generating effect. Besides the movement of the sine wave, which generates FM or PM, QAM employs an amplitude step with its own artifacts. These two elements combined generate random noise inside the channel. Thus, conventional modulation schemes employ sidebands or other artifact-generating data transport methods.

For example, an AM radio frequency of 1 MHz transmitting music, it is possible to use up to half of the 1 MHz, or 500 KHz, without breaking Nyquist limits. If we exceed that, there would be no spectral difference between the information we are sending and the carrier we are sending it on. If that limit is exceeded, sideband products are generated.

In contrast, Phase/amplitude-time modulation discards or filters out the carrier, sidebands, and in-channel extraneous elements prior to transmission. Thus, Phase/amplitude-time modulation can break the Nyquist limit when more than 16 steps are modulated onto the sine wave. With Phase/amplitude-time, using the same 1 MHz carrier, it is feasible to support a 16 Megabit per second data rate, surpassing the Nyquist limit (e.g., modulating a 16 MHz carrier within 1 MHz). However, this is not a carrier at 16 MHz but a data stream. The data stream can be one of several types of frequencies, e.g., 101, 001, and 010, with additional combinations up to the channel width limit.

In a particular embodiment, a Phase/amplitude-time sine wave is synthesized using a 100 KHz carrier and a numerically controlled oscillator (NCO). A D to A converter is used to set the bit step-size, e.g., to the least significant bit or the next to least significant bit. Selective toggling of "ones" "zeros" generates steps or porches in the sine wave, referred to as ATM. Thus, the steps or porches represent either "ones" or "zeros" generated in every other bit location, and every other timeslot location, so each timeslot is different. These steps and porches are typically only generated on the more vertical parts of the sine wave. For example, in the case of a 1 MHz sine wave there can be 16 steps, 8 bits on each of the more linear portions of the vertical slopes.

Figure 15:
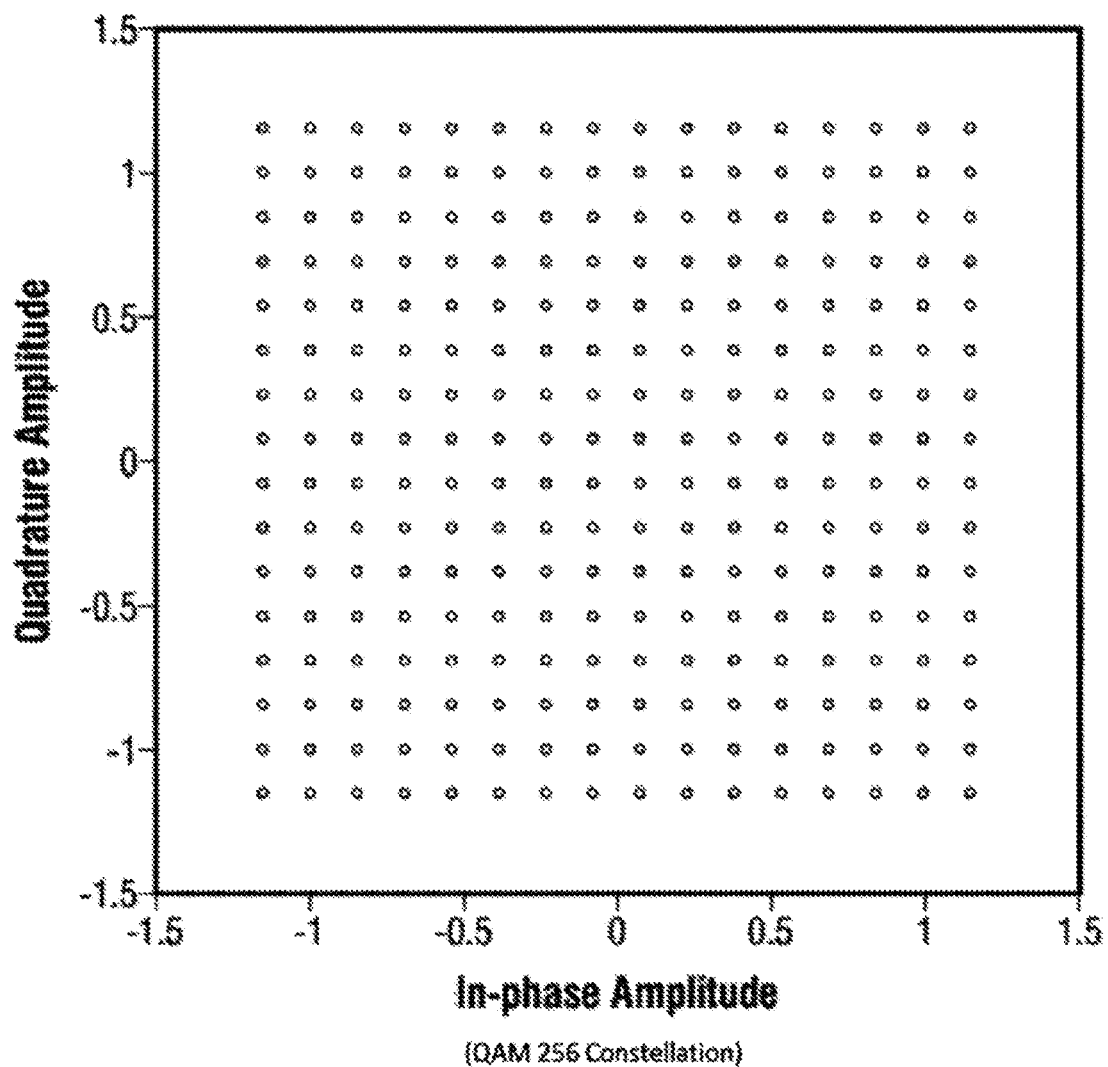
FIG. 15 illustrates a prior an QAM 256 constellation.

The Phase/amplitude-time ATM Channel, with only 8 bits per symbol, is equivalent in data throughput to QAM256. Again, the data transmitted using the ATM Channel is the actual value of the data, requiring only one modulated wave, and not a representation of the data as in QAM256, which requires two modulated waves to convey the same data value. FIG. 15 illustrates a QAM256 "constellation" in which each point in the constellation represents an eight bit binary value between 0 and 255.

Figure 16:
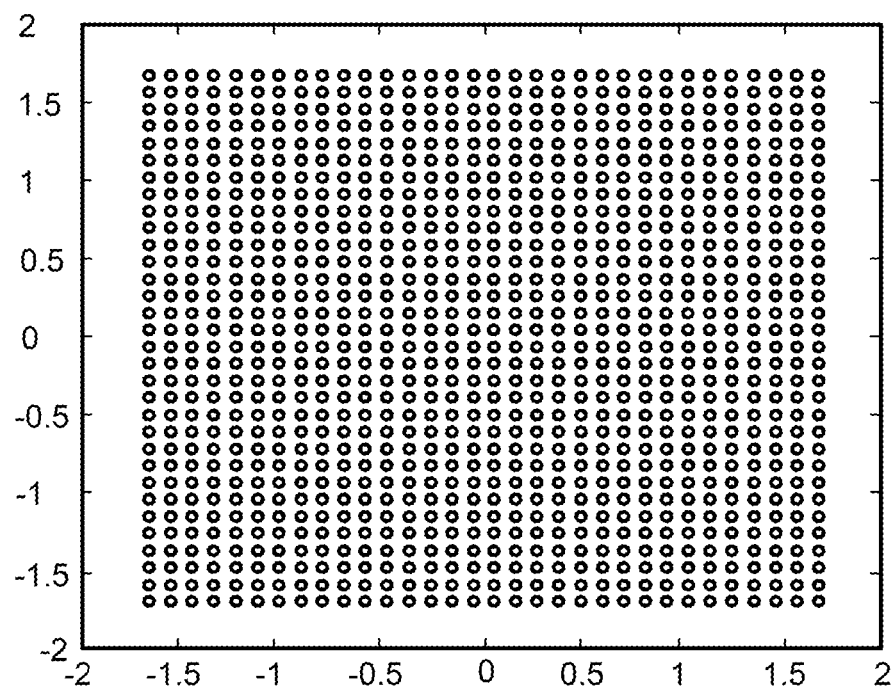
FIG. 16 illustrates a prior art QAM 1024 constellation.

With reference to FIG. 16, each quadrant of a QAM 1024 constellation map contains 256 points. The challenges that exist with QAM 256 become even more pronounced with QAM 1024. For example, accurately identifying an intended point on the constellation and determining its exact data value requires that two waves be accurately measured and interpreted at the symbol frequency. Accuracy is critical to maintain the BER or SER of the system, to reduce receiver processing, or worse and avoid the need for data retransmission.

In a particular Phase/amplitude-time use case, the Phase Channel is used to designate one of four values, provide increased data throughput. This use case leveraged the reliable data transmission characteristics of the ATM Channel and implements Phase Channel data to quadruple (4.times.) the effective data throughput. Analogous to QAM 1024, the value on the Phase Channel is associated with a quadrant, except that the actual data value is encoded on the ATM Channel wave, while the Phase Channel designates the "quadrant" location on the "constellation."

Figure 17:
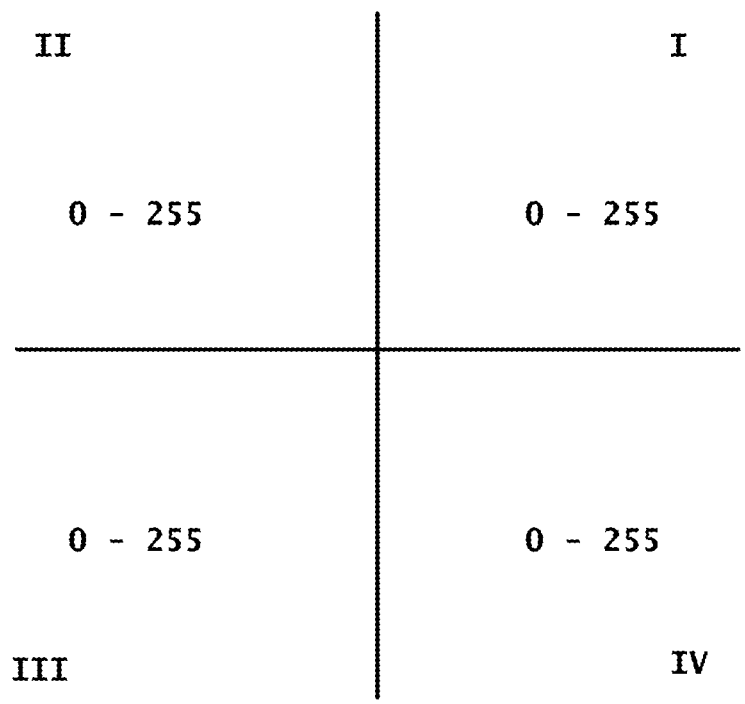
FIG. 17 illustrates an implementation of the phase channel to designate the quadrant value and the amplitude-time channel to provide an 8 bit data value for each quadrant.

With reference to FIG. 17, a QAM 1024 equivalent throughput implementation of Phase/amplitude-time could be envisioned as a superior solution. This is similar to QAM 1024 but with the benefits of the Phase amplitude-time modulation. This use case underscores the power that the Phase Channel brings to the ATM Channel by encoding just two bits of data on the Phase Channel and only 8 bits per symbol on the ATM Channel; a QAM 1024 equivalent data rate can be realized with Phase/amplitude-time modulation. In addition, the improved SNR and spectral utilization of the Phase amplitude-time modulation is maintained. Phase/amplitude-time throughput can be proportionally increased by adding additional bits to the Phase Channel.

These Phase Channel values can also be looked at as "channels" for the ATM data. In other words, three bits of Phase Channel data results in eight unique "channels" for the ATM data.

The ATM Channel signal is sent into a gain block and the input to the gain block is adjusted to achieve the compression point of the peak-to-peak value of the sine wave. The compression point is the non-linear portion of an amplifier where, as the input signal is increased, the output does not follow the input level. While Phase/amplitude-time technology is currently capable of using any one of the 32 harmonics, it is described herein with a focus on the third harmonic. The compression point of interest is the point where the entire third harmonic carrier and component information is located. Therefore, if the number of steps has distorted the sine wave by 30-40 dB, a third harmonic carrier 30 dB down from the fundamental frequency carrier amplitude will result. The input to the gain block is further adjusted so that the associated step components are equal to the sine wave at 3 times the carrier rate.

Adjusting the compression point described above within the amplifier (e.g., to about 2 or 3 dB of linear compression), the third harmonic can be used as a clock. The components around the third harmonic are the resulting data symbols. The Gaussian distributed concentration of energy (or data in this case) is equal in amplitude which can be advantageously used to optimize the Eb/No ratio, i.e., the signal energy in the bits over the noise floor. The steps of the Phase/amplitude-time sine wave represent two components: amplitude and phase. When those two components cross they appear as Fourier components around the third harmonic with a Gaussian distribution.

In conventional modulation, like FM transmission, the modulation rate of the signal is the frequency offset of the carrier being sent. The amount of deviation in frequency is the volume of the modulating signal. In phase modulation a carrier deviates in phase based on the modulating signal. With Phase/amplitude-time, using the harmonic, there is not a volume component, only the rate that is no longer in the channel spectrum, which results in a channel clear of modulation-produced noise.

The phase component, which is part of the energy of the Fourier component, is not being sent, and therefore, does not require spectrum. In the Phase/amplitude-time modulation scheme, only the amplitude step requires spectrum around the harmonic. Phase can be recovered in two ways. The first method is by quadrature detection of the amplitude component. Locking onto the harmonic, the correction for the lock also produces the phase component. When the amplitude and the phase cross a data bit is output in the detector.

With Phase/amplitude-time, there is only one amplitude step without fractional components that produce energy down to the noise floor. For example, a 100 KHz signal with 16 steps per sine wave would result in 1.6 Mb/s of data running through an 85 KHz channel (KTB for 85 KHz is negative 125 dBm). Therefore, transmitting that signal at "0" dBm, a signal-to-noise ratio of 125 dB is obtained.

Comparing Phase/amplitude-time to other modulation schemes, using Shannon's limit, Phase/amplitude-time produces a channel clear of in-band artifacts, having a data capability considerably more than would normally be sent, such as our 1.6 Mb in an 85 KHz channel. As a result, Phase/amplitude-time has a much greater signal-to-noise ratio than any other form of modulation.

Phase/amplitude-time modulation offers a level of immunity to noise because the amplitude and phase components are being sent in quadrature to each other. It is the crossover point of those two components that are detected for data in the ATM Channel. Since noise does not shift in Phase, typically the noise threshold itself can, be approached, with approximately a 2 dB signal-to-noise ratio, and still detect the data. Other conventional forms of modulation may require more than a 12 dB SINAD or 6 dB signal-to-noise for equal bit error rates (BER). Significant data corruption requires resending data multiple times to achieve a usable BER such as 10e−8. Noise in the channel typically reduces the signal-to-noise ratio, including the factors of noise floor kTB, insertion loss, amplifier noise, and the various artifacts produced. Thus, the usable signal power cannot be raised without also raising the noise in the channel.

However, since Phase/amplitude-time sends only the transient components, they can be sent at a very high level, resulting in a large Eb/No ratio, e.g., data can easily be detected even when the SNR is only 2 dB Eb/No.

The third harmonic can carry three times the phase data, generating as a digitally synthesized oscillator at the fundamental. The oscillator will generate distortion while generating the sine wave, depending, e.g., on the frequency of the clock, step size, and how monotonic the D to A converter is (whether it is an R2R ladder or other type). With an 8-bit R2R ladder or D to A converter, 160 dB per Hertz from the oscillator can be achieved at 10 kHz from the third harmonic carrier frequency.

In the typical case, the third harmonic has some random sideband and numerical noise, but it is 160 dB down at 10 KHz from the third harmonic carrier frequency. This is below the threshold of the amplitude of the Fourier components at the third order intercept point (IP3). As a result, the third harmonic noise is not a factor.

Turning now to description of multi-carrier effects, most advanced modulation schemes are used in multi-carrier environments, where noise is generated from many sources. Nevertheless, Phase/amplitude-time substantially maintains noise immunity whether from transmitting its own data or from crossover noise generated by other carriers. However, some, forms of modulation like Pulse Code Modulation (PCM), PSK31, AFSK, and various others have non-return-to-zero components that can occasionally interfere with the time slot Phase/amplitude-time is trying to receive. For example, in the case of television frequencies with many headroom components and other artifacts in the channel, there may be interference encountered at the rate of Phase/amplitude-time's phase, causing the bit error rate to degrade. However, it is estimated that the maximum incidence of these events is about 16%, because Phase/amplitude-time's Gaussian concentration of energy is 68% of the total energy. The remaining 1.6% is outside the complementary area of that part of the Gaussian concentration of energy. Statistically, the most interference Phase/amplitude-time could encounter would be 16% of the total time. Therefore, Phase/amplitude-time's noise immunity is extremely good.

The component energy being used is not generating additional noise in that portion of the spectrum around the given harmonic. There are also inter-modulation distortion components and other sideband-producing noise elements that are eliminated with a channel hand-pass filter.

In a particular example, if a band-pass filler has a 100 KHz pass band for transmission at 1.6 Megabits in a 100 KHz channel, a Signal-to-Noise (SN) ratio of approximately 80 dB is required based on Shannon's limit. With a theoretical noise floor of −124 dBm, the minimum signal power would be only −44 dBm with Phase/amplitude-time. If necessary, the 100 KHz channel bandwidth can be reduced and increasing the signal to noise ratio from 10 dB to 20 dB results in double the data rate usable in the channel.

Again, when using the third harmonic. Phase/amplitude-time essentially discards the fifth and seventh harmonic data and the two sidebands generated at one of the three frequencies where the data may exist, plus or minus the carrier frequency used. Although two concentrations of energy exist, they are not transmitted because they are filtered in the transmitter. These would simply add unnecessary energy to the channel and are not needed.

The Phase/amplitude-time signal is a single amplitude that can be transmitted at any desired power level. This is the energy associated with the harmonic. If random data is transmitted, it is a Gaussian concentration of energy (sine x/x), which can be placed on either sideband, or in the center of the third harmonic. This is accomplished by the symmetry of either the porches or steps during generation of the sine wave. Preferably, the energy concentration is placed on the high-frequency side of the harmonic carrier, with time coherence between the energy, amplitude, and carrier being sent. The amplitude of the harmonic carrier is a function of the total distortion of the sine wave itself, so it is not necessary to transmit that either for detection in the receiver.

Phase/amplitude-time modulation provides the flexibility of using the least significant bit, the next to least, or other combination, to generate the step size on the sine wave. The wave can be paused, and the chosen bit toggled as necessary, in addition, a bit from a previous location can be toggled in the lookup table, in advance of the current location, so a step or a porch is created. This accommodates many possible combinations.

Thus, not only can the associated concentration of energy be maximized around the harmonic, it is also possible to alternate between data combinations and create two additional concentrations of energy. Multiple channel combinations of bits can be transmitted. Trinary, dual binary, and many other combinations are also possible. As an added security benefit, these combinations can be made very complex so they cannot be decoded without the proper key sequence.

A significant aspect of Phase/amplitude-time modulation is the conservation of spectrum. Phase/amplitude-time uses spectrum when sending a change in data value, which shows up in the harmonic as intermodulation distortion products. These are Fourier components that result in transmitted energy. Since only data changes are being sent, and typical data is random, only 50% of the normally required energy is necessary to transmit. Therefore, the total power spectral density required is half, if it is desirable to send every bit, every other bit may be inverted. As a result, nearly all of this data is symmetrical and it becomes a classic Gaussian distribution of energy around the harmonic. However, it comprises only one half of the bandwidth energy normally required.

As a test example, a 100 KHz sine wave, with a 300 KHz data third harmonic, was used to send 1.6 Mb of data in 85 KHz. Shannon's Limit can lie estimated by: the log base2 of SNR is 0.332 times the SNR value expressed in dB. Assuming the SNR is 120 dB and ignoring the plus 1 and the numeric value, this value could be considered if the power level of the carrier were +30 dBm or one wait, as the resulting third harmonic carrier would be at approximately 0 dBm, and the theoretical noise floor would be −125 dBm. Converting the power ratio in dB to the numeric value and adding the plus 1, the result is SNR in dB times 0.332 times 85 KHz, which represents the total Shannon's limit given those parameters in Mb per second. In this case, it would result in 3.0101 Mbps. Dividing by 85 KHz, according to Shannon, the highest theoretical throughput possible would appear to be 35.41 bits per Hertz.

With a 30 dB amplifier, the channel has 120 dB of free dynamic range above the noise floor, and the noise in the channel is amplified by 30 dB. Subtracting 30 dB from 120 dB, the total SNR is reduced to 90 dB. Such factors compound and degrade the 39.84 bits per HZ to about 30 bits per Hz, e.g., the practical limit. While standard forms of modulation are severely affected by these factors, Phase/amplitude-dine allows data transport without some of these limiting factors having a significant effect.

Phase/Amplitude-Time Receiver Implementations

One simple receiver structure is a direct conversion or zero if the receiver filtered to receive only the harmonic and its components, in the 300 KHz example, such a receiver would look for the real and quadrature imagined components of the phase. The receiver would lock on the third harmonic, divide by three, take the 2 outputs, and check them for phase and amplitude where they cross. Since there is only one amplitude step size, the amplitude is a function of the power in the total energy concentration. If it is zero dBm, we would be detecting 200 millivolts. Noise would have to increase to 190 millivolts before it would interfere with data detection. The result is extraordinary noise immunity. The fact that the noise is not coherent with the data is also unique to Phase/amplitude-time.

Although not required, a cost-effective method of detection is a Digital Signal Processing (DSP) engine, which can provide more complex features with Phase/amplitude-time modulation/demodulation. A universal DSP engine for Phase/amplitude-time has been demonstrated for a range of applications.

IQ Demodulator Implementation

In some implementations, the receiver includes an IQ demodulator similar to those used in cell phones. The IQ demodulator can be used to set the clock divider by three and decipher time slots to determine when to look for data and when not to look for data. The DSP requires a math model to efficiently decipher data without wasting clock cycles. The IQ demodulator is an incident and quadrature detector that has a ninety-degree phase shift between two double-balanced mixers. The input signal drives the R ports of the double balanced mixers. The local oscillator is generated at the carrier rate of the third harmonic. The ports are in quadrature to each other.

As a result, when an output appears at one port, the quadrature image appears at the other port. One output represents phase and the other represents amplitude. Since they appear as opposite saw tooth waves, where they cross each other, complementary values result in a one that takes the form of a clearly defined amplitude of energy pulse. It is easily detectable, even when combined with impairments such as noise, abasing, or other artifacts normally in the channel.

Receiver Band Pass Filter Requirements

In one implementation, the ATM Channel of the Phase/amplitude-time modulation technique utilizes an elliptical filter. Elliptical filters offer sharp, frequency cut-off; however, they are also characterized by group delay. This means not all frequencies pass through the filter with the same time delay. This group delay is a change in phase, depending on frequency, which is linear (logarithmically linear) with the frequency. Therefore, the filter is configured to minimize group delay to avoid upsetting the phase component that Phase/amplitude-time is trying to detect. As the number of bits received increases, group delay becomes increasingly important at the upper corner frequency of the filter.

At the upper corner frequency, the filter rejects frequencies above the cut-off frequency and accepts those frequencies below the cut-off frequency. This creates an impedance discontinuity that causes reflections measured as return loss. Return loss is the voltage ratio of the power 3 being reflected and the power being accepted, such that the corner frequency wrinkles the phase component of whatever the transfer slope is. This condition creates distortion in the area Phase/amplitude-time in which is trying to detect the data, components. So, both group delay and phase compensation of the group delay are important considerations. A well-constructed elliptical filter can effectively deal with the problems outlined above for Phase/amplitude-time applications.

Carrier Wave Phase Modulation

Figure 18:
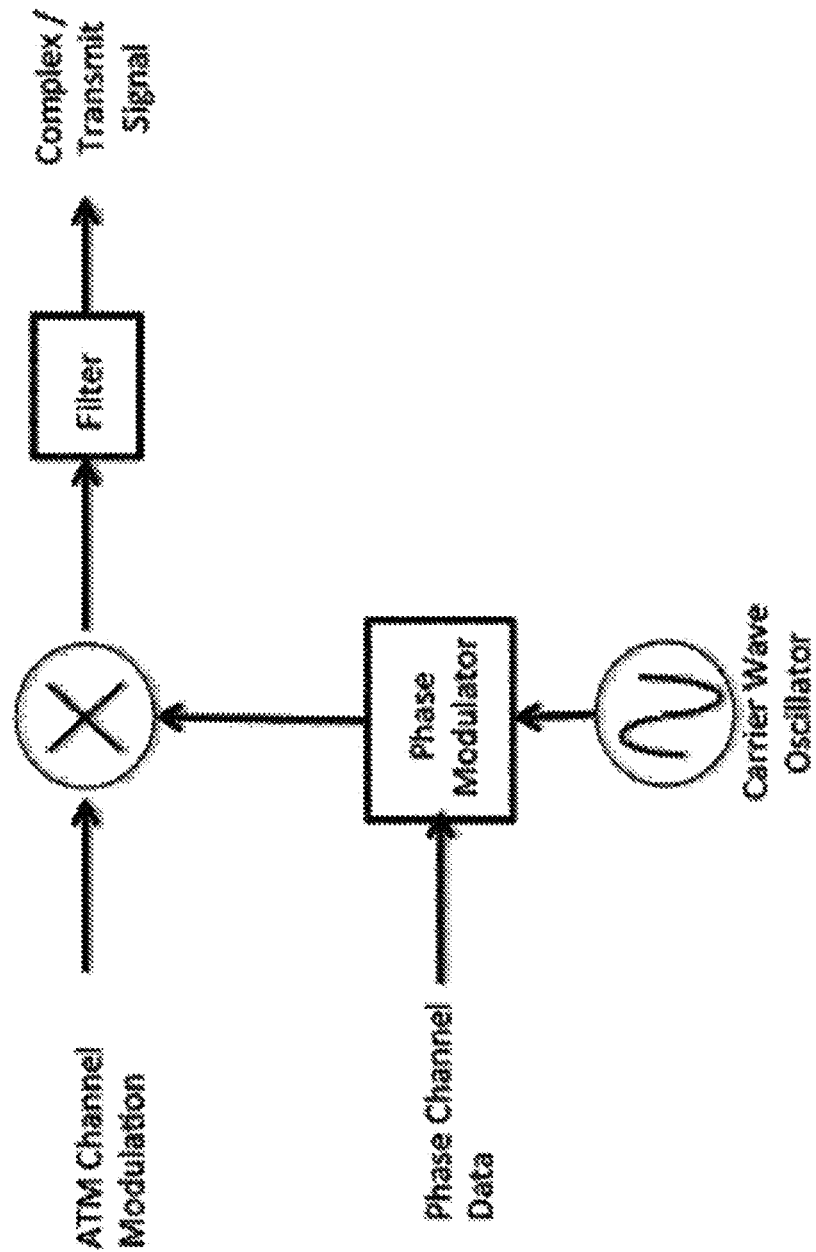
FIG. 18 illustrates a combiner for combining ATM and a phase-modulated carrier wave.

As set forth in detail herein, embodiments of the present invention mix an ATM channel and a Phase channel, prior to the introduction of a carrier wave frequency, to produce a complex modulation signal, (e.g., as shown in FIG. 6). As illustrated in FIG. 18, in some embodiments, the carrier wave itself may be phase modulated and mixed with the ATM modulation channel to generate a transmittable complex wave. In such embodiments, a receiver performs data detection at the carrier wave, and extracts the ATM channel from the transmitted complex wave for processing as described herein. For example, a receiver's circuitry detects the carrier phase modulation to capture the Phase Channel data, and recovers the ATM channel modulation to interpret the ATM channel data.

Rather than combining the ATM and Phase channels first prior to the introduction of any carrier wave frequency and then shilling the combined ATM and phase channel signal to the carrier wave frequency, as is possible according to an embodiment, at least one other embodiment can phase modulate the carrier frequency of the system and combine the phase modulated carrier frequency with the ATM channel modulation signal to obtain an ATM and phase modulated carrier wave frequency signal. The ATM and phase modulated carrier wave frequency signal can serve as a transmittable complex wave. The Phase Channel is implemented on the carrier wave by encoding the data directly on the carrier frequency using direct phase modulation. The bits per symbol data rate may be from 1 to a bits. This allows for higher data rates on the Phase Channel by leveraging the carrier frequency.

Such an implementation can be used with data detection at the carrier wave frequency of the receiver, and the ATM channel can be downconverted and extracted from the transmitted signal for processing, in the receive circuitry, the carrier phase modulation can be detected to capture the Phase Channel Data while the ATM Channel Modulation can be recovered to interpret the ATM Channel Data.

Multi-Dimensional Modulation

Today's signal modulation technology entirely supports a sequential approach to the transferring of digital data from transmitter to receiver. The modulation of this data upon the transmitted signal is the same for all data sent regardless of utilization of the data by the receiver. For example, whether the data is a synchronizing value, a destination or an origination address, or the actual data being transmitted, the modulation and medium used is exactly the same. It is up to the receiver to determine the function, of the data related to the position of the data value in the communication sequence.

At the modulation level, each symbol contains a fixed number of bits (e.g., from 1 to 8 bits of data depending on the modulation). The number of bits per symbol does not vary from transmission to transmission. Symbols are serially transmitted, received and demodulated, in some applications (e.g., TCP/IP) the symbols are grouped into packets of varying size from 64 bytes and larger. Each packet may contain a combination of information about the data being sent (e.g., control data) and the data itself. The packets am serially transmitted.

The data, after demodulation, is interpreted according to the protocol being used by the system sending and receiving the modulated data. In one example, the Ethernet protocol is used. The Ethernet protocol organizes bytes into frames that are further organized into packets.

Figure 19:
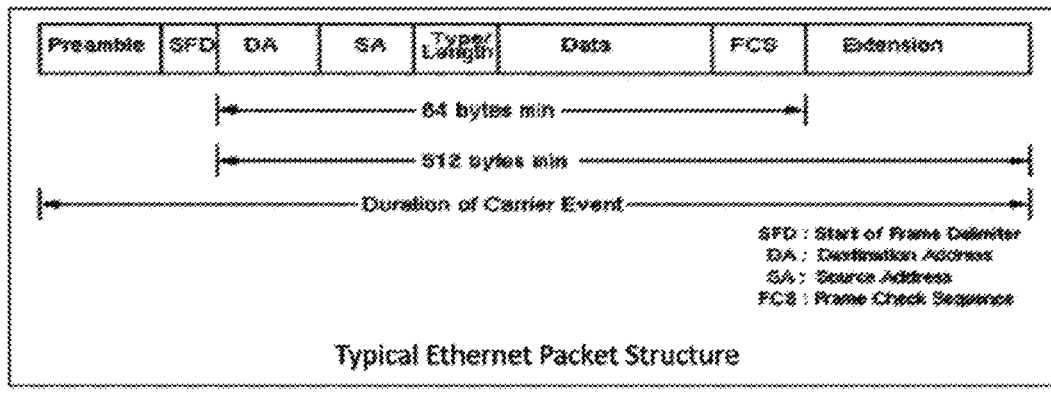
FIG. 19 is a block diagram of an Ethernet packet.

As illustrated in FIG. 19, data transmitted via Ethernet is formatted with a preamble, a repeated pattern of 56 "1s" and "0s" to let the receiver know that a message is coming; followed by the Start Frame Delineator (SFD), which is a single fixed value byte. This is followed by a header, which indicates the message originator and the destination address. The transmitter uses the header to inform the receiver that the message is for the receiver, and what to expect in the upcoming transmission. The header is followed by the payload (i.e., the actual data being transmitted), and a frame check sequence (FCS), used for error detection. Finally, an end of frame message is transmitted, which is followed by an interpacket gap. The process repeats for the next message.

Ethernet serially transmits both control information and the data payload itself, regardless of the size of the dam payload. Because the same amount of control data (i.e., the preamble, SFD, header, FCS, end of frame, and interpacket gap) is transmitted regardless of the payload size, Ethernet suffers from protocol overhead. The smaller the data payloads is, the less efficient the utilization of the network is. Efficiency for an Ethernet network can be as low as 30% for today's Ethernet networks regardless of the transfer speeds achieved.

In one view, a network protocol (e.g., Ethernet) is actually a byproduct of the modulation used to convey the information. Because the modulation is single dimensional, the receiver must not only interpret the values of the data transmitted, but maintain the protocol or format in which the information is being conveyed. Accordingly, embodiments of the present invention provide a multi-dimensional modulation for transmitting data network protocols.

Figure 20:
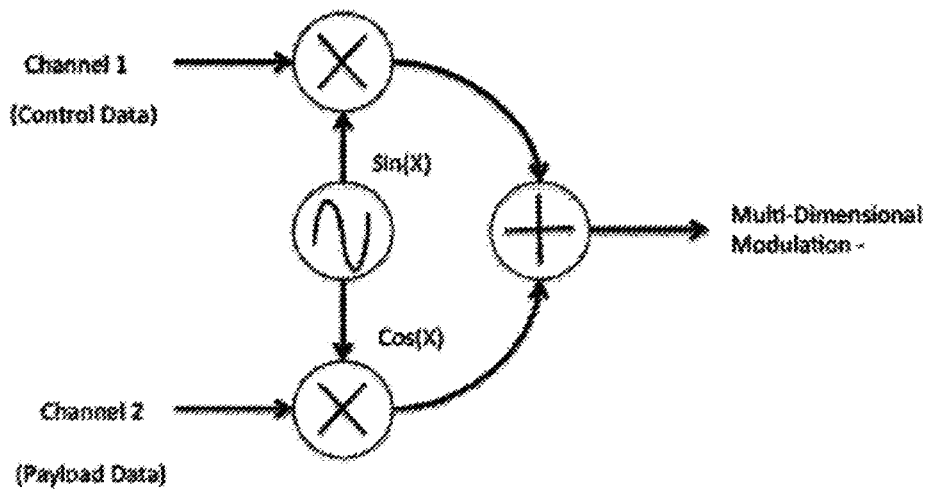
FIG. 20 illustrates a combiner for combining control data and payload data into a multi-dimensional modulation.

By utilizing a complex, multi-channel physical modulation scheme, the Control information may be separated from the Payload Data of the packet and sent simultaneously on the same signal but on separate channels. In one example, the Phase/Amplitude Time Modulation (ATM) technology may be used as a multi-dimensional physical layer signal modulation to transmit a network protocol that includes both control and payload data (e.g., Ethernet). As described here, the Phase/Amplitude Time Modulation (ATM) enables a simultaneous, multi-channel data delivery infrastructure. FIG. 20 illustrates an embodiment of a multi-dimensional modulation scheme. As illustrated, channel 1 is modulated with control data, and channel 2 is modulated with payload data, generating a transmitted signal may be modulated with two channels of information. Channel 1 and channel 2 may be either the ATM channel or the Phase channel.

For highest efficiency. Phase/Amplitude Time Modulation (ATM) allows for the "payload" of the data to be transmitted on one channel of the modulation (i.e., a Payload Channel). While all of the control data associated with, and normally contained sequentially on either side of the payload data, may be sent simultaneously on the other channel (i.e., the Control Channel), completely independent of the data payload.

Figure 21:
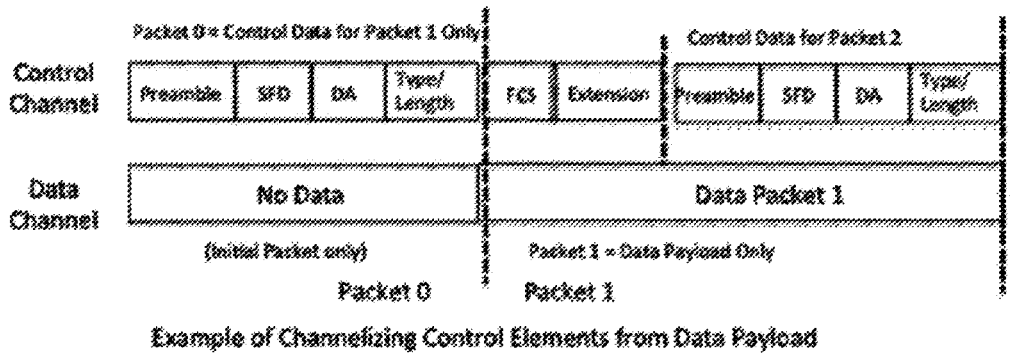
FIG. 21 illustrates the multi-dimensional transmission of the Ethernet protocol, according to one embodiment.

FIG. 21 illustrates an exemplary embodiment of the multi-dimensional transmission of the Ethernet protocol. In the illustrated embodiment, the initial frame of the transmission establishes the connection and transmits the header information for the Ethernet packet (i.e., Packet 1) on the Control Channel and no data on the Data Channel. In the next frame, the post-payload control information (i.e., FCS and Extension) for Packet 1 is transmitted with the header information for the next Ethernet packet (i.e., Packet 2) on the Control Channel, while the payload data for Packet 1 is transmitted simultaneously on the Data Channel. Subsequent Ethernet packets are transmitted in a similar fashion, with the Control channel of a frame transmitting the header information for a packet and the post-payload data of a previous packet, and the Data Channel of the frame simultaneously transmitting the data payload of the previous packet.

After the first frame, every symbol can carry both control information and data payload. Accordingly, control and payload data may be transmitted in parallel, rather than serially. This increases network efficiency. Only the preamble and end of message types of protocol control actions to detract from the data throughput.

The Control and Data Channels may be viewed as domains for the transmission of data. In such case, the domains are both contained within the modulation or Physical Layer of the network. The result is an overall more efficient performance by optimizing the functions in both of these domains.

The result of this approach is to provide a communication protocol, based on modulation features, that is highly efficient and maximizes the available throughput of the network without an increase in carrier frequency. In some embodiments, further parallelizing of this modulation is possible through higher throughput frequency support and additional channels.

In accordance with at least one embodiment, a modulation system and method are provided for technologies utilizing two or more intermediate frequencies (IFs). An IF is a frequency to which a signal is shifted as an intermediate step in frequency conversion for transmission or reception. Some communication systems use a zero IF architecture, in which frequency conversion occurs directly between a baseband signal at or near direct current (DC), having a fundamental frequency at or near zero Hertz, and a carrier frequency at which the signal is transmitted or received, for example, via an antenna in the case of wireless communication. Other communication systems use an IP stage between a baseband frequency stage and a carrier frequency stage. In various embodiments, a receive carrier frequency signal may be converted to the IF and the IF converted to a baseband frequency signal, a baseband frequency signal may be converted to the IF and the IF converted to a transmit carrier frequency signal, or the IF conversion may be performed for both receive and transmit signals. Some communication systems may use a plurality of IF stages in series to serially perform multiple conversions among multiple IFs. As examples, a system using two IFs can be called a double conversion system, and a system using three IFs can be called a triple conversion system.

Still other communication systems can use multiple IF frequencies in a non-serial manner. As an example, at least one IF can be combined with at least one other IF to yield a complex modulated signal. As one example, the complex modulated signal can be used to provide a carrier frequency signal. As another example, the complex modulated signal can be used to provide a baseband frequency signal. As another example, the complex modulated signal can be used to provide another IF signal.

Dual/Multi IF Modulation

Figure 22:
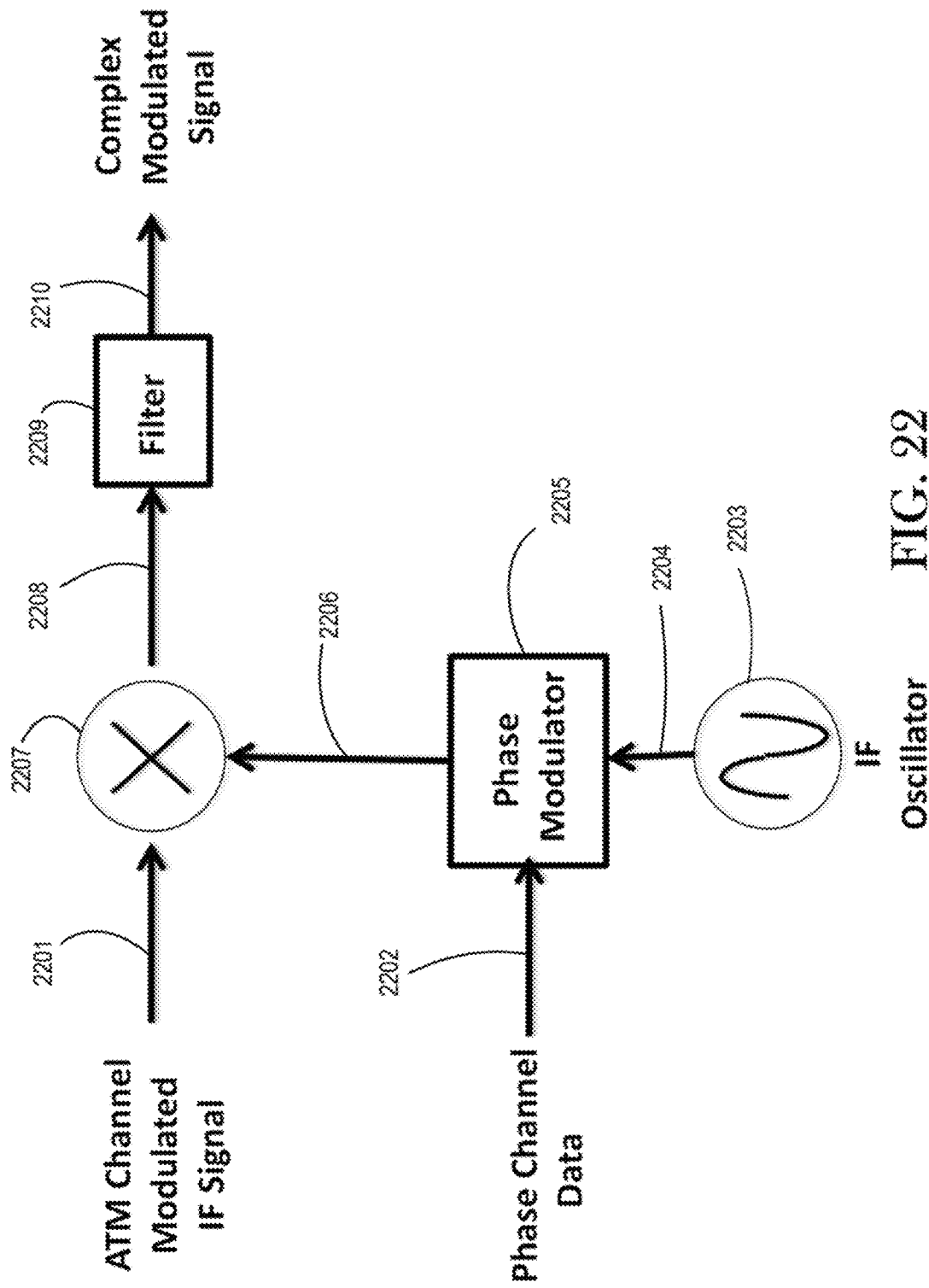
FIG. 22 is a block diagram illustrating a combiner for combining a first IF signal and a second IF signal in accordance with at least one embodiment.

FIG. 22 is a block diagram illustrating a combiner for combining a first IF signal and a second IF signal in accordance with at least one embodiment. An ATM channel modulated IF signal is provided at input 2201. A phase channel data signal is provided at input 2202. An IF oscillator 2203 (e.g., a local oscillator (LO)) provides an output coupled to input 2204. Phase modulator 2205 receives input 2202 and input 2204. Phase modulator 2205 modulates the IF signal at input 2204 with the phase channel data at input 2202 to provide a modulated IF signal at input 2206. Combiner (e.g., mixer) 2207 receives the ATM channel modulated IF signal at input 2201 and the modulated IF signal at input 2206 and combines (e.g., mixes) them to provide an unfiltered complex modulated signal at input 2208. Filter 2209 receives the unfiltered complex modulated signal at input 2208 and filters (e.g., bandpass filters) it to provide a complex modulated signal which has been filtered (e.g., to remove other images generated by the combiner 2207) at output 2210.

As illustrated in the example shown in FIG. 22, at least one embodiment is applicable to systems that have more than one stage of Intermediate Frequency signals. An example of this is, but is not limited to, a Satellite Modem. In the current technology utilized in this application, the data is modulated at an IF lower frequency, such as 1 MHz, and this modulated signal is then mixed with a tunable L band (0.8-1.5 GHz) signal. This unconverted mixed signal is used as an input to the system Block Up Converter (BUG) to generate the higher frequency signal transmitted to the satellite. This L Band signal is currently only modulated by the lower frequency data modulated signal.

In accordance with an embodiment, the Phase channel is implemented on the L Band signal and subsequently mixed with the lower frequency, ATM channel modulated IF signal. By applying phase modulation to the L band frequency, the effective data rates of the modulation are increased by the both the higher frequency as well as the level of phase modulation implemented. Utilizing unique modulation on each channel provides the ability to transmit and receive independent or complimentary data on each channel.

In accordance with at least one embodiment, there is a secondary IF wave that is phase modulated and then mixed with the ATM modulation channel to create a transmittable complex wave. The difference is that the Phase Channel is implemented on a different IF frequency from the ATM Channel. These two IF signals are mixed and filtered to produce a single, complex modulated signal. Thus, a dual IF wave approach can be provided.

In accordance with at least one embodiment, the Complex Waveform can include using additional Intermediate Frequencies present in some systems, and/or subsystems, as the Phase Channel. The Amplitude/Time modulated channel and an independent Phase modulated channel are combined to comprise the complex modulated signal. Accordingly, the Phase Channel can be mixed to an IF signal utilized within the system, and/or subsystem. This Phase Modulated IF signal can then be mixed with the ATM IF signal and filtered to create a different version of the complex waveform.

There are applications in systems that have more than one stage of intermediate Frequency signals. An example of this is, but is not limited to, a Satellite Modem. In the current technology utilized in this application, the data is modulated at an IF lower frequency, such as 1 MHz, and this modulated signal is then mixed with a tunable L hand (0.8-1.5 GHz) signal. This up-converted mixed signal is used as an input to the system Block Up Converter (BUC) to generate the higher frequency signal transmitted to the satellite. This L Band signal is currently only modulated by the lower frequency data modulated signal.

In such an embodiment, the Phase channel can be implemented on the L Band signal and subsequently mixed with the lower frequency, ATM channel modulated IF signal. By applying phase modulation to the L band frequency, the effective data rates of the modulation can be increased by the both the higher frequency as well as, the level of phase modulation implemented. Utilizing unique modulation on each channel can provide the ability to transmit and receive independent or complimentary data on each channel.

In such an implementation, there can be a secondary IF wave that is phase modulated and then mixed with the ATM modulation channel to create a transmittable complex wave. The difference is that the Phase Channel can be implemented on a different IF frequency from the ATM Channel. These two IF signals can be mixed and filtered to produce a single, complex modulated signal.

This implementation requires data detection after the removal of the carrier wave of the receiver, and separately from the extracting data from the ATM channel from the transmitted signal for processing. In the receive circuitry, the IF phase modulation is detected to capture the Phase Channel Data while the ATM Channel Modulation is recovered separately to interpret the ATM Channel Data. FIG. 2 below illustrates this dual IF wave approach.

Figure 23:
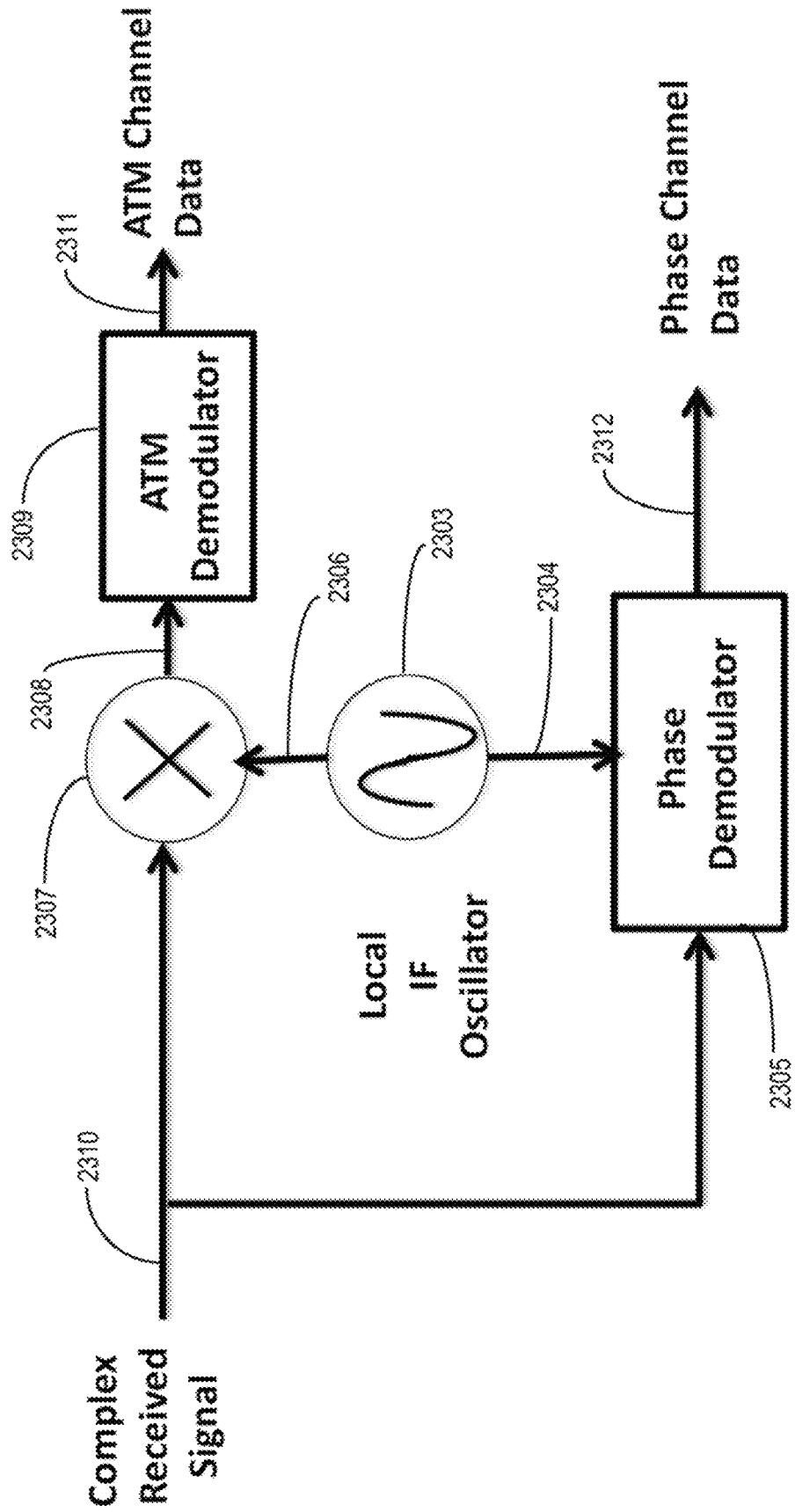
FIG. 23 is a block diagram illustrating an intermediate frequency local oscillator (IF-LO) receiver for receiving a complex receive signal in accordance with at least one embodiment in accordance with at least one embodiment.

FIG. 23 is a block diagram illustrating an intermediate frequency local oscillator (IF-LO) receiver for receiving a complex receive signal in accordance with at least one embodiment in accordance with at least one embodiment. A complex receive signal is received at input 2310 and is applied to an input of combiner 2307 (e.g., a mixer) and to an input of phase demodulator 2305. An IF-LO signal is generated at IF-LO 2303 and applied to input 2306 of combiner 2307 and to input 2304 of phase demodulator 2305. Combiner 2307 combines (e.g., mixes) the complex receive signal at input 2310 with the IF-LO signal at input 2306 to provide a frequency shifted image signal at input 2308. The frequency shifted image signal is an image of the complex receive signal at input 2310 but with the frequency shifted by an amount of the IF-LO signal at input 2306. ATM demodulator 2309 receives the frequency shifted image signal at input 2308 and demodulates the signal to provide an ATM channel data signal at output 2311.

Phase demodulator 2305 receives the complex receive signal at input 2310 and uses the IF-LO signal at input 2304 to perform phase demodulation to provide a phase channel data signal at output 2312.

Figure 24:
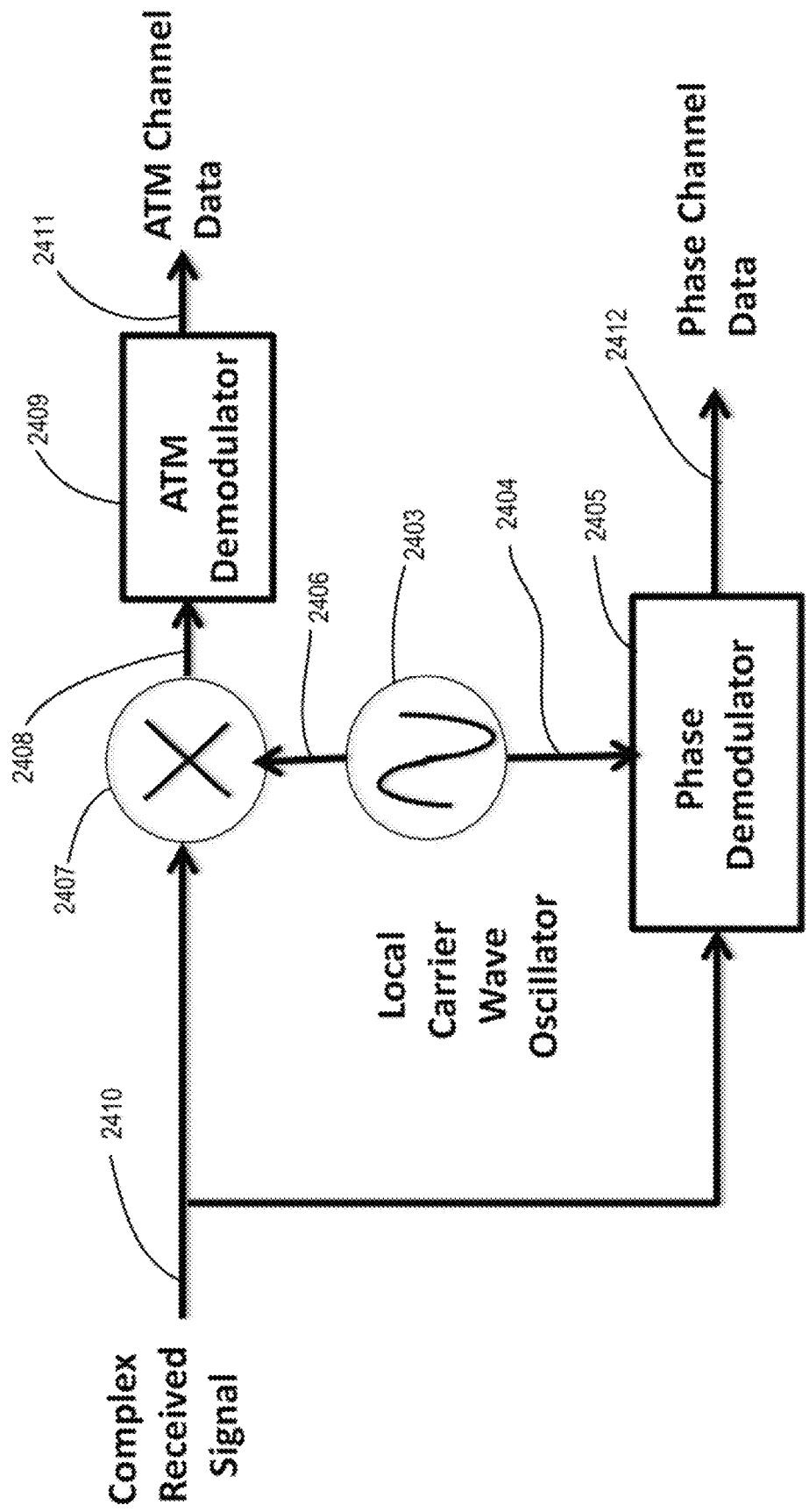
FIG. 24 is a block diagram illustrating a carrier wave local oscillator (CW-LO) receiver for receiving a complex receive signal in accordance with at least one embodiment.

FIG. 24 is a block diagram illustrating a carrier wave local oscillator (CW-LO) receiver for receiving a complex receive signal in accordance with at least one embodiment. A complex receive signal is received at input 2410 and is applied to an input of combiner 2407 (e.g., a mixer) and to an input of phase demodulator 2405. A CW-LO signal is generated at CW-LO 2403 and applied to input 2406 of combiner 2407 and to input 2404 of phase demodulator 2405. Combiner 2407 combines (e.g., mixes) the complex receive signal at input 2410 with the CW-LO signal at input 2406 to provide a frequency shifted image signal at input 2408. The frequency shifted image signal is an image of the complex receive signal at input 2410 but with the frequency shifted by an amount of the CW-LO signal at input 2406. ATM demodulator 2409 receives the frequency shifted image signal at input 2408 and demodulates the signal to provide an ATM channel data signal at output 2411.

Phase demodulator 2405 receives the complex receive signal at input 2410 and uses the IF-LO signal at input 2404 to perform phase demodulation to provide a phase channel data signal at output 2412.

Non-Linear Amplitude Time Modulation

In accordance with at least one embodiment, non-linear values can be used to represent elements of information on a waveform. In accordance with at least one embodiment, a "step" to encode an element of information on a waveform can include a non-linear set of values to represent the bit value. Thus, a step need not be limited to an advance or a hold of value. In this implementation, a dynamic and programmatic set of values utilized at specific and programmatic locations on the modulated wave are used to represent the data value. Using less abrupt signal characteristics can allow for better spectral efficiency by limiting the higher frequency components of the signal. Dynamic wave shaping also can be valuable in overcoming transmission channel impediments. As an example, each element of information encoded on a waveform can be shaped as desired, for example, by specifying numerous points at which the level can change during the duration of the element of information. The number of such numerous points can be increased, for example, by using a faster digital-to-analog converter (DAC) to generate the waveform according to a larger number of more frequent samples. As an example, the shaping of the portion of the waveform representing the element of information can provide a "smoothed" step.

Figure 25:
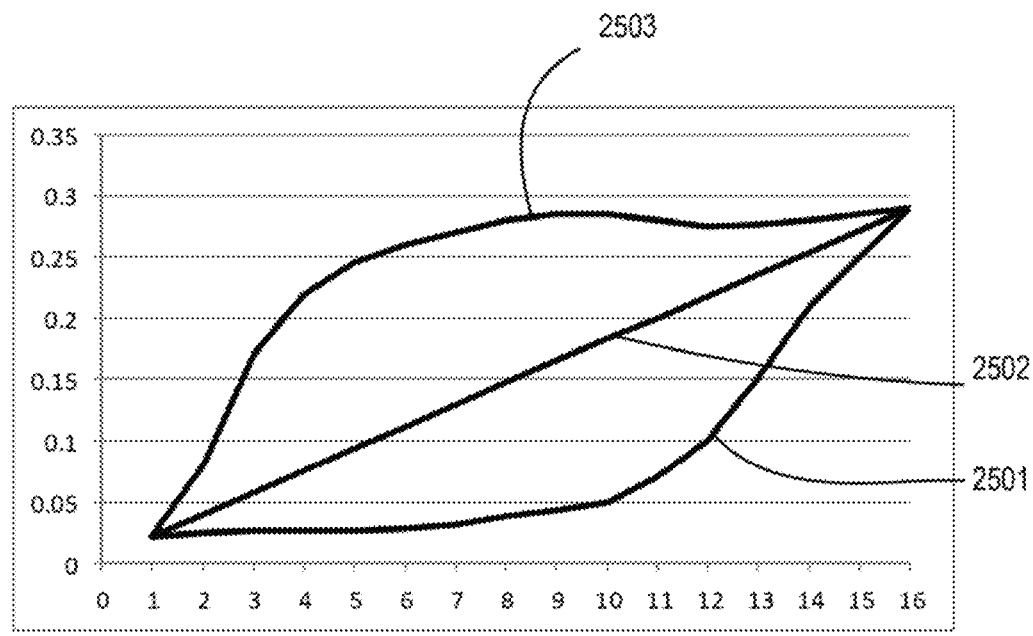
FIG. 25 is a block diagram illustrating a non-linear wave shaping relationship in accordance with at least one embodiment. Different curves can be used to represent different values of information.

FIG. 25 is a block diagram illustrating a non-linear wave shaping relationship in accordance with at least one embodiment. Different curves can be used to represent different values of information. As an example, each of levels 2501, 2502, and 2503 can be used to represent a different value of information. Various encoding mappings are possible, such as curve 2501 representing a first binary value and curve 2502 representing a second binary value, curve 2502 representing a first binary value and curve 2503 representing a second binary value, curve 2501 representing a first binary value and curve 2503 representing a second binary value, curve 2501 representing a first ternary value, curve 2502 representing a second ternary value, and curve 2503 representing a third ternary value. Binary values are expressed in base two, with each binary digit referred to as a bit. Ternary values are expressed in base three, with each ternary digit referred to as a trit. As the logarithm to the base 2 of 3 is approximately 1.5849625, a trit can ideally express over 58 percent more information per digit than a bit. However, as information is typically expressed in bits in modern information processing and communication systems, conversion from bits to trits and back to bits can depart from the ideal but still provide significant per-digit improvements, such as improvements from 50% to more than 58%, depending on the particular bit-to-trit ratio chosen, for relatively low and easily implemented bn-to-tm ratios. As shown, the single element of information is specified according to 16 level values, but any number of level values within the system limitations can be supported.

While bits (binary digits) and trits (ternary digits) are shown, it should be understood that digits of higher bases, such as base four, base five, base six, base seven, base eight, and beyond may be employed. For example, when analog-to-digital converters (ADCs) and digital-to-analog converters (DACs) having higher resolution are used, higher bases of digits may be used to support more possible values per element of information along a portion of a carrier waveform.

The non-linear characteristics of the step values may also be more extreme in nature depending on the application, as in the example described below. By creating a larger differential voltage level during the step location/duration, the signal value is accentuated. These extreme voltage differentials can create a more pronounced energy level in the step and can make the modulation more immune to channel noise challenges and other impediments.

Figure 26:
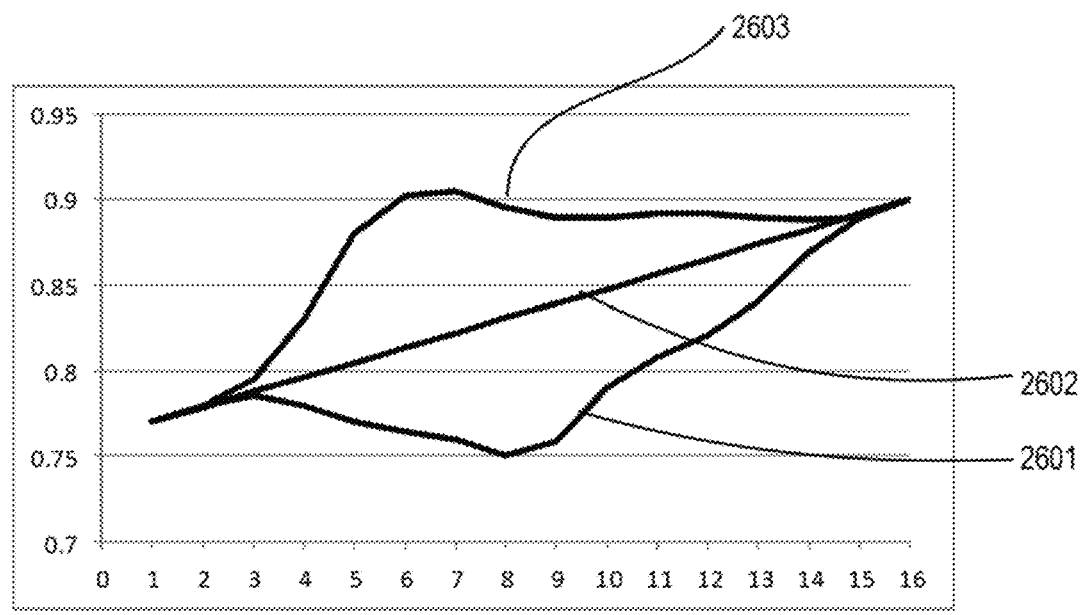
FIG. 26 is a block diagram illustrating a non-linear wave shaping relationship in accordance with at least one embodiment.

FIG. 26 is a block diagram illustrating a non-linear wave shaping relationship in accordance with at least one embodiment. As above, different curves can be used to represent different values of information. As an example, each of levels 2601, 2602, and 2603 can be used to represent a different value of information. Various encoding mappings are possible, such as curve 2601 representing a first binary value and curve 2602 representing a second binary value, curve 2602 representing a first binary value and curve 2603 representing a second binary value, curve 2601 representing a first binary value and curve 2603 representing a second binary value, curve 2601 representing a first ternary value, curve 2602 representing a second ternary value, and curve 2603 representing a third ternary value.

As can be seen by comparing the shapes of the curves in FIG. 26 to the shapes of the curves in FIG. 25, the changes in level of the waveform can occur at different rates and different points in time along a portion of time during which a portion of a waveform representing an element of information such as a bit, a trit, or a digit of a higher base than three is encoded on a carrier wave.

It may be noted that the x-axis scales on both FIG. 25 and FIG. 26 correspond to values from 1 to 16. As noted above, those 16 values correspond to the single element of information being specified according to 16 level values in the illustrated examples, but any number of level values within the system limitations can be supported. For example, each element of information could be specified according to 1 to N values pertaining to the shape of the portion of the waveform corresponding to the element of information.

It may be noted that the y-axis scale of FIG. 25 corresponds to values from approximately 0.025 to approximately 0.29, but the y-axis scale of FIG. 26 corresponds to values from approximately 0.75 to approximately 0.91. As noted elsewhere, elements of information can be defined along various portions of a sinusoidal waveform. Those elements of information defined along portions of a cycle of a sinusoidal waveform closer to a zero crossing would have y-axis values closer to zero. Elements of information defined along portions of a cycle of a sinusoidal waveform closer to a positive peak would have y-axis values closer to a normalized value of 1. Elements of information defined along portions of a cycle of a sinusoidal waveform closer to a negative peak would have y-axis values closer to a normalized value of −1. Thus, FIGS. 25 and 26 illustrate not only exemplary shaping of elements of information but also exemplary location of elements of information along a cycle of a sinusoidal waveform. Other shapings and locations may be implemented as other examples, in accordance with at least one embodiment, either or both of the shaping and location of the elements of information may be programmatically controlled.

In limited bandwidth applications, it can be important to use as small of a spectral footprint as possible. Abrupt voltage changes can create high frequency components in the signal requiring more frequency spectrum to transmit all of these frequency components. The "smoothing" of the edges of the steps can reduce the high frequency components.

In addition to limiting the higher frequencies, dynamic signal shaping can also allow for exaggerating the voltage differential in the step locations. This exaggerated voltage differential approach can be used to overcome high noise signal conditions and other interference environments.

N Levels of Complex Signal Integration

In accordance with at least one embodiment, multiple ATM and Phase Channel data streams can be combined in a sequential quadrature method. As an example, by using more than one stage in series, three or more channel signals can be combined into a single signal. ATM and Phase Channels can be combined to include 1 to n additional ATM and/or Phase Channels according to a sequential quadrature methodology.

As otherwise described herein, an ATM channel signal can be combined with a Phase Channel signal in quadrature. The combined resulting signal can be combined with one or more additional ATM and/or Phase Channels sequentially and in quadrature to create a multi-stage transmittable complex wave. The information elements per symbol data rate created by each channel may be from 1 to n bits.

Figure 27:
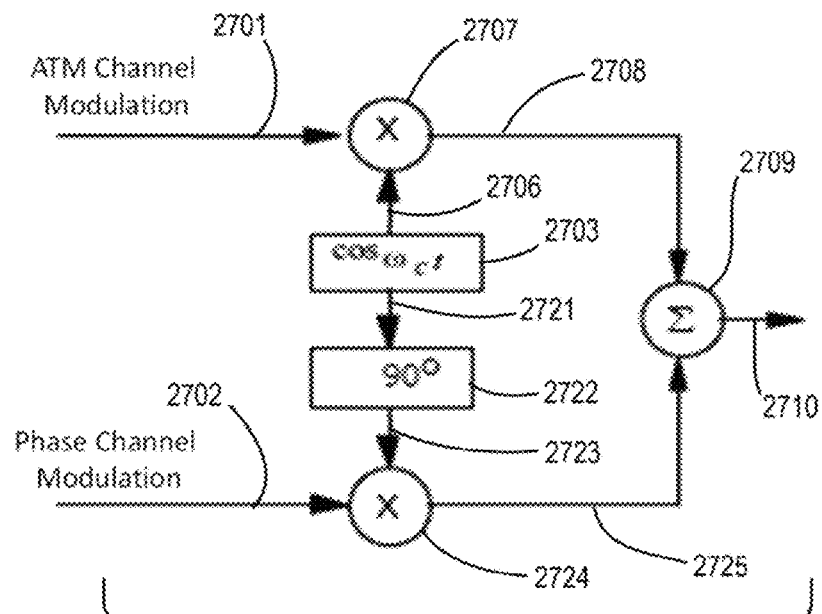
FIG. 27 is a block diagram illustrating a single-stage combiner for combining an ATM channel modulation signal and a phase channel modulation signal in accordance with at least one embodiment.

FIG. 27 is a block diagram illustrating a single-stage combiner for combining an ATM channel modulation signal and a phase channel modulation signal in accordance with at least one embodiment. The combiner of FIG. 27 is in the form of a single stage 2791. An ATM channel modulation signal is received at input 2701. A phase channel modulation signal is received at input 2702. The ATM channel modulation signal at input 2701 is provided as an input to combiner 2707 (e.g., a mixer) The phase channel modulation signal at input 2702 is provided as an input to combiner 2724.

A sinusoidal signal source 2703, for example a cosine oscillator, provides a signal $\cos(\omega_c(t))$, where $\omega_c$ is the angular frequency, equal to $2\pi f$, where f is the frequency, and where t is time, at input 2706 and at input 2721. Combiner 2707 (e.g., a mixer) receives the ATM channel modulation signal at input 2701 and the signal at input 2706 and provides a frequency shifted image signal at input 2708. A ninety-degree phase shift element 2722 receives the signal at input 2721 and shifts its phase by ninety degrees, providing a phased shifted sinusoidal signal, for example a sine wave signal, at input 2723. Combiner 2724 (e.g., a mixer) receives the phase channel modulation signal at input 2702 and the phase shifted sinusoidal signal at input 2723 and provides a frequency shifted image signal at input 2725. Combiner 2709 (e.g., an adder) receives the frequency shifted image signal at input 2708 corresponding to the ATM channel modulation signal and the frequency shifted image signal at input 2725 corresponding to the phase channel modulation signal and combines (e.g., adds the signals to provide an output signal at output 2710.

Figure 28:
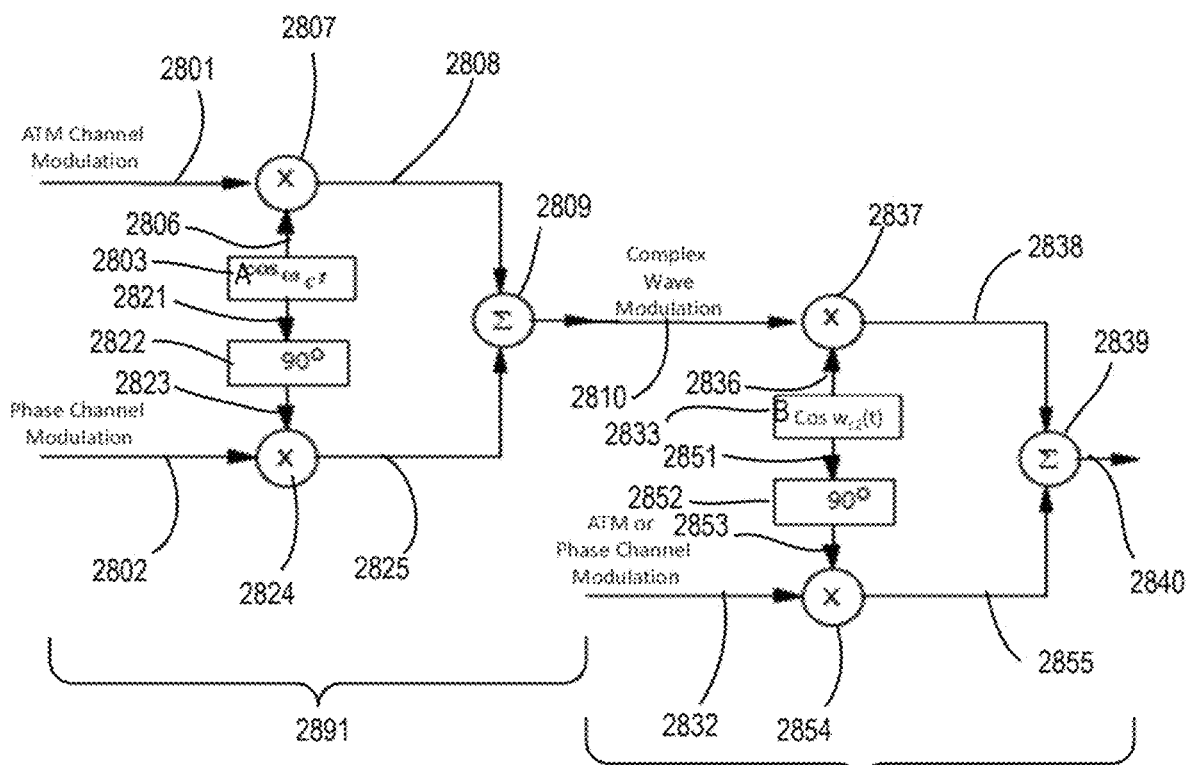
FIG. 28 is a block diagram illustrating a two-stage combiner for combining an ATM channel modulation signal, a first phase channel modulation signal, and a second phase channel modulation signal in two stages in accordance with at least one embodiment.

FIG. 28 is a block diagram illustrating a two-stage combiner for combining a an ATM channel modulation signal, a first phase channel modulation signal, and a second phase channel modulation signal in two stages in accordance with at least one embodiment. The output of a first stage 2891 is coupled to an input of a second stage 2892.

An ATM channel modulation signal is received at input 2801. A phase channel modulation signal is received at input 2802. The ATM channel modulation signal at input 2801 is provided as an input to combiner 2807 (e.g., a mixer). The phase channel modulation signal at input 2802 is provided as an input to combiner 2824.

A sinusoidal signal source 2803, for example a cosine oscillator, provides a signal $A \cos(\omega_c(t))$, where A is a gain coefficient, where $\omega_c$ is the angular frequency, equal to $2\pi f$, where f is the frequency, and where t is time, at input 2806 and at input 2821. Combiner 2807 (e.g., a mixer) receives the ATM channel modulation signal at input 2801 and the signal at input 2806 and provides a frequency shifted image signal at input 2808. A ninety-degree phase shift element 2822 receives the signal at input 2821 and shifts its phase by ninety degrees, providing a phased shifted sinusoidal signal, for example a sine wave signal, at input 2823. Combiner 2824 (e.g., a mixer) receives the phase channel modulation signal at input 2802 and the phase shifted sinusoidal signal at input 2823 and provides a frequency shifted image signal at input 2825. Combiner 3809 (e.g., an adder) receives the frequency shifted image signal at input 2708 corresponding to the ATM channel modulation signal and the frequency shifted image signal at input 2825 corresponding to the phase channel modulation signal and combines (e.g., adds the signals) to provide an output signal at output 2810.

The output signal at output 2810 is provided to an input of combiner 2837 (e.g., a mixer) as an input signal. An additional signal, such as an additional ATM or Phase channel modulation signal, is provided at input 2832 to an input of combiner 2854 (e.g., a mixer).

A sinusoidal signal source 2833, for example a cosine oscillator, provides a signal $B \cos(\omega_{c2}(t))$, where B is a gain coefficient, where $\omega_{c2}$ is the angular frequency, equal to $2\pi f_2$, where $f_2$ is the frequency, and where t is time, at input 2836 and at input 2851. Combiner 2837 (e.g., a mixer) receives the ATM channel modulation signal at input 2831 and the signal at input 2836 and provides a frequency shifted image signal at input 2838. A ninety-degree phase shift element 2852 receives the signal at input 2821 and shifts its phase by ninety degrees, providing a phased shifted sinusoidal signal, for example a sine wave signal, at input 2853. Combiner 2854 (e.g., a mixer) receives the phase channel modulation signal at input 2832 and the phase shifted sinusoidal signal at input 2853 and provides a frequency shifted image signal at input 2855. Combiner 2839 (e.g., an adder) receives the frequency shifted image signal at input 2738 corresponding to the ATM channel modulation signal and the frequency shifted image signal at input 2855 corresponding to the phase channel modulation signal and combines (e.g., adds the signals) to provide an output signal at output 2840.

The complex wave modulation signal at output 2810 is modulated with both the ATM channel modulation signal 2801 and the phase channel modulation signal 2802. The complex wave modulation signal at output 2840 is modulated with not only the ATM channel modulation signal 2801 and the phase channel modulation signal 2802 but also with the ATM or phase channel modulation signal at input 2832.

Figure 29:
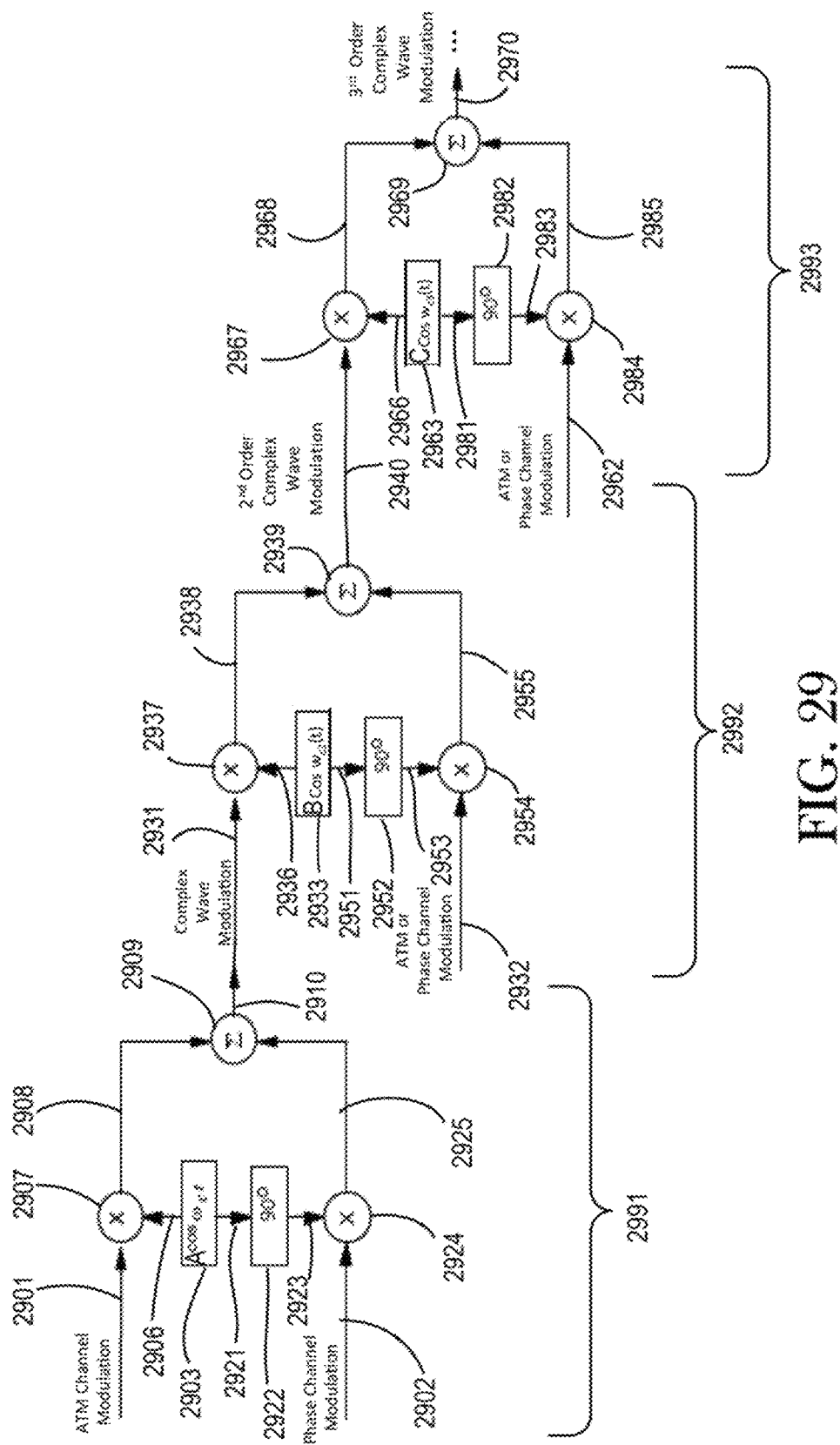
FIG. 29 is a block diagram illustrating a multiple-stage combiner for combining an ATM channel modulation signal and multiple phase channel modulation signals in multiple stages in accordance with at least one embodiment.

FIG. 29 is a block diagram illustrating a multiple-stage combiner for combining an ATM channel modulation signal and multiple phase channel modulation signals in multiple stages in accordance with at least one embodiment. The multiple-stage combiner of FIG. 29 comprises a first stage 2991, a second stage 2992, and a third stage 2993.

An ATM channel modulation signal is received at input 2901. A phase channel modulation signal is received at input 2902. The ATM channel modulation signal at input 2901 is provided as an input to combiner 2907 (e.g., a mixer). The phase channel modulation signal at input 2902 is provided as an input to combiner 2924.

A sinusoidal signal source 2903, for example a cosine oscillator, provides a signal $A \cos(\omega_c(t))$, where A is a gain coefficient, where $\omega_c$ is the angular frequency, equal to $2\pi f$, where f is the frequency, and where t is time, at input 2906 and at input 2921. Combiner 2907 (e.g., a mixer) receives the ATM channel modulation signal at input 2901 and the signal at input 2906 and provides a frequency shifted image signal at input 2908. A ninety-degree phase shift element 2922 receives the signal at input 2921 and shifts its phase by ninety degrees, providing a phased shifted sinusoidal signal for example a sine wave signal, at input 2923. Combiner 2924 (e.g., a mixer) receives the phase channel modulation signal at input 2902 and the phase shifted sinusoidal signal at input 2923 and provides a frequency shifted image signal at input 2925. Combiner 2909 (e.g., an adder) receives the frequency shifted image signal at input 2708 corresponding to the ATM channel modulation signal and the frequency shifted image signal at input 2925 corresponding to the phase channel modulation signal and combines (e.g., adds the signals) to provide an output signal at output 2910 in the form of a complex wave modulation signal.

The complex wave modulation signal at output 2910 is provided to an input of combiner 2937 (e.g., a mixer) as an input signal. An additional signal, such as an additional ATM or phase channel modulation signal is provided at input 2932 to an input of combiner 2954 (e.g., a mixer).

A sinusoidal signal source 2933, for example a cosine oscillator, provides a signal $B \cos(\omega_{c2}(t))$, where B is a gain coefficient, where $\omega_{c2}$ is the angular frequency, equal to $2\pi f_2$, where is the frequency, and where t is time, at input

2936 and at input 2951. Combiner 2937 (e.g., a mixer) receives the ATM channel modulation signal at input 2931 and the signal at input 2936 and provides a frequency shifted image signal at input 2938. A ninety-degree phase shift element 2952 receives the signal at input 2951 and shifts its phase by ninety degrees, providing a phased shifted sinusoidal signal, for example a sine wave signal, at input 2953. Combiner 2954 (e.g., a mixer) receives the phase channel modulation signal at input 2932 and the phase shifted sinusoidal signal at input 2953 and provides a frequency shifted image signal at input 2955. Combiner 2939 (e.g., an adder) receives the frequency shifted image signal at input 2738 corresponding to the ATM channel modulation signal and the frequency shifted image signal at input 2955 corresponding to the phase channel modulation signal and combines (e.g., adds the signals) to provide an output signal at output 2940 in the form of a $2^{nd}$ order complex wave modulation signal.

The complex wave modulation signal at output 2940 is provided to an input of combiner 2967 (e.g., a mixer) as an input signal. An additional signal, such as an additional ATM or phase channel modulation signal, is provided at input 2962 to an input of combiner 2984 (e.g., a mixer).

A sinusoidal signal source 2963, for example a cosine oscillator, provides a signal B $\cos(\omega_{c2}(t))$, where B is a gain coefficient, where $\omega_{c2}$ is the angular frequency, equal to $2\pi f_2$, where $f_2$ is the frequency, and where t is time, at input 2966 and at input 2981. Combiner 2967 (e.g., a mixer) receives the ATM channel modulation signal at input 2961 and the signal at input 2966 and provides a frequency shifted image signal at input 2968. A ninety-degree phase shift element 2982 receives the signal at input 2981 and shifts its phase by ninety degrees, providing a phased shifted sinusoidal signal, for example a sine wave signal, at input 2983. Combiner 2984 (e.g., a mixer) receives the phase channel modulation signal at input 2962 and the phase shifted sinusoidal signal at input 2983 and provides a frequency shifted image signal at input 2985. Combiner 2969 (e.g., an adder) receives the frequency shifted image signal at input 2768 corresponding to the ATM channel modulation signal and the frequency shifted image signal at input 2985 corresponding to the phase channel modulation signal and combines (e.g. adds the signals) to provide an output signal at output 2970 in the form of a $3^{rd}$ order complex wave modulation signal.

The complex wave modulation signal at output 2910 is modulated with both the ATM channel modulation signal 2901 and the phase channel modulation signal 2902. The complex wave modulation signal at output 2940 is modulated with not only the ATM channel modulation signal 2901 and the phase channel modulation signal 2902 but also with the ATM or phase channel modulation signal at input 2932. The complex wave modulation signal at output 2970 is modulated with not only the ATM channel modulation signal 2901 and the phase channel modulation signal 2902 and the ATM or phase channel modulation signal at input 2932 but also with the ATM or phase channel modulation signal at input 2962.

While three stages 2991, 2992, and 2993 are shown in FIG. 29 and described above, output 2970 may be provided to an input of a subsequent stage, and any number of subsequent stages may be provided to obtain an nth order complex wave modulation signal. The nth order complex wave modulation signal can multiplex, for example, n+1 channel modulation signals, such as ATM channel modulation signals or phase channel modulation signals for transmission as, for example, a single signal between a transmitter and a receiver. Also, while the embodiment in FIG. 29 is shown with an ATM channel modulation signal at input 2901, a phase channel modulation signal at input 2902, and ATM or phase channel modulation signals at inputs 2932 and 2962, it should be understood that embodiments may be practiced with other combinations of those modulation types or other combinations with or without those modulation types that may include other modulation types (e.g., QAM, QPSK, BPSK, AM, FM, PM, FSK, and/or other modulations types). Accordingly, embodiments may be practiced with a stages to combine 1, 2, 3, . . . , n, n+1 signals of zero or more types of modulation into a nth order complex wave modulation signal.

Such an implementation can utilize sequential separation of the quadrature signals in the receiver, as well as, extracting data front the ATM channel(s) and Phase channel(s) signals for processing. In the receive circuitry, multiple levels of quadrature integration can be disassembled in the reverse order using the proper frequency for each stage. ATM or Phase Channel modulation recovered in each stage can subsequently be sent to the proper demodulator to recover the individual streams of data. The example is for third order of quadrature modulation, however, a possibility of "n" number of stages can be determined with each individual implementation. With this approach, there is no theoretical limit to the number of stages that can be integrated in quadrature. Given that the inverse of the order of combination is performed and the proper frequencies are used at the receiver, each unique combined signal may be extracted and the data encoded demodulated.

Figure 30:
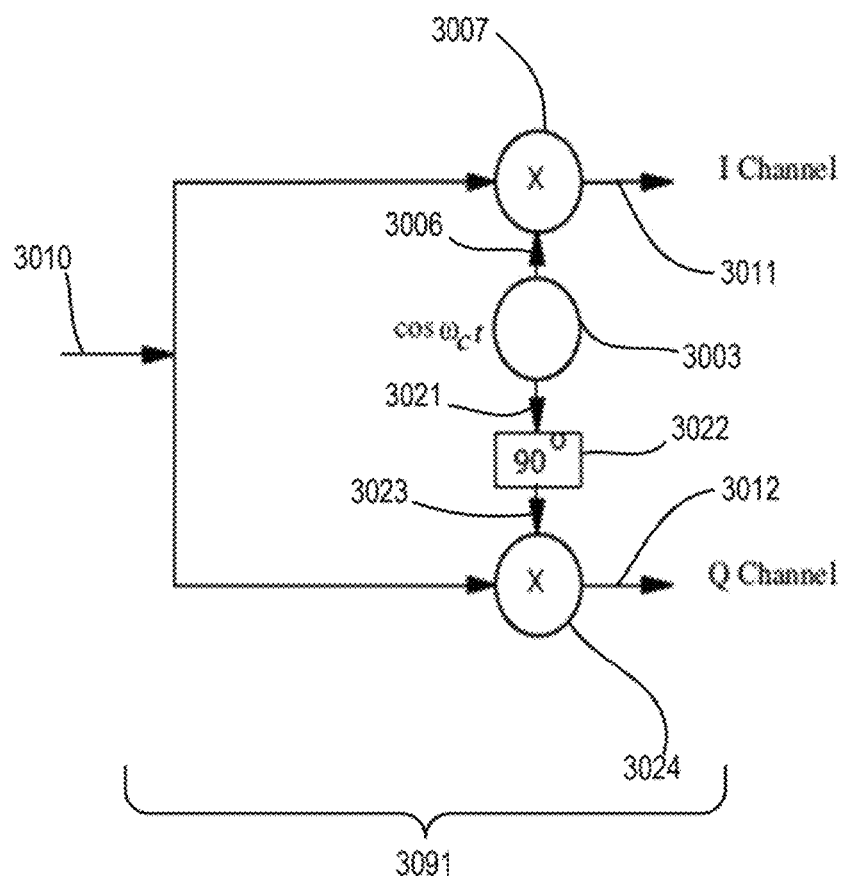
FIG. 30 is a block diagram illustrating a single-stage receiver in accordance with at least one embodiment.

FIG. 30 is a block diagram illustrating a single-stage receiver in accordance with at least one embodiment. The receiver of FIG. 30 is in the form of a single-stage 3091.

A signal is received at input 3010 and provided to an input of combiner 3007 (e.g., a mixer) and to an input of combiner 3024 (e.g., a mixer). A sinusoidal signal source 3003, for example a cosine oscillator, provides a signal $\cos(\omega_c(t))$, where $\omega_c$ is the angular frequency, equal to $2\pi f$, where f is the frequency, and where t is time, at input 3006 and at input 3021. Combiner 3007 (e.g., a mixer) receives the signal at input 3010 and the signal at input 3006 and provides a frequency shifted image signal at output 3011. A ninety-degree phase shift element 3022 receives the signal at input 3021 and shifts its phase by ninety degrees, providing a phased shifted sinusoidal signal, for example a sine wave signal, at input 3023. Combiner 3024 (e.g., a mixer) receives the phase channel modulation signal at input 3010 and the phase shifted sinusoidal signal at input 3023 and provides a frequency shifted image signal at output 3012. Given the ninety-degree phase difference provided by ninety-degree phase shift element 3022, the signals at output 3011 and output 3012 are orthogonal. The signal at output 3011 represents an in-phase (I) channel. The signal at output 3012 represents a quadrature (Q) channel.

Figure 31:
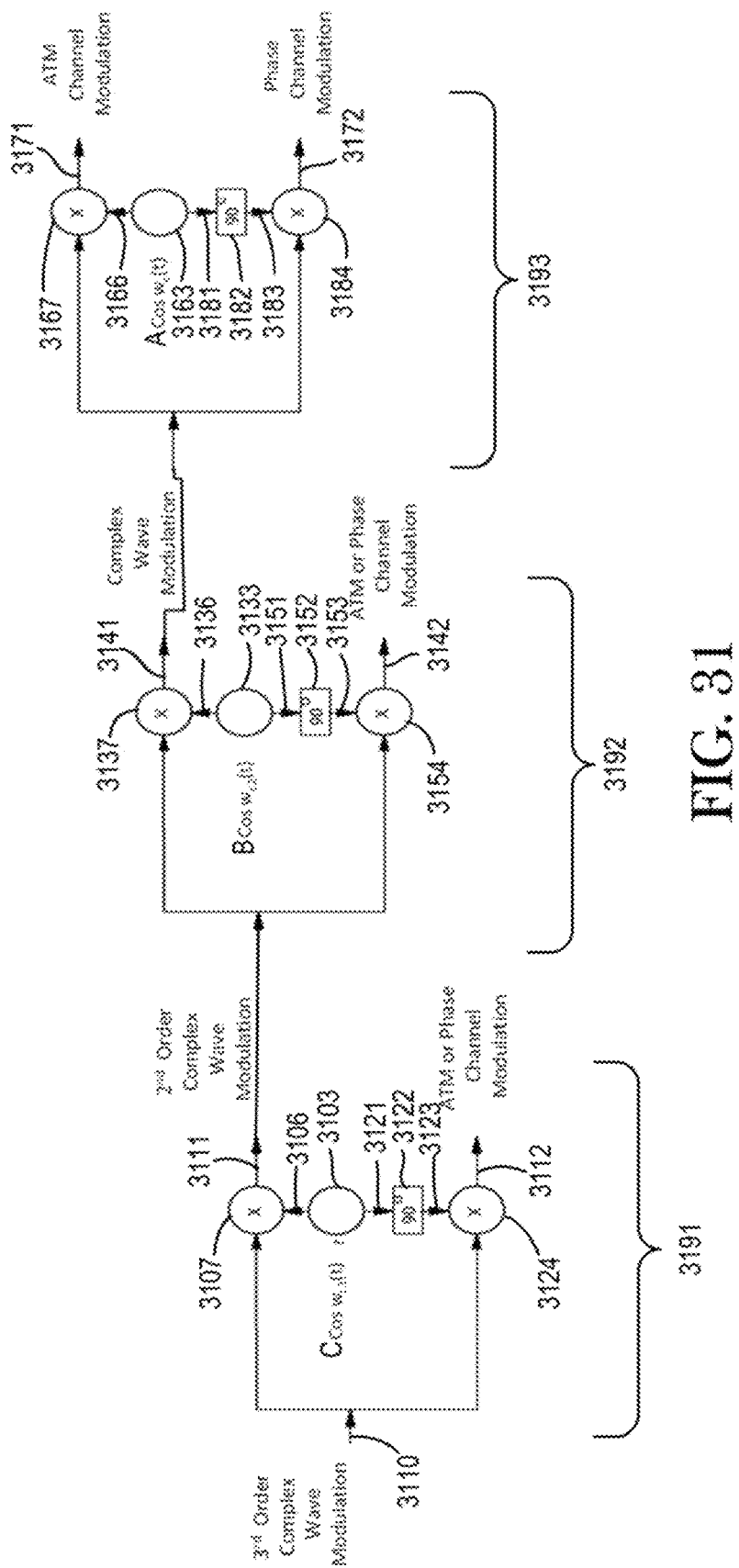
FIG. 31 is a block diagram illustrating a multiple-stage receiver in accordance with at least one embodiment.

FIG. 31 is a block diagram illustrating a multiple-stage receiver in accordance with at least one embodiment. The multiple-stage receiver comprises, as an example, a first stage 3191, a second stage 3192, and a third stage 3193.

A signal, such as an nth order complex wave modulation signal, in the illustrated exemplary instance a $3^{rd}$ order complex wave modulation signal is received at input 3110 and provided to an input of combiner 3107 (e.g., a mixer) and to an input of combiner 3124 (e.g., a mixer). A sinusoidal signal source 3103, for example a cosine oscillator, provides a signal C $\cos(\omega_{c3}(t))$, where C is the gain coefficient, where $\omega_{c3}$ is the angular frequency, equal to $2\pi f_3$, where $f_3$ is the frequency, and where t is time, at input 3106 and at input 3121. Combiner 3107 (e.g., a mixer) receives the signal at input 3110 and the signal at input 3106 and provides a frequency shifted image signal at output 3111. A ninety-degree phase shift element 3122 receives the signal at input 3121 and shifts its phase by ninety degrees, providing a phased shifted sinusoidal signal, for example a sine wave signal, at input 3123. Combiner 3124 (e.g., a mixer) receives the phase channel modulation signal at input 3110 and the phase shifted sinusoidal signal at input 3123 and provides a frequency shifted image signal at output 3112. Given the ninety-degree phase difference provided by ninety-degree phase shift element 3122, the signals at output 3111 and output 3112 are orthogonal. The signal at output 3111 represents a $2^{nd}$ order complex wave modulation signal. The signal at output 3112 represents an ATM or phase channel modulation signal.

The signal at output 3111 is provided to an input of combiner 3137 (e.g., a mixer) and to an input of combiner 3154 (e.g., a mixer). A sinusoidal signal source 3133, for example a cosine oscillator, provides a signal B $\cos(\omega_{c2}(t))$, where B is a gain coefficient, where $\omega_{c2}$ is the angular frequency, equal to $2\pi f_2$, where $f_2$ is the frequency, and where t is time, at input 3136 and at input 3151. Combiner 3137 (e.g., a mixer) receives the signal at its input from previous stage output 3111 and the signal at input 3136 and provides a frequency shifted image signal at output 3141, which may, for example, be in the form of a complex wave modulation signal. A ninety-degree phase shift element 3152 receives the signal at input 3151 and shifts its phase by ninety degrees, providing a phased shifted sinusoidal signal, for example a sine wave signal, at input 3153. Combiner 3154 (e.g., a mixer) receives the phase channel modulation signal from previous stage output 3111 at its input and the phase shifted sinusoidal signal at input 3153 and provides a frequency shifted image signal at output 3142, which may, for example, be in the form of an ATM or phase channel modulation signal. Given the ninety-degree phase difference provided by ninety-degree phase shift element 3152, the signals at output 3141 and output 3142 are orthogonal. The signal at output 3141 represents a complex wave modulation signal. The signal at output 3142 represents an ATM or phase channel modulation signal.

The signal at output 3112 is provided to an input of combiner 3167 (e.g., a mixer) and to an input of combiner 3184 (e.g., a mixer). A sinusoidal signal source 3163, for example a cosine oscillator, provides a signal A $\cos(\omega_c(t))$, where A is a gain coefficient, where $\omega_c$ is the angular frequency, equal to $2\pi f$, where f is the frequency, and where t is time, at input 3166 and at input 3181. Combiner 3167 (e.g., a mixer) receives the signal from previous stage output 3141 at an input and the signal at input 3166 and provides a frequency shifted image signal at output 3171. A ninety-degree phase shift element 3182 receives the signal at input 3181 and shifts its phase by ninety degrees, providing a phased shifted sinusoidal signal, for example a sine wave signal at input 3183. Combiner 3184 (e.g., a mixer) receives the phase channel modulation signal from previous stage output 3141 at an input and the phase shifted sinusoidal signal at input 3183 and provides a frequency shifted image signal at output 3172. Given the ninety-degree phase difference provided by ninety-degree phase shift element 3182, the signals at output 3171 and output 3172 are orthogonal. The signal at output 3171 represents an ATM channel modulation signal. The signal at output 3172 represents a phase channel modulation signal.

In accordance with at least one embodiment, the ATM modulation may be referred to as waveform modulation, as values of elements of information can be encoded as variations in shape of portions of the waveform itself, as opposed to traditional modulations of amplitude, frequency, or phase that tend to affect those characteristics of the waveform as a whole or in large part. In accordance with at least one embodiment, the ATM modulation may be referred to as waveform data encoding, as data can be encoded on the waveform by changing the shape of the waveform over specified portions corresponding to the locations of the data.

Encryption at the Waveform Level

In accordance with at least one embodiment, encryption can be implemented at the waveform level. For example, the locations of the elements of information along the waveform can be changed in accordance with a cryptographic algorithm to encrypt the data being represented by the elements of information. As one example, the locations can be specified as durations or segments of phase along a cycle of the rather waveform. As examples, the locations can be changed by changing the beginning points, ending points, durations, and/or order of one or more elements of information along the waveform. Accordingly, data security can be implemented at a physical link layer. As one example, the physical link layer data security can be implemented in conjunction with data layer data security. As another example, the physical link layer data security can be implemented as an alternative to data layer data security.

Power Balancing

In accordance with at least one embodiment, power balancing among elements of information can be achieved in any of several ways. As one example, a sinusoidal waveform rises rapidly at an upward zero crossing, so even a brief hold or non-linearly shaped deviation of the waveform shape from its otherwise sinusoidal shape can yield a substantial rise in amplitude at the end of the hold. Such a substantial rise can represent substantial power. As another example, a sinusoidal waveform rises slowly as it approaches its peak, so even a longer hold or non-linearly shaped deviation of the waveform shape from its otherwise sinusoidal shape can yield a correspondingly lower rise in amplitude at the end of the hold Such a lower rise can represent lower power. Bits or irks that may be more important, such as error correction coding (ECC) bits or trits, may be encoded at portions of the waveform having a slope that, once altered to encode the bits or trits, convey the encoded information with more power. The greater amount of power can help raise the signal to noise ratio (SNR) and improve signal integrity.

As another example, the shaping of the elements of information along the waveform can be controlled to control the amount of power used to encode the information. Higher power can help improve SNR and signal integrity, and lower power can help improve spectrum efficiency. Different amounts of power can be allocated to different elements of information. Alternatively, power can be equalized among the elements of information, for example, by using controlled shaping of the elements of information to increase or decrease the power used to convey them to compensate for a smaller or larger amount of power resulting from their locations nearer to a peak or nearer to a zero crossing of the carrier waveform.

As another example, power balancing can be implemented by controlling a pattern of waveform variations used to encode bits along the waveform, for example, one bit value, such as a zero, could be represented by maintaining the sinusoidal shape of the portion of the waveform along which the bit is encoded, while another bit value, such as a one could be represented by deviating from the sinusoidal shape of the waveform, as with a hold or a step In one case, the deviation may be lower than the nominal sinusoidal waveform. In another case, the deviation may be higher than the nominal sinusoidal waveform. As one example, the number of deviations lower than the nominal sinusoidal waveform can be balanced with the number of deviations higher than the nominal sinusoidal waveform. As an example, the lower than normal deviations can be alternated with the higher than normal deviations.

Power balancing can, for example, be implemented in a fixed manner. As another example, power balancing can be programmatically implemented. As another example, the programmatic implementation of power balancing can be dynamic and/or adaptive. For example, the power balancing can be adjusted in response to channel conditions, such as SNR, path loss, fading, co-channel interference, adjacent channel interference, and the like.

In accordance with at least one embodiment, a method for encoding digital data comprises generating an amplitude-time modulated sine wave, generating a phase-modulated sine wave, and summing the amplitude-time modulated sine wave and the phase-modulated sine wave to generate a compound sine wave. In accordance with at least one embodiment, generating the phase-modulated sine wave includes generating a phase-modulated carrier wave, and generating the compound sine wave includes generating a transmittable complex wave.

In accordance with at least one embodiment, a system for encoding digital data comprises an amplitude-time modulator for generating an amplitude-time modulated sine wave, a phase modulator for generating a phase-modulated sine wave, and a summing module for summing the amplitude-time modulated sine wave with the phase-modulated sine wave to generate a compound sine wave. In accordance with at least one embodiment, the phase-modulated sine wave is a phase-modulated carrier wave, and the compound sine wave is a transmittable complex wave.

In accordance with at least one embodiment, a method for multi-dimensional modulation of a network protocol including control data and payload data is provided. The method comprises encoding a first sine wave with the control data, encoding a second sine wave with the payload data, and summing the first and second sine waves to generate a compound sine wave. In accordance with at least one embodiment, encoding the first sine wave includes encoding the first sine wave with header information for a first packet and post-payload data for a second packet, and encoding the second sine wave includes encoding the second sine wave with payload data for the second packet. In accordance with at least one embodiment, the first and second packets are Ethernet packets. In accordance with at least one embodiment, encoding the first sine wave includes encoding an amplitude-time modulated sine wave, and encoding the second sine wave includes encoding a phase-modulated sine wave. In accordance with at least one embodiment, encoding the first sine wave includes encoding a phase-modulated sine wave, and encoding the second sine wave includes encoding an amplitude-time modulated sine wave.

In accordance with at least one embodiment, a method for multi-dimensional modulation of a network protocol including control data and payload data is described. The method includes encoding a first sine wave with the control data, encoding a second sine wave with the payload data; and summing the first and second sine waves to generate a compound sine wave. In some embodiments, the control data is header information for a first Ethernet packet and post-payload data for a second Ethernet packet; and the payload data is payload data for the second Ethernet packet.

In accordance with at least one embodiment, a system comprises a first combiner for combining a first amplitude-time modulated (ATM) signal and a first phase modulated signal to produce a complex wave modulation signal, and a second combiner having an input coupled to an output of the first combiner, the second combiner for combining the complex wave modulation signal and an additional signal to produce a second complex wave modulation signal, the additional signal selected from a group consisting of a second ATM signal and a second phase modulated signal. In accordance with at least one embodiment, the first phase modulated signal is a phase modulated carrier wave, and wherein the complex wave modulation signal is a transmittable complex wave. In accordance with at least one embodiment, the complex wave modulation signal is a produced at a carrier wave frequency. In accordance with at least one embodiment, the complex wave modulation signal is produced at an intermediate frequency. In accordance with at least one embodiment, a shape of an element of information according to the first ATM signal is defined programmatically over subportions of less than the duration of the element of information. In accordance with at least one embodiment, the first ATM signal is encrypted at the waveform level to provide physical link layer data security. In accordance with at least one embodiment, the first ATM signal is processed to provide power balancing. In accordance with at least one embodiment, a first combiner local oscillator frequency of the first combiner is different than a second combiner local oscillator frequency of the second combiner. In accordance with at least one embodiment, a first combiner local oscillator gain coefficient of the first combiner is different than a second combiner local oscillator gain coefficient of the second combiner.

In accordance with at least one embodiment, a method comprises combining, at a first combiner, a first amplitude-time modulated (ATM) signal and a first phase modulated signal to produce a complex wave modulation signal, and combining, at a second combiner having an input coupled to an output of the first combiner, the complex wave modulation signal and an additional signal to produce a second complex wave modulation signal, the additional signal selected from a group consisting of a second ATM signal and a second phase modulated signal. In accordance with at least one embodiment, the first phase modulated signal is a phase modulated carrier wave, and wherein the complex wave modulation signal is a transmittable complex wave. In accordance with at least one embodiment, the complex wave modulation signal is a produced at a carrier wave frequency. In accordance with at least one embodiment the complex wave modulation signal is produced at an intermediate frequency. In accordance with at least one embodiment, a shape of an element of information according to the first ATM signal is defined programmatically over subportions of less than the duration of the element of information. In accordance with at least one embodiment, the first ATM signal is encrypted at the waveform level to provide physical link layer data security. In accordance with at least one embodiment, the first ATM signal is processed to provide power balancing. In accordance with at least one embodiment, a first combiner local oscillator frequency of the first combiner is different than a second combiner local oscillator frequency of the second combiner. In accordance with at least one embodiment, a first combiner local oscillator gain coefficient of the first combiner is different than a second combiner local oscillator gain coefficient of the second combiner.

In accordance with at least one embodiment, a method comprises combining, at a first quadrature mixer, a first signal and a first phase modulated signal to produce a complex wave modulation signal, and combining, at a second quadrature mixer having an input coupled to an output of the first quadrature mixer, the complex wave modulation signal and an additional signal to produce a second complex wave modulation signal. In accordance with at least one embodiment, the method further comprises combining, at a third quadrature mixer having a third quadrature mixer input coupled to a second quadrature mixer output of the second quadrature mixer, the second complex wave modulation signal and a second additional signal to produce a third complex wave modulation signal.

A suitable communications system background is disclosed in more detail in the Drawings of U.S. Pat. No. 7,046,741 (now expired) issued on May 16, 2006 to inventor Forrest J. Brown et al. The subject matter of which is hereby incorporated by reference in its entirety into tins disclosure.

An amplitude-time modulated compound signal wave modulator demodulator will typically be configured as a classical communications transmit/receive system. Amplitude-time modulation techniques can also be a dedicated standalone communications transmit/receive system.

As will be appreciated, Phase/amplitude-time modulation provides a new method for communication of information that overcomes many of the challenges of conventional modulation methods. With this new modulation technology significant channel bandwidth and noise issues can be addressed. Phase/amplitude-time has been demonstrated to provide higher data rate, more efficient frequency utilization, and greater immunity to noise effects.

Intra-Symbol Multi-Dimensional Modulation (ISMM)

While contemporary modulation schemes typically use an "inter-symbol" (not intra-symbol) relationship in which the modulation of even the smallest quantity of data being transmitted necessarily spans a plurality of carrier cycles and which is defined by the values of two sine waves combined in quadrature to represent an only two-dimensional relationship in a complex (real/imaginary) vector value, intra-symbol multi-dimensional modulation (ISMM) avoids such limitations. Unlike merely having two sine waves that are complementarity modulated and combined to represent a value that corresponds to the intended digital data value, ISMM not only provides intra-symbol modulation but also provides modulation among a plurality (e.g., more than two) of dimensions. Unlike traditional modulation techniques, such as quadrature amplitude modulation (QAM) and amplitude phase shift keying (APSK), ISMM does not merely use the relative amplitude of two sine waves to represent real and imaginary values of a vector to represent a digital value.

While traditional modulation techniques are constrained in their number of data bits per symbol by their power (or voltage) range and in their effective data rate by the frequency of the symbols containing the data bits, ISMM provides advantage over traditional modulation techniques. Traditional modulation techniques have incurred a cost of increasing their symbol rate, as such increase also increased the bandwidth required to send information at the increased symbol rate. Such an increasing need for higher bandwidth has forced the cellular industry to increase the carrier frequencies used to accommodate the increased bandwidth. In contrast, embodiments of a method and apparatus described herein can provide spectrum-efficient communication using ISMM.

ISMM can be performed by modulating a carrier wave according to a plurality of dimensional definitions, at specific intra-symbol locations and with specific signal levels within these locations, the combination of which represent the digital data value or values to be transmitted. As an example, the dimensional definitions can be orthogonal to one another. The dimensionality of the orthogonal definitions enables the digital data to be represented within an effective lattice structure that is both energy and spectrally efficient. The intra-symbol locations of the dimensional definitions can be in one or more of a plurality of domains comprising but not limited to the time domain, the frequency domain, and the phase domain. Within the one or more domains, ISMM is provided according to a plurality of dimensions through the use of representations of data values which are distinct across the dimensions, allowing recovery of the data at a receiver after the plurality of dimensional definitions have been combined to provide a composite transmit signal. As an example, ISMM can be implemented as software defined modulation, and the dimensional definitions can be programmatically provided.

As one example, dimensional definitions may comprise amplitude changes from a nominal amplitude, such as an amplitude of a sine wave, and those amplitude changes may be present at distinct locations along a carrier cycle of the carrier wave. Such amplitude changes can be in the form of steps, such as binary or ternary steps or steps having a higher number of possible states. As another example, changes introduced to the waveform by the dimensional definitions need not be in the nature of steps. A plurality of data elements, such as data bits, can be modulated within a single carrier cycle.

For illustration purposes, the following is an example of a time domain implementation of ISMM. In this example, the created orthonormal vector definitions, are a multi-dimensional extension of the definitions of the ATM characteristics. This approach uses a set of different, but orthonormal. ATM step locations and durations to define the set of vectors. The step locations and durations are optimized to determine the number of possible dimensions available, defining the number of bits per symbol, the effective data rate and determine the required bandwidth consumed. In accordance with at least one embodiment, the dimensional definitions may or may not have sinusoidal content, with or without steps. The dimensional definitions can maintain a functional level of an orthogonal, or, as a more particular example, orthonormal, relationship with the other dimensional definitions. These dimensional definitions are then used to represent the intra-symbol set of a one-to-n-dimensional lattice structure.

This intra-symbol modulation approach can be fully contained within the limits of a single symbol (in this example, the time period of a carrier cycle) of the baseband signal or signals, allowing the intra-symbol modulation for another digital data element or elements to be fully contained within the limits of a different single symbol, such as the time period of a different carrier cycle. As with the ATM modulation technique described further above, two independent in-phase (I) and quadrature (Q) baseband signals, each modulated with according to ISMM, may be combined in quadrature to create a unique complex value, or the I and Q signals may be treated as independent channels of data values to transmit.

ISMM can provide very power-efficient modulation. The Eb/No levels at which ISMM can operate. In comparison to equivalent bit levels of QAM modulation, can be orders of magnitude lower for any given bit error rate (BER) performance. This enhanced performance level is the result of the detectability of the unique nature of the dimensional definitions of the multi-dimensional nature of ISMM, and excellent performance can be obtained using orthogonal dimensional definitions.

In addition to or as an alternative to improving power efficiency, ISMM can also increase spectral efficiency. Spectral efficiency describes an extent to which modulation can carry data values within a limited amount of frequency spectrum (i.e., bandwidth). This spectral efficiency can be expressed in bits per second per Hertz (bits/sec/Hz). For example, 256 QAM has an ideal spectral efficiency of 8 bits/sec/Hz (with an achieved real-world value of ~6.3 bits/sec/Hz), while implementations of ISMM have produced higher measured efficiencies.

Transmit filtering can be used to shape the modulation to achieve the possible spectral efficiencies and effectively create the application-specific channel bandwidth while still maintaining superior power efficiencies. These parameters can be programmatically defined.

In addition to power and spectral efficiency, another advantage ISMM can provide is the ability to define the number data bits per symbol. The number of bits per symbol under ISMM is very configurable and may be defined by a combination of the number of dimensions and the number of bits per dimension.

As an example of extending the ATM modulation described further above into a plurality of dimensions, specific data locations and durations are defined within the 360 degrees of the baseband symbol (e.g., within a single cycle of a base band periodic wave). An orthonormal set of dimensions is defined using a set of combinations of these locations and durations. The values of each intra-symbol dimensional definition may include any combination of orientation, polarity, and magnitude.

To increase the potential number of bits per symbol, the dimensional definitions may be defined to utilize all or part of the span of the symbol. In an example utilizing orthonormality, each dimensional definition is orthonormal to all other dimensional definitions within the symbol.

The number and duration of the locations at which a dimensional definition influences a waveform bears upon the number of the possible orthonormal dimensions. These dimensions are then used to define how the data are represented within the symbol. There are many possible implementations of how the data represented symbol may be defined. These possible combinations include, but are not limited to, using the presence or absence of the dimension in the transmitted symbol to provide modulation according to a bit value (e.g., 0 or 1), including the bit value in either a non-inverse or inverse form depending on the bit value represented, and defining the number of bits per dimension and combining the number of dimensions per symbol to define a total number of bits per symbol. In the cases of modulation using the presence or absence of a dimension or the non-inverse or inverse form of a dimension, the total bits per symbol can equal the total number of dimensions that are available times two (as I and Q can be independent).

In these approaches, available resources are used to specifically represent the data value within a symbol. A few examples of this are, but are not limited to, one bit per dimension with N available dimensions per symbol (yielding N bits per symbol and $2^N$ possible binary values per symbol, for example, in the case of a complex signal, or $2 \times N$ bits per symbol and $2^{N+1}$ possible binary values per symbol, for example, in the case of a real signal, where half of the bits can be modulated to serve as the I signal and the other half of the bits can be modulated to serve as the Q signal to provide a complex final signal for transmission), in which case the bits per symbol represented are then determined by the sum of the number of dimensions within the symbol; or more than one bit per dimension (b), with N available independent, orthonormal dimensions per symbol, in which case there are b×N bits per symbol (e.g., b=2 bits per dimension, N=8 dimensions, yielding 2×8=16 bits per symbol which can represent $2^{(2 \times 8)}=2^{16}=65,536$ possible binary values per symbol; and a non-binary symbol value created by using the same available resources in more than one bit per dimension example, but changing the relationship of these bits per dimension and dimensions per symbol resources to define a non-binary symbol value. The latter can be accomplished by defining the non-binary value base (m) and the number of dimensions per symbol (N) to yield at least N of the non-binary digits per symbol, which can represent $m^N$ possible digital values per symbol where m is the base of the non-binary digits (e.g., for N=8 (e.g., 4 in I and 4 in Q), and m=3 (where m=3 represents ternary digits (trits) in ternary (i.e., base 3)), at least N=8 trits per symbol are provided, which can represent $m^N=3^8=6561$ possible digital values per symbol). Base conversion on input data can be provided as described further above to allow, for example, binary data to be used as a data source to provide a non-binary symbol value.

For the one-bit-per-dimension example, the mapping approach is direct. The mapping approach for the more than one bit per dimension depends on the number of bits per dimension. A single, but not exclusive, example of each of these approaches is set forth below.

For a one-bit-per-dimension example, a binary bit value may be assigned to each defined dimension and, by utilizing the available number of dimensions within the symbol (N), the number of bits per symbol can be represented by the specific combination of dimensions selected by the data value and then transmitted. For example, the number of bits per symbol can be represented by $2^N$, where N is the number of dimensions per symbol.

For a more-than-one-bit-per-dimension example, it is possible to view each dimension as an individual data channel. Assigning a "b" bit value to a dimension and transmitting one or more dimensions within a given symbol defines another possible use case. In this case, the number of bits per symbol may be represented as $b^N_1 + b^N_2 + \ldots b^N_n$, where b is the bit value for each dimension and n is the number of dimensions used per symbol. For example, if dimension $N_1$ has 4 bits per symbol and dimension $N_2$ has 8 bits per dimension, then this configuration would deliver 4+8, or 12 bits per symbol but independently delivering two channels of data.

Dimensional modulation may be used to provide channel aggregation. The representation of the "b" bit value may use industry-standard valuations such as used, for example, with APSK or QAM, or may also be an encoding technique which may be developed for a specific application.

The flexibility of ISMM, provided by the various combinations of dimensionality of the symbol, bits per dimension, and possible filtering, enables an unprecedented level of configurability and results in the ability to optimize the performance features previously described and to apply an optimized implementation to any given application. Intra-symbol configuration is possible by adding additional dimensions, sub-dividing dimensions into unique channels, modulating these dimensions and sub-dimensions all combined with specific filtering that can all be combined to reach a specific performance objective. Additional flexibility and features can be enabled through the use of these characteristics and configurations.

One example of a manner in which ISMM can be implemented is to include forward error correction (FEC), with the FEC information borne on at least one dimension of die multidimensional modulation system. One or more available dimension can include bits within the symbol used for FEC encoding and thus maintain data payload a data payload within the symbol. For example, at least one embodiment provides a method for adding additional bits or dimensional locations within the symbol to implement FEC coding data. The method includes implementing these additional one or more bits or dimensions in the symbol exclusively for the purpose of encoding the FEC data.

As another example, FEC can be implemented within multidimensional modulation using one or more available but otherwise unused dimensions or bits within the symbol definition to convey the FEC coding data. Such an implementation does not necessarily change the spectral or power parameters of the signal as these one or more previously unused dimensions or bits may already be a part of the overall signal parameters.

In accordance with at least one embodiment, a method includes adding these one or more FEC bits or dimensions to one or both of the I and Q elements of the complex wave. The number of total bits or dimensions per symbol provides the level of FEC possible. Such an embodiment provides for FEC functionality without necessarily utilizing for transmission of the FEC information bits or dimensions available for transmission of the data payload being protected from corruption by the FEC information, thus maintaining the data payload capacity of the channel. The one or more bits or dimensions used for FEC may be from unused dimensions that are an entire symbol in duration or in intra-dimensions defined in the multi-dimensional definitions. Again, any resources used for FEC coding may, but need not, be defined so as not to reduce the defined data payload of the symbol.

Various optimizations of data communication reliability and spectral efficiency can be accommodated using selective implementations of FEC. For example, adding one or more bits or dimensions to, or using one or more available bits or dimensions, within each symbol can dramatically improve bit error rate (BER) performance at the receiver (RX). The improved data communication reliability can be a reasonable trade-off for whatever extent, if any, using previously unused resources may add to the spectral usage. As another example, implementing sub-dimensional resources can maintain both the payload and spectrum objectives. Due to the level of efficiency and dynamic flexibility of the modulation, the result is a much more spectral efficient approach than current techniques which utilize payload resources and thus reduce data capacity and spectral efficiency.

In accordance with at least one embodiment, preamble encoding may be implemented to convey information relevant to the multidimensional modulation used to convey the data payload, in order to accommodate inherent latency or non-sequential transmitting environments, a preamble may be used that assists the asynchronous RX to reliably function in such an environment. A preamble may include, for example, timing or synchronizing signals, transmit format information, channel aggregation information, coding information (e.g., FEC parameter information), the like, or combinations thereof.

Implementations can be optimized with respect to, for example, the theoretical channel capacity of a single modulated signal and the theoretical spectral efficiency of a single modulated signal. As an example, selection of FEC parameters can enhance data communication reliability with or without spectral impact of additional bits or dimensions. As another example, selection of a number of samples per symbol can be used to optimize BER performance. As a further example, selection of a number of bits or dimensions per symbol can be used to optimize signal-to-noise ratio (SNR) performance, spectral efficiency, symbol (data) rates, the like, or combinations thereof.

In accordance with at least one embodiment, operation of ISMM can be adaptively configured to reduce adjacent channel interference (ACI). For example, a method is provided which places and controls the channel offset frequencies to provide improved (e.g., maximum) spectral utilization or improved (e.g., maximum) data throughput performance while reducing (e.g., minimizing) any ACI. As a particular example, programmatic tuning of the ISMM parameters can be performed to achieve ACI reduction.

In accordance with at least one embodiment, ISMM can be implemented using non-binary data encoding. As an example, non-binary-coded data, such as the ternary data described further above, can be encoded using ISMM, for example, using "$b^N$" encoding. In accordance with at least one embodiment, ISMM enables the representation of a binary value for any modulation symbol to be equal to $2^N$, where N is the number of dimensions per symbol, or individual dimensions may have different values of B and the total number of bits per dimension is equal to the sum of the bits per dimension.

In accordance with at least one embodiment, ISMM enables any binary multiple base number or system to be represented with a programmatically controlled number of bits/per dimension, with the number of possible base or system values controlled by the number of dimensions per symbol. This approach allows effectively representing any value of $b^N$, where b is the base or system number and N is the number of dimensions per symbol. For example, base 2=1 bit/dimension, base 4=2 bits/dimension, base 8=3 bit/dimension and so on up to and including base b=n bits dimension. The sample speed, dynamic range and accuracy of transmit and receive circuitry to produce and receive the modulation can be selected to expand or contract the range of values supported as desired.

The distinctive nature of the modulation within the symbol enables both standard binary ("b=2") and non-binary base values of ("b>2") to be represented. While one bit per dimension may represent a binary value of "0" or "1," another possible implementation includes a non-binary number of bit values per dimension, and such an implementation may be used to represent higher order base values.

In this approach, the number of bits per dimension represents the base value "b" and the number of dimensions per symbol in this invention will exponentially represent the number of different possible values "N" of this base value for each symbol. For example, with two bits per dimension, a base 4 value ($4=2^2$) can be represented. The relationship between the bits per symbol and the base value is a binary one. Where utilizing N dimensions per symbol, it is then possible to effectively represent a multi-byte binary value by converting the data front binary to a base 4 values utilizing the N locations within this modulation In other words, it is possible to transmit a $4^N$ value that in turn, represents a $2^{2*N}$ binary value. By converting the data to this higher base value, it is effectively doubling bits per symbol (data rate) and therefore, the bits/sec Hertz spectral efficiency.

As an example, a base 4 value and the number of dimensions equal to 8, or N=8, can be used, in accordance with such example, the value represented can be any value up to $4^8$=65,536 possible values per symbol. Note that this is the same as $2^{(2*8)}=2^{16}=65,536$. In this use case, by implementing b=4 with N=8, the effect is compressing 2 bytes per symbol, which will double the data rate along with the effective spectral efficiency of the signal.

This technique is also extensible to higher order base values by changing the number of bits per symbol or the number of dimensions per symbol. A further example of this would be the case where b=3 and N=8. In this case, $8^8=16,777,216$ possible values per symbol which is the same as $(2^3)^8=2^{(3*8)}=2^{24}=16,777,216$. This implementation effectively compresses 3 bytes into one symbol, tripling the effective data rate and spectral efficiency.

Even further data transmission compression can be realized by increasing the number of bits per dimension and dimensions per symbol. For example, by maintaining 8 bits per dimension and increasing the available dimensions to 16, the new $b^N=8^{16}$, or $(2^3)^{16}=2^{(3*16)}=2^{48}=2.81475*10^{14}$ or effectively 48 bits per symbol or 6 bytes of data per symbol. To support this approach, binary to non-binary conversion is accomplished prior to the encoding of this modulation at the transmitter, and the non-binary to binary conversion is accomplished at the receiver.

In accordance with at least one embodiment, a method is provided for encoding digital data. The method includes generating an independent pair of amplitude-time modulated sine waves. The method includes summing the two amplitude-time modulated sine waves in quadrature to generate a compound sine wave. In some embodiments, the dual ATM modulated sine waves include generating a transmittable complex wave. As one example, the transmittable complex wave can be generated from two ATM signals (as described further above) in quadrature. As another example, the transmittable complex wave can be generated from one ATM signal and one phase-modulated signal in quadrature. The transmittable complex wave can be generated by providing the signals to be combined in quadrature to a quadrature mixer.

In accordance with one embodiment, dimensional definitions can be defined so as to be distinctive enough from one another to be unambiguously demodulated to within a desired range of data communication reliability. As an example, dimensional definitions can be defined so as to be orthogonal to one another. As another example, dimensional definitions can be implemented to be orthonormal to one another. Matrix values obtained using an orthogonal or orthonormal process can be used to establish locations, amplitudes, durations, and the like, or combinations thereof for dimensional definitions. The matrix characteristics are selectable and can be programmatically configured to obtain dimensional definitions providing ISMM of desired performance, which may be optimized for any particular application or provided generally. Attributes such as the number of dimensions, the number of bits per dimension, the location of bits (dimensions), the number of samples per dimension, the number of samples per symbol, and like, or combinations thereof can be selectively configured, for example, programmatically. Such attributes can be selectively configured as desired, for example, for spectrum optimization, for BER optimization, for data rate optimization, for the like, or for combinations thereof. As examples, Legendre polynomials, Laguerre polynomials, Chebyshev polynomials, Gegenbauer polynomials, Hermite polynomials, Jacobi polynomials, Krawtchouk polynomials, ultraspherical polynomials, Zernike polynomials, the like, or combinations thereof can be used to obtain orthogonal dimensional definitions. As other examples, the Gram-Schmidt process, the Householder transformation, the Givens rotation, the Arnoldi iteration, the like, or combinations thereof can be used to obtain orthogonal dimensional definitions. As a further example, dimensional definitions can be defined so as to be orthonormal to one another. Such dimensional definitions can be provided in a variety of ways. As one example, predetermined values already established to be orthogonal or orthonormal may be used. As another example, a processor can programmatically determine dimensional definitions according to one or more of the approaches set forth above or the like.

Relative locations, orientation, amplitude and duration within the symbol can be programmatically selected to improve (e.g., optimize) the orthonormality of the modulation. The number of utilized locations may vary per dimension. As examples, the locations used to represent a dimension within a cycle of a carrier wave may be the same locations as those used to represent a different dimension within the cycle of the carrier wave, the locations may be different locations than those for a different dimension, the locations may be partially the same as and partially different from those for a different dimension, the locations may be a subset of those for a different dimension, or the locations may be a superset of those for a different dimension. As examples, the durations used to represent a dimension within a cycle of a carrier wave may be the same as those used to represent a different dimension within the cycle of the carrier wave, the durations may be different durations than those for a different dimension, the durations may be partially the same as and partially different from those for a different dimension, the dimensions may be a subset of those for a different dimension, or the durations may be superset of those for a different dimension.

A transmit filter may be implemented, for example, as a low-pass filter, for example, as a band-pass filter, or, for example, as a filter configured to provide a particular response, such as a filter configured to conform to a spectral emission mask. As an example, the parameters of the transmit filter may be pie-configured. As another example, the parameters of the transmit filler may be adaptively configured. As an example, the parameters of the transmit filter may be programmatically defined, which may be done initially, adaptively, or both.

Figure 32:
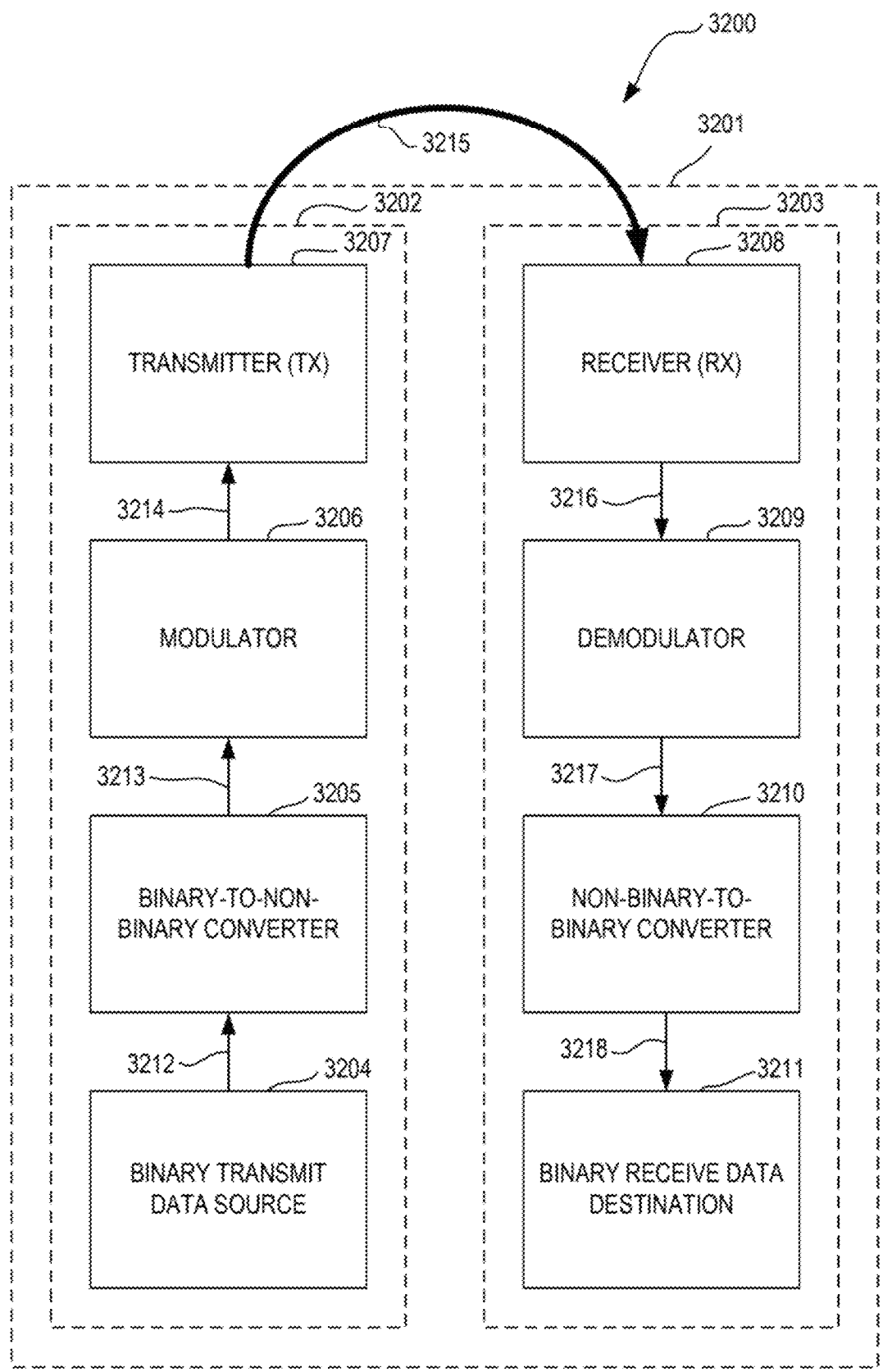
FIG. 32 is a block diagram illustrating a system in accordance with at least one embodiment. System 3200 comprises system block 3201.

FIG. 32 is a block diagram illustrating a system in accordance with at least one embodiment. System 3200 comprises system block 3201. System block 3201 comprises transmitter block 3202 and receiver block 3203.

Transmitter block 3202 comprises binary transmit data source 3204, binary-to-non-binary converter 3205, modulator 3206, and transmitter 3207. An output of binary transmit data source 3204 is connected to an input of binary-to-non-binary converter 3205 via interconnect 3212. Binary transmit data source 3204 provides binary transmit data to binary-to-non-binary converter 3205. An output of binary-to-non-binary converter 3205 is connected to an input of modulator 3206 via interconnect 3213. Binary-to-non-binary converter 3205 converts binary transmit data to a non-binary form. As an example, binary-to-non-binary converter 3205 can map a first quantity of binary transmit data to a first set of magnitude values in a first dimension, a second quantity of binary transmit data to a second set of magnitude values in a second dimension, and so on. Modulator 3206 receives the converted transmit data from binary-to-non-binary converter 3205 and modulates a carrier wave according to the converted transmit data. An output of modulator 3206 is connected to an input of transmitter 3207 via interconnect 3214. Transmitter 3207 receives a modulated carrier wave from modulator 3206 and transmits the modulated carrier wave for reception by a receiver via transmission medium 3215. As an example, transmitter 3207 may change a frequency of the modulated carrier wave, e.g., by changing a baseband transmit signal to a radio frequency (RF) transmit signal.

Receiver block 3203 comprises receiver 3208, demodulator 3209, non-binary-to-binary converter 3210, and binary receive data destination 3211. An input of receiver 3208 is connected to transmission medium 3215 and receives a modulated carrier wave via transmission medium 3215. As an example, receiver 3208 may change a frequency of the modulated carrier wave, e.g., by changing a RF receive signal to a baseband receive signal. Receiver 3208 is connected to demodulator 3209 via interconnect 3216 and provides a received signal to demodulator 3209. Demodulator 3209 demodulates the received signal to obtain a representation a first set of magnitude values in a first dimension, a second set of magnitude values in a second dimension, and so on. Demodulator 3209 is connected to non-binary-to-binary converter 3210 via interconnect 3217. Non-binary-to-binary converter 3210 "un-maps" (i.e., performs a mapping inverse to the mapping performed by binary-to-non-binary converter 3205) the first set of magnitude values in the first dimension to provide a first quantity of binary receive data to, the second set of magnitude values in the second dimension to provide a second quantity of binary receive data, and so on. Non-binary-to-binary-converter 3210 is connected to binary receive data destination 3211 via interconnect 3218. Non-binary-to-binary converter 3210 provides binary receive data to binary receive data destination 3211.

FIG. 33 is a tabular diagram illustrating an array of intra-symbol multi-dimensional definitions in accordance with at least one embodiment. Table 3300 comprises column 3301 and column 3302. Column 3301 shows a plurality of dimensions, numbered from 1 to n. Column 3302 shows a corresponding plurality of intra-symbol orthonormal dimensional definitions. Column 3302 includes heading 3303, which shows the dimensional definitions of column 3302 can span a carrier cycle (e.g., from zero degrees to 360 degrees). Row 3304 corresponds, in both column 3301 and column 3302, to a first dimension. Row 3305 corresponds, in both column 3301 and column 3302, to a second dimension. Row 3306 corresponds, in both column 3301 and column 3302, to a third dimension. Row 3307 corresponds, in both column 3301 and column 3302, to a fourth dimension. Row 3308 corresponds, in both column 3301 and column 3302, to a fifth dimension. Row 3309 corresponds, in both column 3301 and column 3302, to a sixth dimension. Row 3310 corresponds, in both column 3301 and column 3302, to a seventh dimension. Row 3311 corresponds, in both column 3301 and column 3302, to an eighth dimension. Row 3312 stands in place, in both column 3301 and column 3302, of any number of intervening dimensions. Row 3313 corresponds, in both column 3301 and column 3302, to an nth dimension. Each of rows 3304-3313 defines distinct values at discrete positions within a carrier cycle for its respective dimension.

FIG. 34 is a block diagram illustrating an array of intra-symbol multi-dimensional definitions in accordance with at least one embodiment. Table 3400 comprises column 3401, column 3414, and column 3402. Column 3401 shows a plurality of dimensions, numbered from 1 to n. Column 3414 shows a bit value. Column 3402 shows a corresponding plurality of intra-symbol orthonormal dimensional definitions. Column 3402 includes heading 3403, which shows the dimensional definitions of column 3402 can span a carrier cycle (e.g., from zero degrees to 360 degrees). Row 3404 corresponds, in both column 3401 and column 3402, to a first dimension. Row 3405 corresponds, in both column 3401 and column 3402, to a second dimension. Row 3406 corresponds, in both column 3401 and column 3402, to a third dimension. Row 3407 corresponds, in both column 3401 and column 3402, to a fourth dimension. Row 3408 corresponds, in both column 3401 and column 3402, to a fifth dimension. Row 3409 corresponds, in both column 3401 and column 3402, to a sixth dimension. Row 3410 corresponds, in both column 3401 and column 3402, to a seventh dimension. Row 3411 corresponds, in both column 3401 and column 3402, to an eighth dimension. Row 3412 stands in place, in both column 3401 and column 3402, of any number of intervening dimensions. Row 3413 corresponds, in both column 3401 and column 3402, to an nth dimension. Each of rows 3404-3413 defines distinct values for the bit value specified in column 3401 at discrete positions within a carrier cycle for its respective dimension specified in column 3401.

Figure 35:
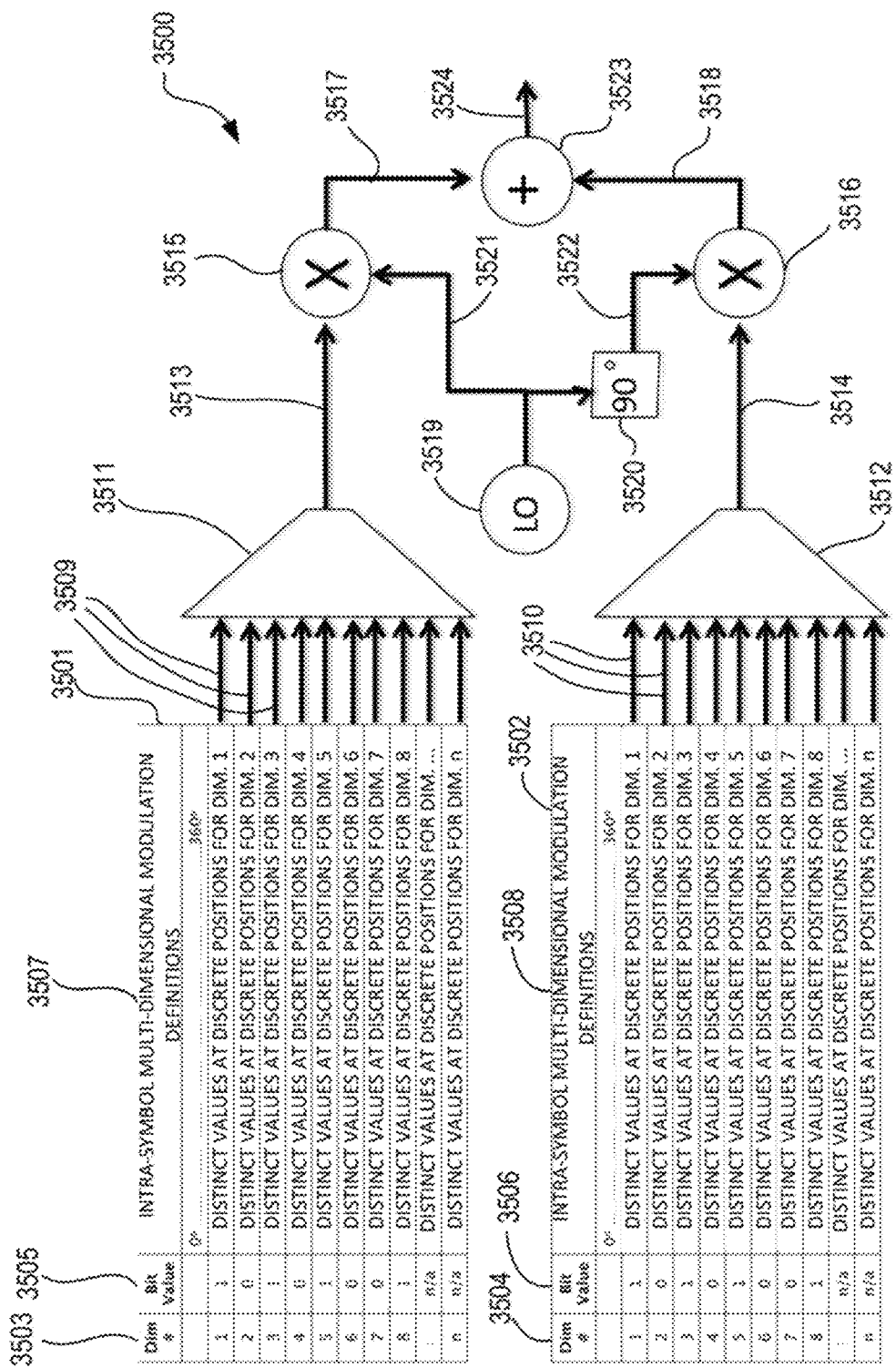
FIG. 35 is a block diagram illustrating an intra-symbol multi-dimensional modulator (ISMM) for providing a transmit signal in accordance with at least one embodiment.

FIG. 35 is a block diagram illustrating an intra-symbol multi-dimensional modulator (ISMM) for providing a transmit signal in accordance with at least one embodiment. ISMM 3500 comprises dimensional encoder 3501, dimensional encoder 3502, combiner 3511, combiner 3512, local oscillator 3519, quadrature phase shifter 3520, in-phase (I) mixer 3515, quadrature (Q) mixer 3516, and combiner 3523. Data bits to be transmitted are provided to dimensional encoders 3501 and 3502. Dimensional encoders 3501 and 3502 arrange the data bits, as shown by columns 3505 and 3506, among a plurality of dimensions, as shown by columns 3503 and 3504. Dimensional encoders 3501 and 3502 encode the data bits as distinct values at discrete positions for their respective dimensions, as shown by columns 3507 and 3508. As an example, dimensional encoders may be implemented using a processor and lookup tables, for example, lookup tables having a tabular format, such as that of table 3400 of FIG. 34.

Dimensional encoder 3501 provides a plurality of modulated outputs 3509 in different dimensions to combiner 351L Dimensional encoder 3502 provides a plurality of modulated outputs 3510 in different dimensions to combiner 3512. Combiner 3511 combines the plurality of modulated outputs 3509 to provide a combined modulated output 3513 to I mixer 3515. Combiner 3512 combines the plurality of modulated outputs 3509 to provide a combined modulated output 3514 to Q mixer 3516. Local oscillator (LO) 3519 provides a LO output 3521 to I mixer 3515 and to quadrature phase shifter 3520. I mixer 3515 mixes LO output 3521 with combined modulated output 3513 to provide radio frequency (RF) I output 3517 to combiner 3523. Quadrature phase shifter 3520 introduces a phase shift, for example, of 90 degrees, to provide a phase-shifted LO output 3522 to Q mixer 3516. Q mixer 3516 mixes phase-shifted LO output 3522 with combined modulated output 3514 to provide RF Q output 3518 to combiner 2523. Combiner 3523 combines RF I output 3517 and RF Q output 3518 to provide RF output 3524.

FIG. 36 is a block diagram illustrating an array of intra-symbol multi-dimensional definitions implemented using quadrature amplitude modulation (QAM) in accordance with at least one embodiment. Table 3600 comprises column 3601 and column 3602. Column 3601 shows a plurality of dimensions, numbered from 1 to n. Column 3602 shows a corresponding plurality of intra-symbol dimensional definitions, including intra-symbol dimensional definitions using QAM having, in this example, 256 constellation points (QAM256). Column 3602 includes heading 3603, which shows the dimensional definitions of column 3602 can span a carrier cycle (e.g., from zero degrees to 360 degrees). Values from a quadrature modulation scheme, such as QPSK through 64 KQAM+ can be implemented multi-dimensionally. In the illustrated example, values from 256QAM can be implemented using the plurality of dimensions of column 3601. Row 3604 corresponds, in both column 3601 and column 3602, to a first set of 256 QAM constellation points corresponding to a first dimension. Row 3605 corresponds, in both column 3601 and column 3602, to a first set of distinct values at discrete positions within a carrier cycle for the first dimension. Row 3606 corresponds, in both column 3601 and column 3602, to a second set of 256 QAM constellation points corresponding to a second dimension. Row 3607 corresponds, in both column 3601 and column 3602, to a second set of distinct values at discrete positions within a carrier cycle for the second dimension. Row 3608 corresponds, in both column 3601 and column 3602, to a third set of 256 QAM constellation points corresponding to a third dimension. Row 3609 corresponds, in both column 3601 and column 3602, to a third set of distinct values at discrete positions within a carrier cycle for the third dimension. Row 3610 corresponds, in both column 3601 and column 3602, to a fourth set of 256 QAM constellation points corresponding to a fourth dimension. Row 3611 corresponds, in both column 3601 and column 3602, to a fourth set of distinct values at discrete positions within a carrier cycle for the fourth dimension. Row 3612 stands in place, in both column 3601 and column 3602, of any number of intervening dimensions. Row 3613 corresponds, in both column 3601 and column 3602, to an nth set of 256 QAM constellation points corresponding to an nth dimension. Row 3614 corresponds, in both columns 3601 and 3602, to an nth set of distinct values at discrete positions within a carrier cycle for the nth dimension. Each of rows 3605, 3607, 3069, 3611, and 3614 defines distinct values at discrete positions within a carrier cycle for its respective dimension.

Figure 37:
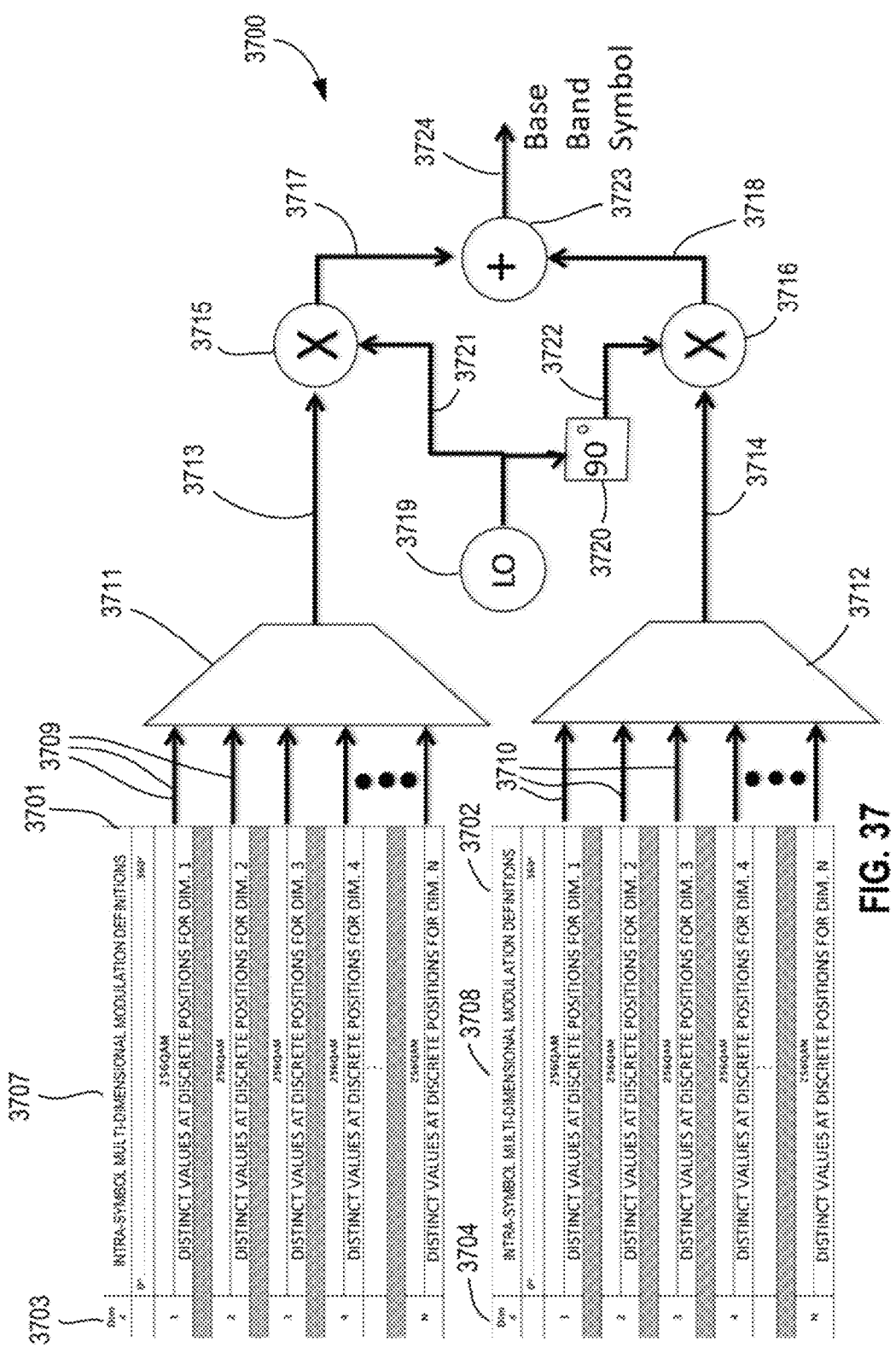
FIG. 37 is a block diagram illustrating an intra-symbol multi-dimensional modulator (ISMM) for providing a transmit signal in accordance with at least one embodiment.

FIG. 37 is a block diagram illustrating an intra-symbol multi-dimensional modulator (ISMM) for providing a transmit signal in accordance with at least one embodiment. ISMM 3700 comprises dimensional encoder 3701, dimensional encoder 3702, combiner 3711, combiner 3712, local oscillator 3719, quadrature phase shifter 3720, in-phase (I) mixer 3715, quadrature (Q) mixer 3716, and combiner 3723. Data bits to be transmitted are provided to dimensional encoders 3701 and 3702. Dimensional encoders 3701 and 3702 encode data bits as sets of distinct values at discrete positions, as shown by columns 3707 and 3708, over a carrier cycle for each respective dimension, as shown by columns 3703 and 3704. As an example, dimensional encoders may be implemented using a processor and lookup tables, for example, lookup tables having a tabular format, such as that of table 3600 of FIG. 36.

Dimensional encoder 3701 provides a plurality of modulated outputs 3709 in different dimensions to combiner 3711. Dimensional encoder 3702 provides a plurality of modulated outputs 3710 in different dimensions to combiner 3712. Combiner 3711 combines the plurality of modulated outputs 3709 to provide a combined modulated output 3713 to I mixer 3715. Combiner 3712 combines the plurality of modulated outputs 3709 to provide a combined modulated output 3714 to Q mixer 3716. Local oscillator (LO) 3719 provides a LO output 3721 to I mixer 3715 and to quadrature phase shifter 3720. I mixer 3715 mixes LO output 3721 with combined modulated output 3713 to provide radio frequency (RF) I output 3717 to combiner 3723. Quadrature phase shifter 3720 introduces a phase shift, for example, of 90 degrees, to provide a phase-shifted LO output 3722 to Q mixer 3716. Q mixer 3716 mixes phase-shifted LO output 3722 with combined modulated output 3714 to provide RF Q output 3718 to combiner 2723. Combiner 3723 combines RF I output 3717 and RF Q output 3718 to provide RF output 3724. In accordance with at least one embodiment, LO 3719 can be operated at a low frequency to provide a baseband output at output 3724. As an example, the baseband output can be up-converted to RF at a subsequent stage.

FIG. 38 is a block diagram illustrating an array of intra-symbol multi-dimensional definitions comprising sub-dimensional definitions in accordance with at least one embodiment. Table 3800 comprises column 3801 and column 3802. Column 3801 shows a plurality of dimensions, numbered from 1 to n. Column 3802 shows a corresponding plurality of intra-symbol orthonormal dimensional definitions. Column 3802 includes heading 3803, which show-s the dimensional definitions of column 3802 can span a carrier cycle (e.g., from zero degrees to 360 degrees). Row 3804 corresponds, in both column 3801 and column 3802, to a first dimension. Row 3805 corresponds, in both column 3801 and column 3802, to a second dimension. Row 3806 corresponds, in both column 3801 and column 3802, to a third dimension. Row 3807 corresponds, in both column 3801 and column 3802, to a fourth dimension. Row 3808 corresponds, in both column 3801 and column 3802, to an nth dimension. Each of rows 3804-3808, being a dimensional definition itself, comprises a plurality of dimensional definitions, referred to as sub-dimensional definitions, as shown by columns 3811-3814. For example, in row 3804, a first dimension comprises defines distinct values at discrete positions within a carrier cycle for its respective sub-dimensions, illustrated as sub-dimensions $1_1$, $1_2$, $1_3$, through $1_n$ in columns 3811, 3812, 3813, and 3814, respectively. As another example, in row 3805, a second dimension comprises defines distinct values at discrete positions within a carrier cycle for its respective sub-dimensions, illustrated as sub-dimensions $2_1$, $2_2$, $2_3$, through $2_n$ in columns 3811, 3812, 3813, and 3814, respectively. As shown, each sub-dimensional definition can span a portion of a carrier cycle, allowing a plurality of sub-dimensional definitions to be communicated within a carrier cycle. Such an implementation can be referred to as sub-dimensional carrier-cycle-division-multiplexing. As another alternative, a plurality of sub-dimensional definitions need not each be limited to a portion of a carrier cycle. Rather, the multiplexing of the sub-dimensional definitions within a dimensional definition can occur with sub-dimensional definitions spanning one or more overlapping portions of the carrier cycle, up to each sub-dimensional definition spanning the entire carrier cycle.

Figure 39:
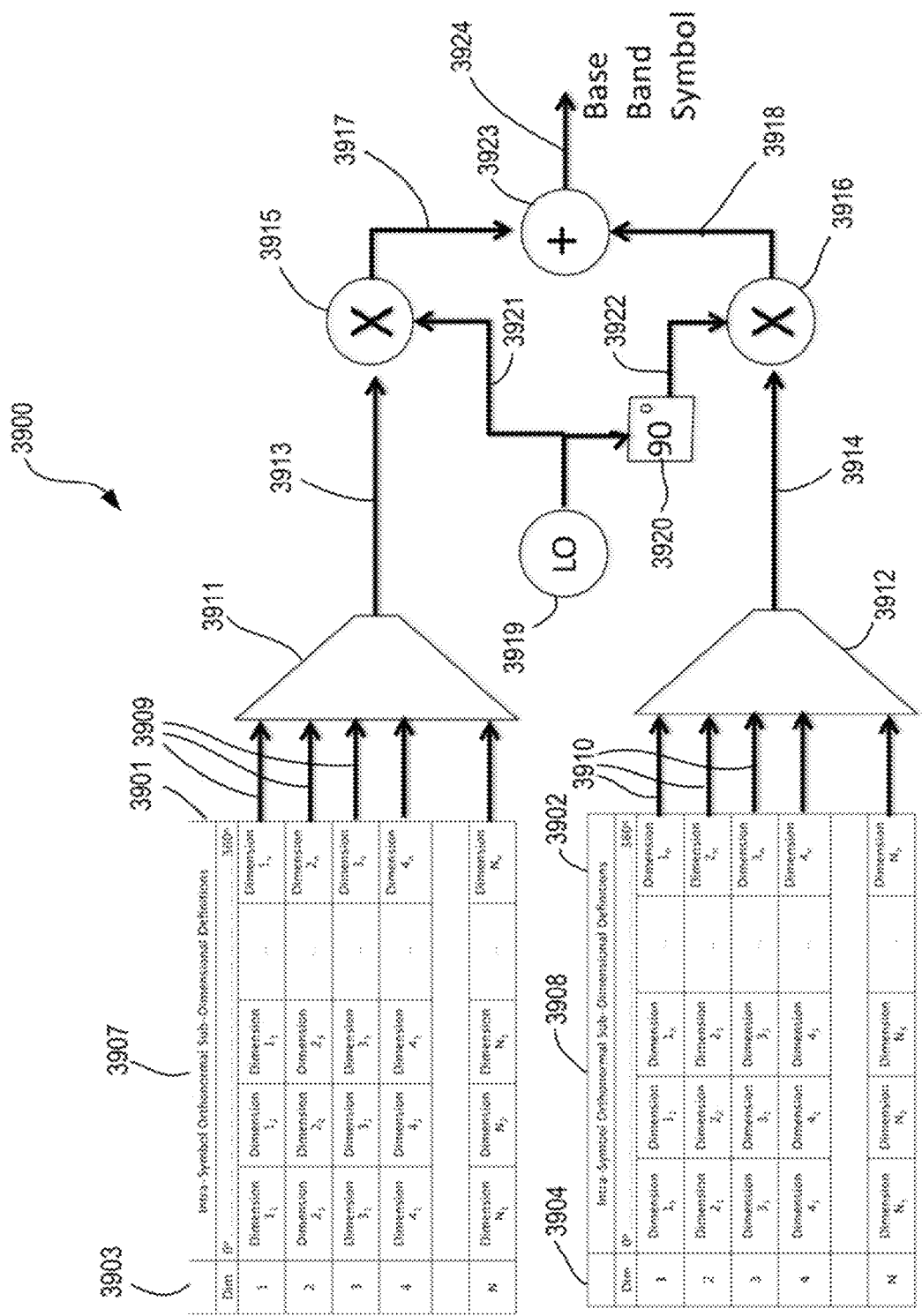
FIG. 39 is a block diagram illustrating art intra-symbol multi-dimensional modulator (ISMM) for providing a transmit signal in accordance with at least one embodiment.

FIG. 39 is a block diagram illustrating an intra-symbol multi-dimensional modulator (ISMM) for providing a transmit signal in accordance with at least one embodiment. ISMM 3900 comprises dimensional encoder 3901, dimensional encoder 3902, combiner 3911, combiner 3912, local oscillator 3919, quadrature phase shifter 3920, in-phase (I) mixer 3915, quadrature (Q) mixer 3916, and combiner 3923. Data bits to be transmitted are provided to dimensional encoders 3901 and 3902. Dimensional encoders 3901 and 3902 encode the data bits as distinct values at discrete positions for their respective dimensions, as shown by columns 3907 and 3908, over a carrier cycle for each respective dimension, as shown by columns 3903 and 3904. As an example, dimensional encoders may be implemented using a processor and lookup tables, for example, lookup tables having a tabular format, such as that of table 3800 of FIG. 38.

Dimensional encoder 3901 provides a plurality of modulated outputs 3909 in different dimensions to combiner 3911. Dimensional encoder 3902 provides a plurality of modulated outputs 3910 in different dimensions to combiner 3912. Combiner 3911 combines the plurality of modulated outputs 3909 to provide a combined modulated output 3913 to I mixer 3915. Combiner 3912 combines the plurality of modulated outputs 3909 to provide a combined modulated output 3914 to Q mixer 3916. Local oscillator (LO) 3919 provides a LO output 3921 to I mixer 3915 and to quadrature phase shifter 3920. I mixer 3915 mixes LO output 3921 with combined modulated output 3913 to provide radio frequency (RF) I output 3917 to combiner 3923. Quadrature phase shifter 3920 introduces a phase shift, for example, of 90 degrees, to provide a phase-shifted LO output 3922 to Q mixer 3916. Q mixer 3916 mixes phase-shifted LO output 3922 with combined modulated output 3914 to provide RF Q output 3918 to combiner 3923. Combiner 3923 combines RF I output 3917 and RF Q output 3918 to provide RF output 3924. In accordance with at least one embodiment, LO 3919 can be operated at a low frequency to provide a baseband output at output 3924. As an example, the baseband output can be up-converted to RF at a subsequent stage.

Figure 40:
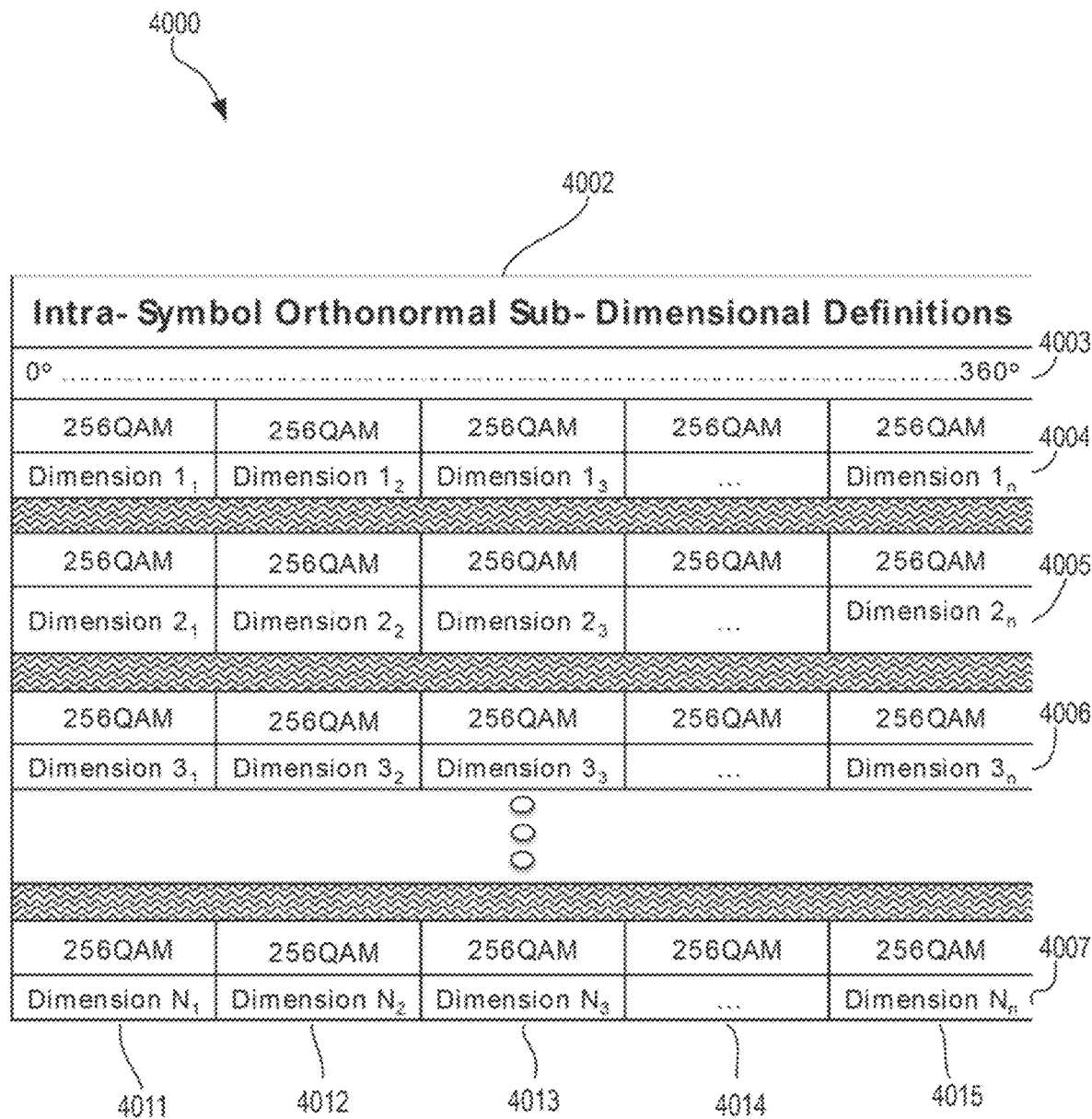
FIG. 40 is a block diagram illustrating an array of intra-symbol multi-dimensional definitions comprising sub-dimensional definitions in accordance with at least one embodiment.

FIG. 40 is a block diagram illustrating an array of intra-symbol multi-dimensional definitions comprising sub-dimensional definitions in accordance with at least one embodiment. Table 4000 comprises column 4002. Column 4002 shows a plurality of intra-symbol orthonormal dimensional definitions corresponding to a plurality of dimensions. Column 4002 includes heading 4003, which shows the dimensional definitions of column 4002 can span a carrier cycle (e.g., from zero degrees to 360 degrees). Row 4004 corresponds to a first dimension. Row 4005 corresponds to a second dimension. Row 4006 corresponds to a third dimension. Row 4007 corresponds to an nth dimension. Each of rows 4004-4007, showing a dimensional definition itself, comprises a plurality of dimensional definitions, referred to as sub-dimensional definitions, as shown by columns 4011-4015. For example, in row 4004, a first dimensional definition comprises defines distinct values at discrete positions within a carrier cycle for its respective sub-dimensions, illustrated as sub-dimensions $1_1$, $1_2$, $1_3$, through $1_n$ in columns 4011, 4012, 4013, and 4015, respectively, with column 4014 representing intervening sub-dimensional definitions for intervening sub-dimensions. As another example, in row 4005, a second dimension comprises defines distinct values at discrete positions within a carrier cycle for its respective sub-dimensions, illustrated as sub-dimensions $2_1$, $2_2$, $2_3$, through $2_n$ in columns 4011, 4012, 4013, and 4015, respectively. As shown, each sub-dimensional definition can span a portion of a carrier cycle, allowing a plurality of sub-dimensional definitions to be communicated within a carrier cycle. Such an implementation can be referred to as sub-dimensional carrier-cycle-division-multiplexing. As another alternative, a plurality of sub-dimensional definitions need not each be limited to a portion of a carrier cycle. Rather, the multiplexing of the sub-dimensional definitions within a dimensional definition can occur with sub-dimensional definitions spanning one or more overlapping portions of the carrier cycle, up to each sub-dimensional definition spanning the entire carrier cycle.

Figure 41:
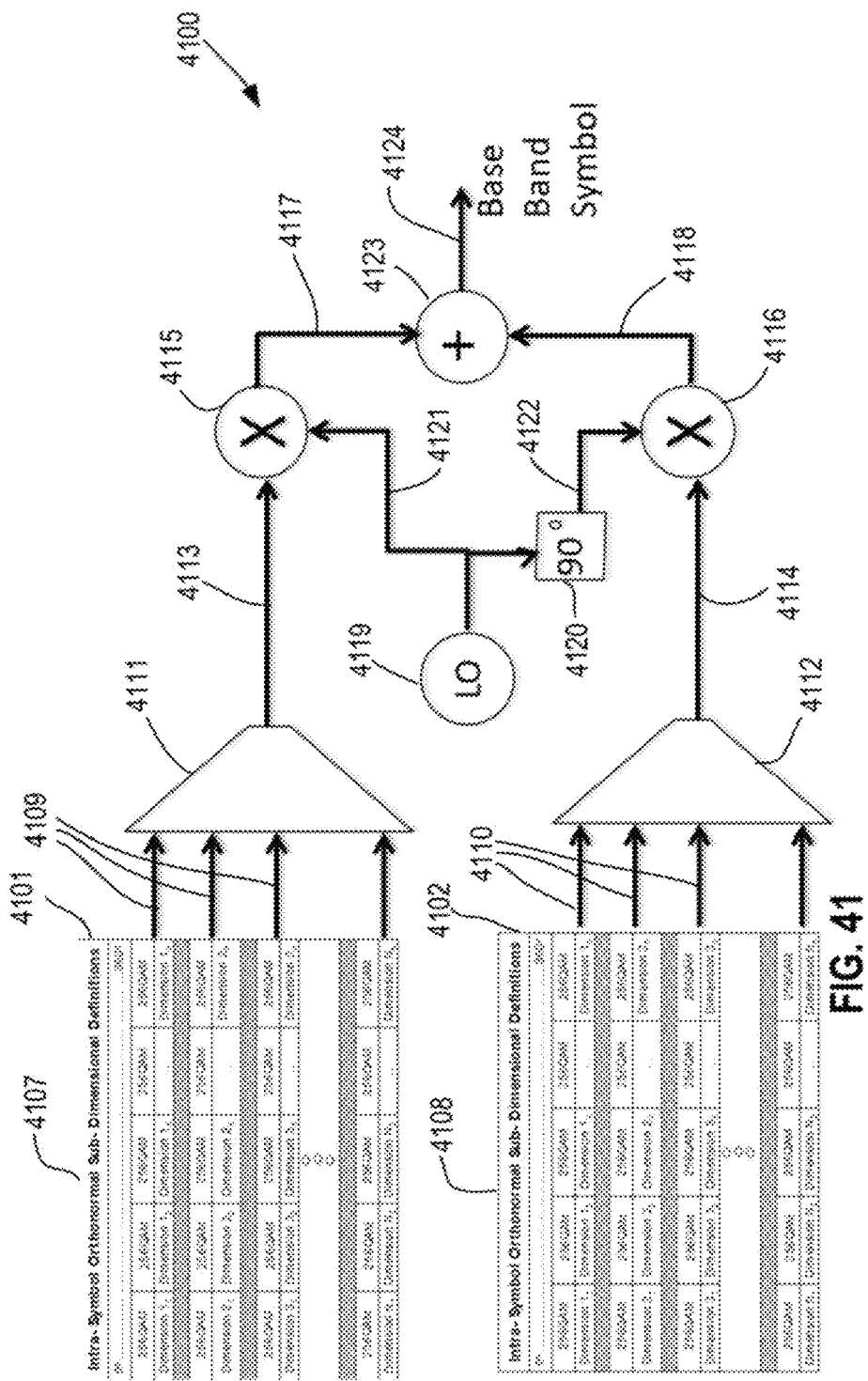
FIG. 41 is a block diagram illustrating an intra-symbol multi-dimensional modulator (ISMM) for providing a transmit signal in accordance with at least one embodiment.

FIG. 41 is a block diagram illustrating an intra-symbol multi-dimensional modulator (ISMM) for providing a transmit signal in accordance with at least one embodiment. ISMM 4100 comprises dimensional encoder 4101, dimensional encoder 4102, combiner 4111, combiner 4112, local oscillator 4119, quadrature phase shifter 4120, in-phase (I) mixer 4115, quadrature (Q) mixer 4116, and combiner 4123. Data bits to be transmitted are provided to dimensional encoders 4101 and 4102. Dimensional encoders 4101 and 4102 encode the data bits as distinct values at discrete positions for their respective dimensions, as shown by columns 4107 and 4108, where such encoding can comprise encoding according to sub-dimensional definitions within the dimensions. The sub-dimensional definitions may be modulated within a constellation of points, such as that provided using QAM, QPSK, PAM, etc., as illustrated by the example of 256 QAM. As an example, dimensional encoders may be implemented using a processor and lookup tables, for example, lookup tables having a tabular format, such as that of table 4000 of FIG. 40.

Dimensional encoder 4101 provides a plurality of modulated outputs 4109 in different dimensions to combiner 4111. Dimensional encoder 4102 provides a plurality of modulated outputs 4110 in different dimensions to combiner 4112. Combiner 4111 combines the plurality of modulated outputs 4109 to provide a combined modulated output 4113 to I mixer 4115. Combiner 4112 combines the plurality of modulated outputs 4109 to provide a combined modulated output 4114 to Q mixer 4116. Local oscillator (LO) 4119 provides a LO output 4121 to I mixer 4115 and to quadrature phase shifter 4120. I mixer 4115 mixes LO output 4121 with combined modulated output 4113 to provide radio frequency (RF) I output 4117 to combiner 4123. Quadrature phase shifter 4120 introduces a phase shift, for example, of 90 degrees, to provide a phase-shifted LO output 4122 to Q mixer 4116. Q mixer 4116 mixes phase-shifted LO output 4122 with combined modulated output 4114 to provide RF Q output 4118 to combiner 4123. Combiner 4123 combines RF I output 4117 and RF Q output 4118 to provide RF output 4124. In accordance with at least one embodiment, LO 4119 can be operated at a low frequency to provide a baseband output at output 4124. As an example, the baseband output can be up-convened to RF at a subsequent stage.

Figure 42:
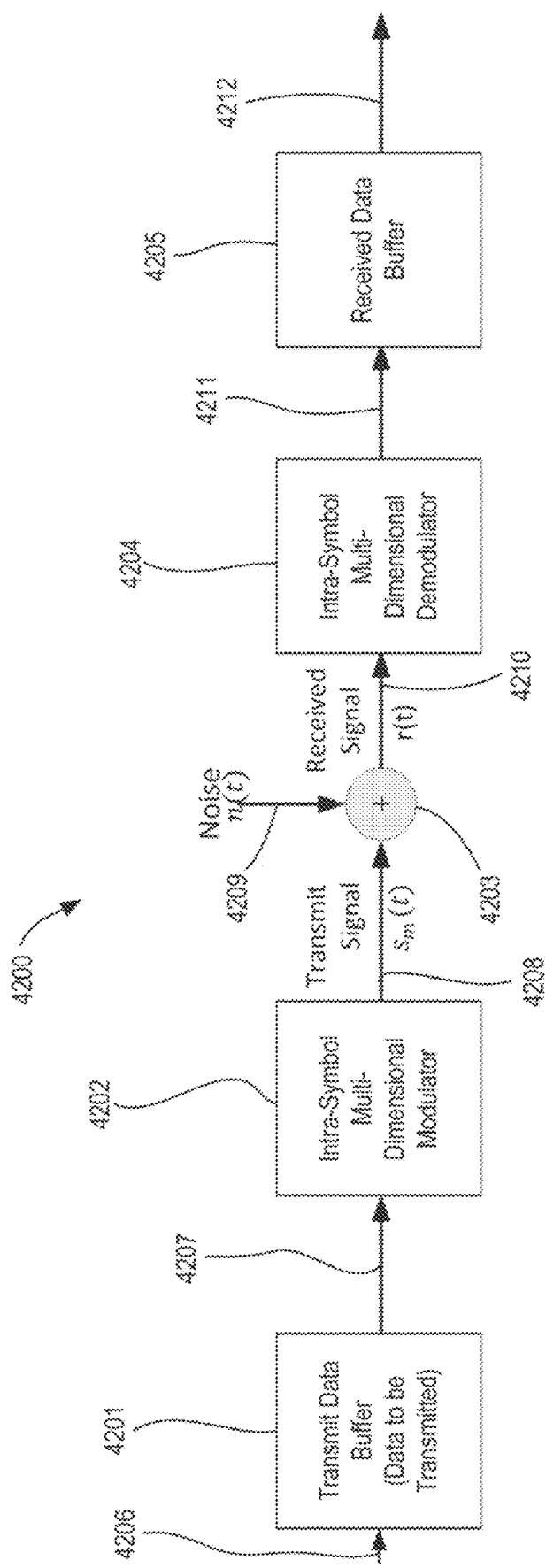
FIG. 42 is a block diagram illustrating an inter-symbol multi-dimensional modulation (ISMM) communication system in accordance with at least one embodiment.

FIG. 42 is a block diagram illustrating an inter-symbol multi-dimensional modulation (ISMM) communication system in accordance with at least one embodiment. ISMM communication system 4200 comprises transmit data buffer 4201, intra-symbol multi-dimensional modulator 4202, intra-symbol multi-dimensional demodulator 4204, and received data buffer 4205. Combiner 4203 is shown explicitly, but it should be understood that a received signal including a combination of a transmitted signal and noise can occur without combiner 4203 being explicitly implemented as a system component.

Input 4206 is coupled to transmit data buffer 4201 to provide transmit data (data to be transmitted) to transmit data buffer 4201. Transmit data buffer 4201 provides the transmit data to intra-symbol multi-dimensional modulator 4202 via interconnect 4207. Intra-symbol multi-dimensional modulator 4202 provides a transmit signal $s_m(t)$ at transmit signal output 4208 using intra-symbol multi-dimensional modulation (ISMM). The transmit signal may be affected by noise as it is transmitted over a communication medium, such as a portion of the electromagnetic spectrum, as illustrated by noise signal $n(t)$ at noise signal input 4209 to combiner 4203. Combiner 4203 denotes the combination of transmit signal $s_m(t)$ with noise signal $n(t)$ to yield received signal $r(t)$ at received signal input 4210 of intra-symbol multi-dimensional demodulator 4204. Intra-symbol multidimensional demodulator 4204 demodulates the received signal r(t) to provide a demodulated received signal to received data buffer 4205 via interconnect 4211. Received data buffer 4205 provides received data at received data output 4212.

Figure 43:
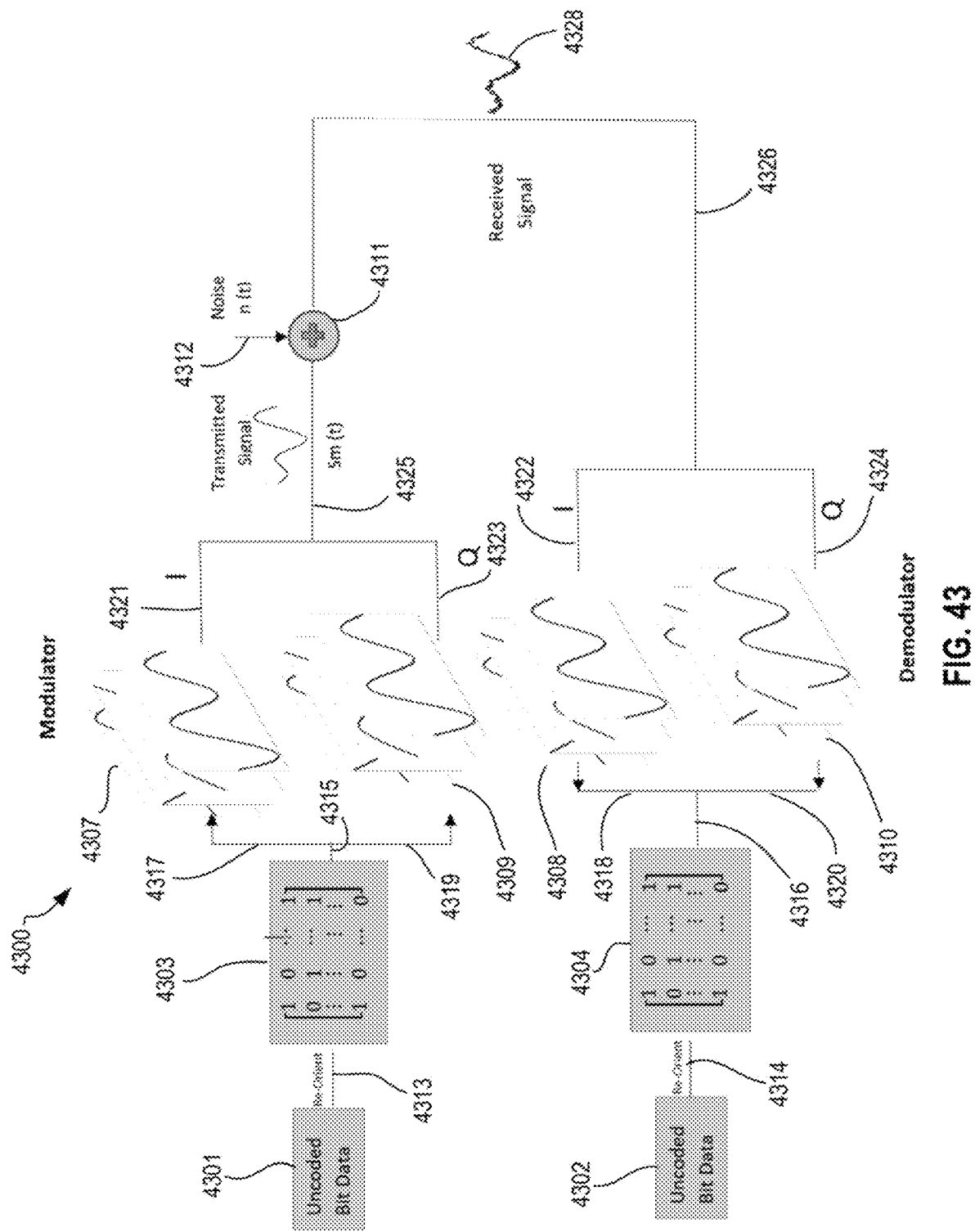
FIG. 43 is a block diagram illustrating an intra-symbol multi-dimensional modulation (ISMM) communication system with graphical depictions of exemplary ISMM waveforms in accordance with at least one embodiment.

FIG. 43 is a block diagram illustrating an intra-symbol multi-dimensional modulation (ISMM) communication system with graphical depictions of exemplary ISMM waveforms in accordance with at least one embodiment. ISMM communication system 4300 comprises transmit data buffer 4301, transmit data mapper 4303, intra-symbol multi-dimensional modulator 4307, intra-symbol multi-dimensional demodulator 4308, receive data de-mapper 4304, and received data buffer 4302. Un-coded bit data to be transmitted is provided to transmit data buffer 4301. Transmit data buffer 4301 provides the un-coded bit data to be transmitted via interconnect 4313 to transmit data mapper 4303, which maps the transmit data over a plurality of dimensions. Transmit data mapper 4303 provides the dimensionally mapped transmit data to intra-symbol multi-dimensional modulator 4307 via interconnect 4315. The dimensionally mapped transmit data is provided to an in-phase (I) portion of intra-symbol multi-dimensional modulator 4307 via interconnect 4317 mid to a quadrature (Q) portion of intra-symbol multi-dimensional modulator 4307 via interconnect 4319. The I portion of intra-symbol multi-dimensional modulator 4307 provides an intra-symbol multi-dimensionally modulated I output 4321 and an intra-symbol multi-dimensionally modulated Q output 4323. The intra-symbol multi-dimensionally modulated I output 4321 and the intra-symbol multi-dimensionally modulated Q output 4323 can be combined into a composite transmit signal $s_m(t)$ at transmit signal output 4325.

As the transmit signal is transmitted, the reception of that transmit signal may involve receiving the transmitted signal in the presence of noise, as denoted by noise n(t) at noise input 4312 being combined with transmit signal $s_m(t)$ at transmit signal output 4325 by combiner 4311 from the perspective of the receiver receiving received signal 4328 at received signal input 4326. From the received signal at received signal input 4326, intra-symbol multi-dimensional demodulator 4308 extracts an I signal at I signal input 4322 and a Q signal at Q signal input 4324. Intra-symbol multi-dimensional demodulator 4308 provides I received data at I received data output 4318 and Q received data at Q received data output 4320. I received data and Q received data can be combined to provide received data at intra-symbol multi-dimensional demodulator output 4316, which is coupled to an input of receive data de-mapper 4304. Receive data de-mapper performs an inverse mapping i.e., de-mapping) of a plurality of dimensions oaf received data to provide a data stream of received data, which it outputs to received data buffer 4302 via interconnect 4314.

Figure 44:
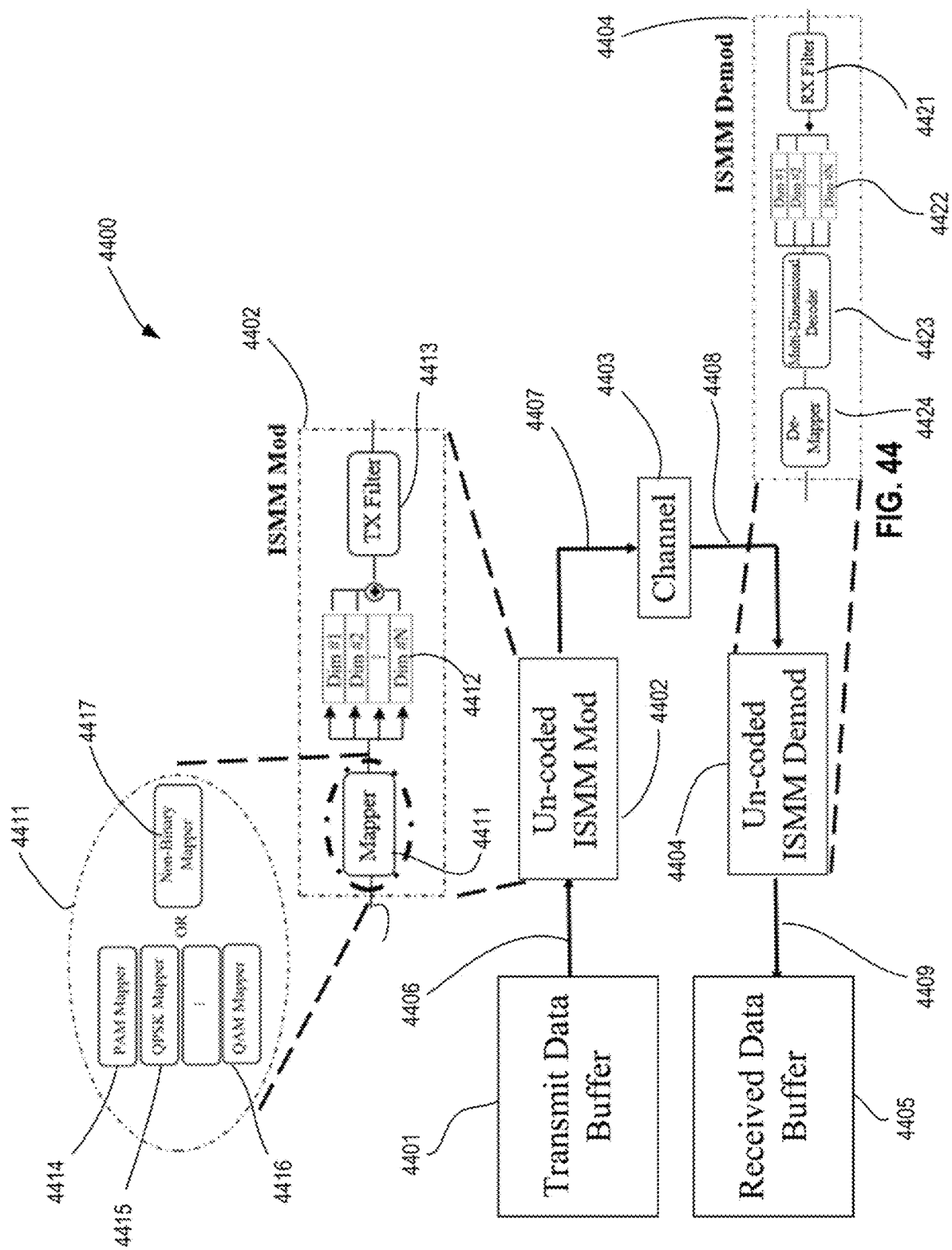
FIG. 44 is a block diagram illustrating an intra-symbol multi-dimensional modulation (ISMM) communication system in accordance with at least one embodiment.

FIG. 44 is a block diagram illustrating an intra-symbol multi-dimensional modulation (ISMM) communication system In accordance with at least one embodiment. ISMM communication system 4400 comprises transmit data buffer 4401, un-coded ISMM modulator 4402, communication channel 4403, un-coded ISMM demodulator 4404, and received data buffer 4405. Transmit data to be, transmitted is provided to transmit data buffet 4401. Transmit data buffer 4401 provides the transmit data to un-coded ISMM modulator 4402 via interconnect 4406. Un-coded ISMM modulator 4402 comprises transmit data mapper 4411, multi-dimensional modulator 4412, and transmit filter 4413. Transmit data mapper 4411 receives the transmit data from transmit data buffer 4401 and distributes (i.e., maps) the transmit data among a plurality of dimensions. As shown in the inset, transmit data mapper 4411 may be implemented as one or more of a pulse amplitude modulation (PAM) mapper 4414, a quadrature phase shift keying (QPSK) mapper 4415, a quadrature amplitude modulation (QAM) mapper 4416, rar a non-binary mapper 4417. The mapping of the transmit data to the plurality of dimensions is provided to multi-dimensional modulator 4412, which performs intra-symbol multi-dimensional modulation according a respective plurality of dimensional definitions for the plurality of dimensions. A combiner combines the dimensional definitions from multi-dimensional modulator 4412 to represent the transmit data so as to provide an unfiltered transmit signal to transmit (TX) filter 4413. Transmit filter 4413 filters the unfiltered transmit signal to obtain a filtered transmit signal. For example, the unfiltered transmit signal can be filtered to obtain a filtered transmit signal conforming to a desired characteristic in the frequency domain, such as a desired spectral emission mask. Un-coded ISMM modulator 4402 provides an intra-symbol multi-dimensionally modulated transmit signal to communication channel 4403 via ISMM transmit signal output 4407.

Un-coded ISMM demodulator 4404 receives the intra-symbol multi-dimensionally modulated transmit signal from communication channel 4403 via ISMM received signal input 4408. Un-coded ISMM demodulator comprises receive (RX) filter 4421, multi-dimensional demodulator 4422, multi-dimensional decoder 4423, and received signal de-mapper 4424. Receive filter 4421 receives the intra-symbol multi-dimensional modulated transmit signal from communication channel 4403, filters the signal to obtain a filtered received signal, and provides the filtered received signal to multi-dimensional demodulator 4422. Multi-dimensional demodulator 4422 demodulates the filtered receive signal into multi-dimensional coded representations, which are provided multi-dimensional decoder 4423. Multi-dimensional decoder 4423 decodes the multi-dimensional coded representations to obtain received data arranged according to a plurality of dimensions, which are provided to de-mapper 4424. De-mapper 4424 inversely maps (i.e., de-maps) the received data arranged according to the plurality of dimensions into a received data stream of the received data. De-mapper 4424 provides the received data stream of the received data to received data buffer 4405 via interconnect 4409. Received data buffer 4405 outputs the received data.

Figure 45:
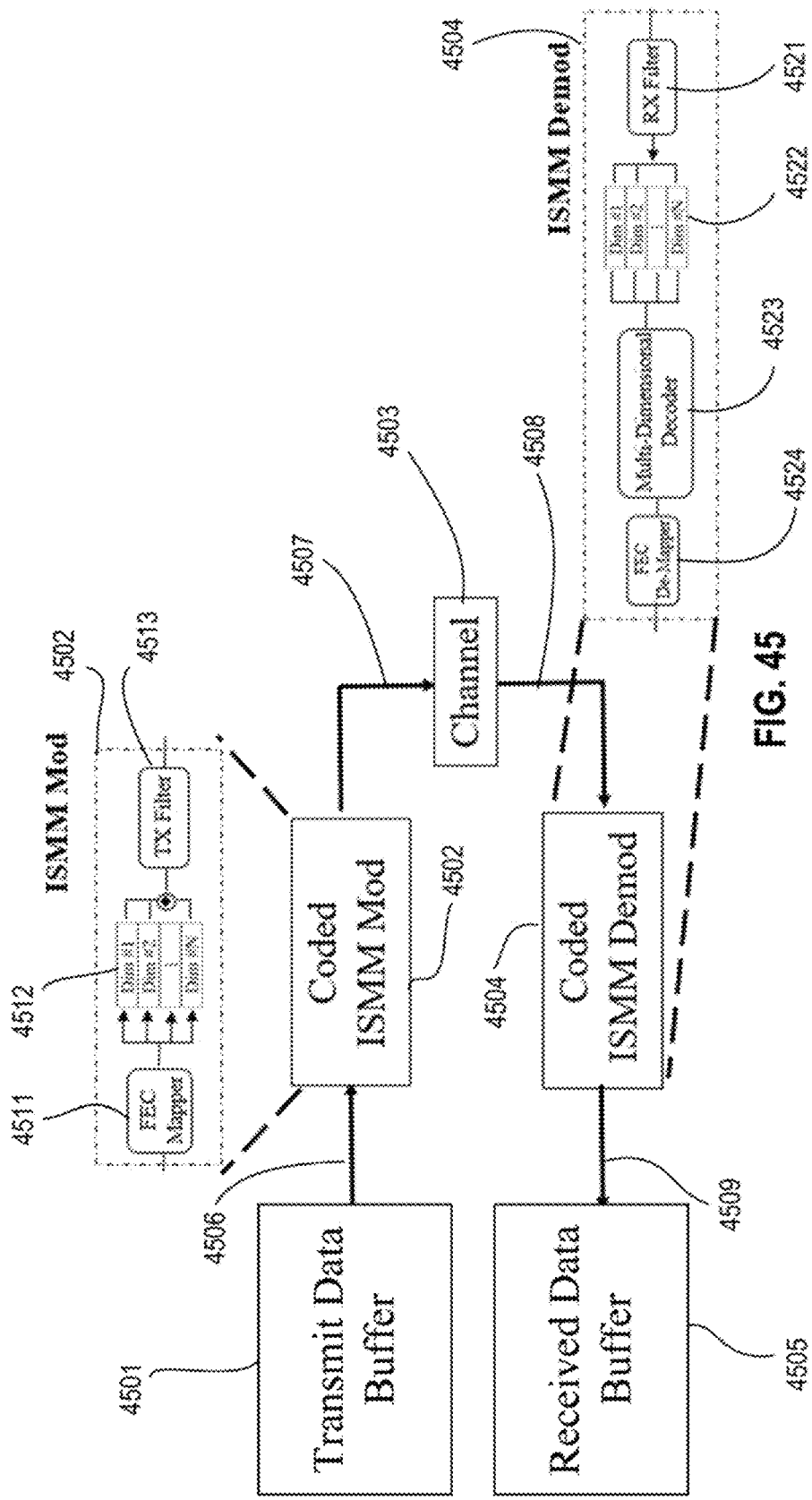
FIG. 45 is a block diagram illustrating an intra-symbol multi-dimensional modulation (ISMM) communication system in accordance with at least one embodiment.

FIG. 45 is a block diagram illustrating an intra-symbol multi-dimensional modulation (ISMM) communication system in accordance with at least one embodiment. ISMM communication system 4500 comprises transmit data buffer 4501, coded ISMM modulator 4502, communication channel 4503, coded ISMM demodulator 4504, and received data buffer 4505. Transmit data to be transmitted is provided to transmit data buffer 4501. Transmit data buffer 4501 provides the transmit data to coded ISMM modulator 4502 via interconnect 4506. Coded ISMM modulator 4502 comprises transmit data mapper 4511, multi-dimensional modulator 4512, and transmit filter 4513. Transmit data mapper 4511 can be implemented as a forward error correction (FEC) mapper to provide forward error correction for the data to be transmitted. Transmit data mapper 4511 receives the transmit data from transmit data buffet 4501 and distributes (i.e., maps) the transmit data among a plurality of dimensions. Transmit data mapper 4511 provides FEC information and distributes (i.e., maps) the FEC information among the plurality of dimensions. As an example, transmit data mapper 4511 can map the FEC information to one or more dimensions not used for the transmission of the claw to be transmitted. As another example, transmit data mapper 4511 can map the FEC information to one or more portions of a dimension in which another one or more portions into which data to be transmitted are mapped. The mapping of the transmit data to the plurality of dimensions is provided to multi-dimensional modulator 4512, which performs intra-symbol multi-dimensional modulation according a respective plurality of dimensional definitions for the plurality of dimensions. A combiner combines the dimensional definitions from multi-dimensional modulator 4512 to represent the transmit data so as to provide an unfiltered transmit signal to transmit (TX) filter 4513. Transmit filter 4513 filters the unfiltered transmit signal to obtain a filtered transmit signal. For example, the unfiltered transmit signal can be filtered to obtain a filtered transmit signal conforming to a desired characteristic in the frequency domain, such as a desired spectral emission mask. Coded ISMM modulator 4502 provides an intra-symbol multi-dimensionally modulated transmit signal to communication channel 4503 via. ISMM transmit signal output 4507.

Coded ISMM demodulator 4504 receives the intra-symbol multi-dimensionally modulated transmit signal from communication channel 4503 via ISMM received signal input 4508. Coded ISMM demodulator comprises receive (RX) filter 4521, multi-dimensional demodulator 4522, multi-dimensional decoder 4523, and received signal de-mapper 4524. Receive filter 4521 receives the intra-symbol multi-dimensional modulated transmit signal from communication channel 4503 filters the signal to obtain a filtered received signal, and provides the filtered received signal to multi-dimensional demodulator 4522. Multi-dimensional demodulator 4522 demodulates the filtered receive signal into mild-dimensional coded representations, which are provided multi-dimensional decoder 4523. Multi-dimensional decoder 4523 decodes the multi-dimensional coded representations to obtain received data arranged according to a plurality of dimensions, which are provided to de-mapper 4524. De-mapper 4524 can be implemented as a FEC de-mapper. The FEC de-mapper inversely maps (i.e., de-maps) the received data arranged according to the plurality of dimensions into a received data stream of the received data. In doing so it can perform FEC using the de-mapped FEC information so as to correct errors that may have occurred in the transmit data over the communication channel 4503. Thus, the received data obtained by the FEC de-mapper can be an accurate recovery of the transmit data. De-mapper 4524 provides the received data stream of the received data to received data buffer 4505 via interconnect 4509. Received data buffer 4505 outputs the received data.

Figure 46:
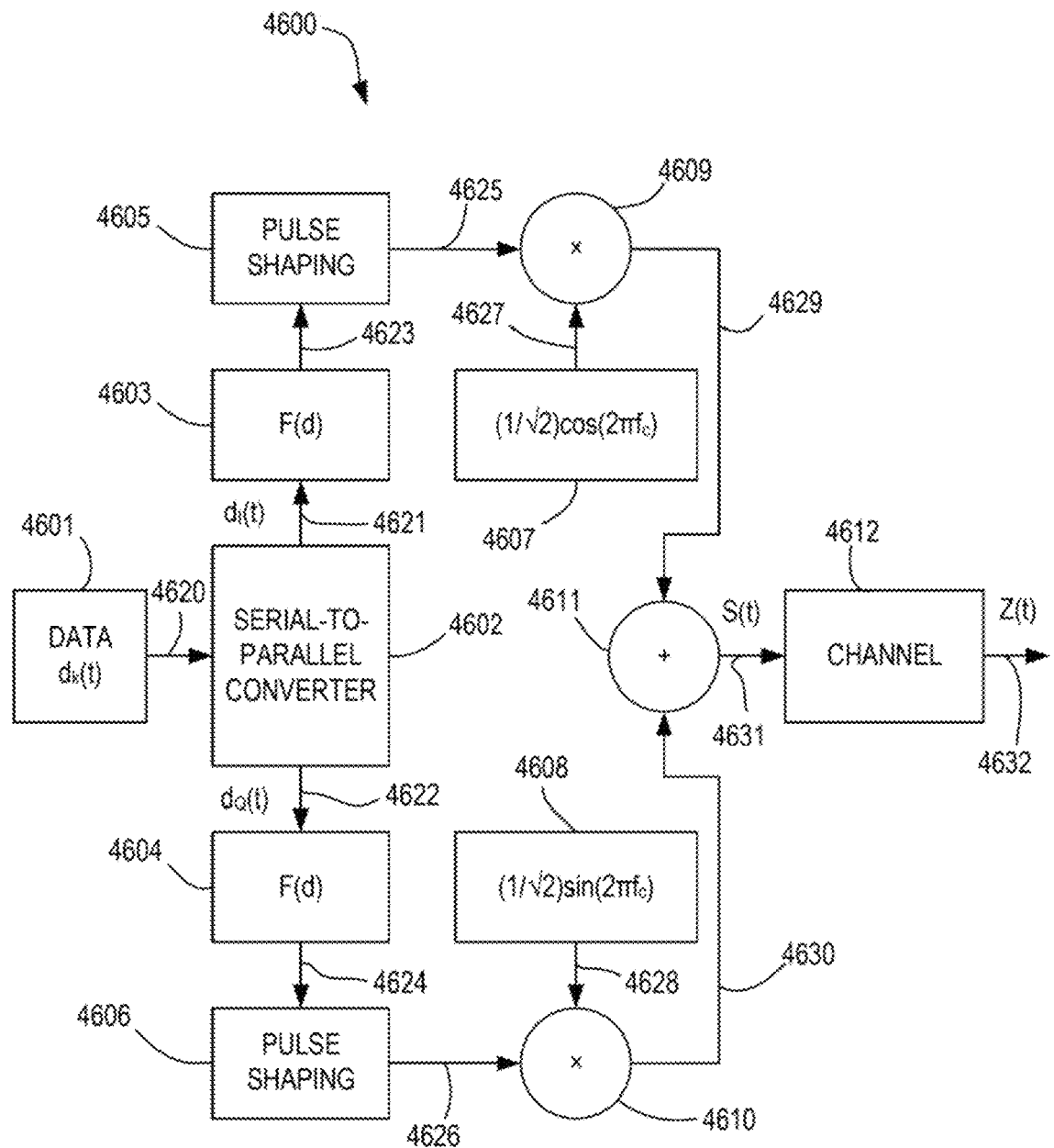
FIG. 46 is a signal-processing block diagram illustrating a transmitter for transmitting ISMM in accordance with at least one embodiment.

FIG. 46 is a signal-processing block diagram illustrating a transmitter for transmitting ISMM in accordance with at least one embodiment. As an example, for ISMM, the original bit stream $d_k(t)=d_0, d_1, d_2 \ldots$ is divided into an in-phase stream, $d_I(t)$, and a quadrature stream $d_Q(t)$. The data elements (e.g., bits) of the original data stream can be assigned to the in-phase stream, $d_I(t)$, and a quadrature stream, $d_Q(t)$ in alternation. The in-phase stream, $d_I(t)$, can, for example, include even data elements (e.g., bits) of the original bit stream $d_k(t)$, such that $d_I(t)=d_0, d_2, d_4 \ldots$. The quadrature stream, $d_Q(t)$, can, for example, include odd data elements (e.g., bits) of the original bit stream $d_k(t)$, such that $d_Q(t)=d_1, d_3, d_5 \ldots$. Thus, $d_I(t)$, $d_Q(t)$ can each have half the bit rate of $d_k(t)$. A unique mapping function is then defined for each stream. This mapping function is designed such that within a generated symbol there will be no interference among subfunctions. A high-level mapping function together with its low-level functions is then used to map the data, as shown by the high-level function F and its low-level functions denoted by F followed by a subscripted numeral, as follows: $F(d_I)=F_0(d_0)+F_1(d_2)+F_2(d_4)+ \ldots$ for the in-phase stream and $F(d_Q)=F_0(d_1)+F_1(d_3)+F_2(d_5)+ \ldots$ for the quadrature phase. A symbol is created from the in-phase stream and the quadrature stream as follows: $S(t)=(1/\sqrt{2}) \times F(d_I) \cdot \cos(2\pi f_c)+(t\ 1/\sqrt{2}) \times F(d_Q) \cdot \sin(2\pi f_c)$.

In FIG. 46, ISMM transmitter 4600 comprises data buffer 4601, serial-to-parallel converter 4602, in-phase data mapper 4603, in-phase pulse shaper 4605, in-phase LO output 4607, in-phase mixer 4609, quadrature data mapper 4604, quadrature pulse shaper 4606, quadrature LO output 4608, quadrature mixer 4610, and combiner 4611. Data buffer 4601 provides data stream dk(t) to serial input 4620 of serial-to-parallel converter 4602. Serial-to-parallel convener 4602 converts data stream dk(t) into parallel form, providing alternating bits to in-phase data mapper 4603 and quadrature data mapper 4604. For example, serial-to-parallel converter 4602 can provide the even bits of data stream $d_k(t)$ to in-phase data mapper input 4621 of in-phase data mapper 4603 as in-phase data stream $d_I(t)$ and the odd bits of data stream $d_k(t)$ to quadrature data mapper input 4622 of quadrature data mapper 4604 as quadrature data stream $d_I(t)$. In-phase data mapper 4603 assigns (i.e., maps) an in-phase symbol portion based on in-phase data stream $d_I(t)$ and outputs the in-phase symbol portion to in-phase pulse shaper input 4623 of in-phase pulse shaper 4605. Quadrature data mapper 4604 assigns (i.e., maps) a quadrature symbol portion based on quadrature data stream $d_Q(t)$ and outputs the quadrature symbol portion to quadrature pulse shaper input 4624 of quadrature pulse shaper 4606. In-phase pulse shaper 4605 provides a pulse-shaped in-phase symbol portion to an in-phase signal input 4625 of in-phase mixer 4609. Quadrature pulse shaper 4606 provides a pulse-shaped quadrature symbol portion to a quadrature signal input 4626 of quadrature mixer 4610. In-phase LO output 4607 of a LO provides an in-phase LO signal to an in-phase LO mixer input 4627 of in-phase mixer 4609. Quadrature LO output 4608 of the LO provides a quadrature LO signal to a quadrature LO mixer input 4628 of quadrature mixer 4610. In-phase mixer 4609 provides an in-phase transmit signal portion to in-phase combiner input 4629 of combiner 4611. Quadrature mixer 4610 provides a quadrature transmit signal portion to quadrature combiner input 4630 of combiner 4611. Combiner 4611 combines the in-phase transmit signal portion with the quadrature transmit signal portion to provide a transmit signal, S(t), to channel 4612 at transmit signal output 4631. As changes (e.g., noise) may occur to transmit signal S(t) as it passes through channel 4612, a receive signal, Z(t), is presented to a receiver at receiver input 4632.

Figure 47:
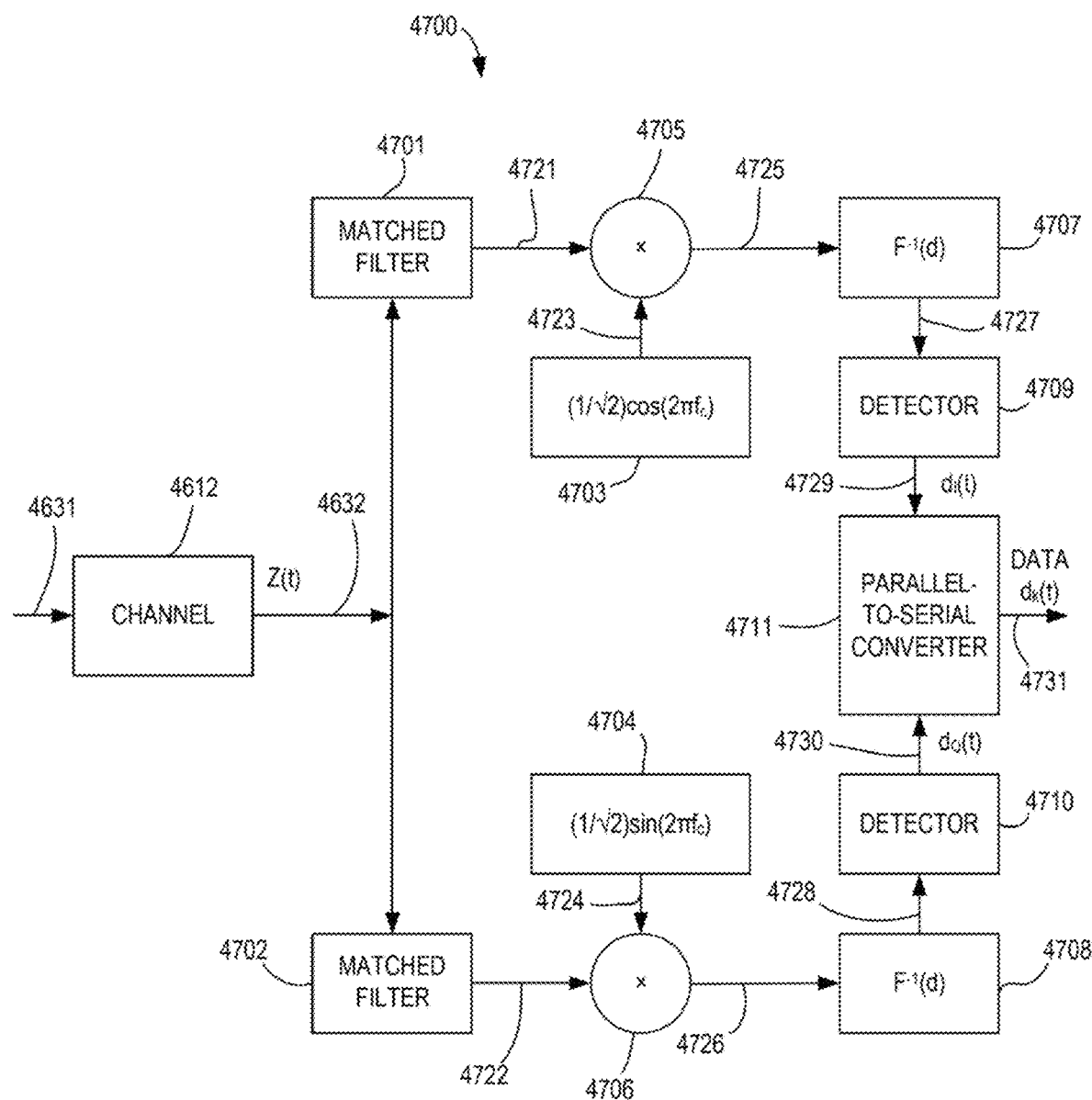
FIG. 47 is a signal-processing block diagram illustrating a receiver for receiving ISMM in accordance with at least one embodiment.

FIG. 47 is a signal-processing block diagram illustrating a receiver for receiving ISMM in accordance with at least one embodiment. In demodulation, the process described above with respect to FIG. 46 is reversed, generally speaking. First, an aggregate function is resolved, then each stream of the bit values can be recovered using an inverse of the mapping function used for that stream. For example, an in-phase receive signal portion can be obtained as follows: $F(d_I)=S_I(t) \times (1/\sqrt{2}) \times \cos(2\pi f_c)$, and a quadrature receive signal portion can be obtained as follows: $F(d_Q)=S_Q(t) \times (1/\sqrt{2}) \times \sin(2\pi f_c)$. The in-phase symbol portion can be recovered as follows: $F(d_I)=F_0(d_0)+F_1(d_2)+F_2(d_4)+ \ldots$, and the quadrature symbol portion can be recovered as follows: $F(d_Q)=F_0(d_1)+F_1(d_3)+F_2(d_5)+ \ldots$. The in-phase data stream can be recovered as follows: $d_I=F^{-1}(F(d_I))=F_0^{-1}(F(d_I))$, $F_1^{-1}(F(d_I))$, $F_2^{-1}(F(d_I)), \ldots = d_0, d_2, d_4$, and the quadrature data stream can be recovered as follows: $d_Q=F^{-1}(F(d_Q))=F_0^{-1}(F(d_Q))$, $F_1^{-1}(F(d_Q))$, $F_2^{-1}(F(d_Q))$, ... $=d_1, d_3, d_5$.

In FIG. 47, transmitter 4600 provides transmit signal S(t) to channel 4612 at transmit signal output 4631. As changes (e.g., noise) may occur to transmit signal S(t) as it passes through channel 4612, a receive signal, Z(t), is presented to receiver 4700 at receiver input 4632. Receiver 4700 comprises in-phase matched filter 4701, quadrature matched filter 4702, in-phase LO output 4703, in-phase mixer 4705, quadrature LO output 4704, quadrature mixer 4706, in-phase inverse data mapper 4707, quadrature inverse data mapper 4708, in-phase detector 4709, quadrature detector 4710, and parallel-to-serial converter 4711. Receive signal Z(t) is provided to an in-phase receive signal input of in-phase matched filter 4701 and to a quadrature receive signal input of quadrature matched filter 4702. In-phase matched filter 4701 is configured to match a transmitted symbol transmitted by transmitter 4600. When a matching symbol occurs, in-phase matched filter 4701 provides a filtered in-phase receive signal to a receive signal input of in-phase mixer 4705. Quadrature matched filter 4702 is configured to match a transmitted symbol transmitted by transmitter 4600. When a matching symbol occurs, quadrature matched filter 4702 provides a filtered quadrature receive signal to a receive signal input of quadrature mixer 4706. In-phase LO output 4703 of a LO is provided to in-phase LO signal input 4723 of in-phase mixer 4705, and quadrature LO output 4704 of the LO is provided to a quadrature LO signal input 4724 of quadrature mixer 4706. In-phase mixer 4705 provides an in-phase mixer output signal at in-phase inverse data mapper input 4725 of in-phase inverse data mapper 4707. Quadrature mixer 4706 provides a quadrature mixer output signal at quadrature inverse data mapper input 4726 of quadrature inverse data mapper 4708. In-phase inverse data mapper 4707 performs an inverse mapping of the mapping of in-phase data mapper 4603, and quadrature inverse data mapper 4708 performs an inverse mapping of the mapping of quadrature data mapper 4604. In-phase inverse data mapper 4707 provides a demapped in-phase receive signal to in-phase detector 4709 at in-phase detector input 4727. Quadrature inverse data mapper 4708 provides a demapped quadrature receive signal to quadrature detector 4710 at quadrature detector input 4728. In-phase detector 4709 recovers in-phase data stream $d_I(t)$ and provides it to parallel-to-serial convener 4711 via in-phase data stream input 4729. Quadrature detector 4710 recovers quadrature data stream $d_Q(t)$ and provides it to parallel-to-serial converter 4711 via quadrature data stream input 4730. Parallel-to-serial converter 4711 converts in-phase data stream $d_I(t)$ and quadrature data stream $d_Q(t)$ from parallel-to-serial form and merges them in proper sequence to recover the original bit stream which it provides at data stream output 4731.

In accordance with at least one embodiment, an apparatus comprises an intra-symbol multi-dimensional modulator (ISMM), the ISMM comprising a dimensional mapper configured to receive transmit data to provide a plurality of outputs for a plurality of different dimensions; a plurality of dimensional modulators coupled to the dimension mapper, the plurality of dimensional modulators configured to receive the plurality of outputs and to provide a plurality of modulated outputs for the plurality of different dimensions, the plurality of dimensional modulators configured to convey data distributed among a plurality of discrete locations within a symbol; a combiner configured coupled to the plurality of dimensional modulators, the combiner configured to receive the plurality of modulated outputs, to combine the plurality of plurality of modulated outputs, and to provide a transmit signal; and a transmit filter coupled to the ISMM, the transmit filter configured to receive the transmit signal and to provide a filtered transmit signal In accordance with at least one embodiment, the plurality of different dimensions is greater than two dimensions. In accordance with at least one embodiment, the dimensional mapper is a forward error correction (FEC) dimensional mapper, the FEC dimensional mapper configured to map the transmit data and FEC data among the plurality of outputs for the plurality of different dimensions. In accordance with at least one embodiment, the FEC dimensional mapper maps the transmit data to a first subset of the plurality of different dimensions and maps the FEC data to a second subset of the plurality of different dimensions. In accordance with at least one embodiment, the FEC dimensional mapper maps both at least a portion of the transmit data and at least a portion of the FEC data within a single dimension of the plurality of different dimensions. In accordance with at least one embodiment, the dimensional mapper is a non-binary mapper, in accordance with at least one embodiment, the dimensional mapper is selected from a group consisting of a pulse amplitude modulation (PAM) dimensional mapper, a quadrature phase shift keying (QPSK) dimensional mapper, and a quadrature amplitude modulation (QAM) dimensional mapper, in accordance with at least one embodiment, the plurality of discrete locations within a symbol is a plurality of discrete locations at least a portion thereof are within a single cycle of a carrier wave. As one example, the plurality of discrete locations may be defined within 360 degrees of a cycle the carrier wave. As another example, the plurality of discrete locations ma be defined within a portion of less than 360 degrees of a cycle of the carrier wave. As yet another example, the plurality of discrete locations may span beyond the 360 degrees of a cycle of the carrier wave. In accordance with at least one embodiment, at least two discrete locations occur within a single cycle of the carrier wave. In accordance with at least one embodiment, at least three discrete locations occur within a single cycle of the carrier wave.

In accordance with at least one embodiment, a method comprises performing intra-symbol multi-dimensional modulation (ISMM), wherein the performing the ISMM comprises dimensionally mapping transmit data to a plurality of outputs for a plurality of different dimensions; dimensionally modulating, at a plurality of dimensional modulators, the plurality of outputs over the plurality of different dimensions to provide a plurality of modulated outputs for the plurality of different dimensions, the dimensionally modulating performed to convey data distributed among a plurality of discrete locations within a symbol; combining the plurality of modulated outputs to provide a transmit signal; and filtering, at a transmit filter, the transmit signal to provide a filtered transmit signal. In accordance least one embodiment, the plurality of different dimensions is greater than two dimensions. In accordance with at least one embodiment, the dimensionally mapping is forward error correction (FEC) dimensionally mapping, wherein the FEC dimensionally maps the transmit data and FEC data among the plurality of outputs for the plurality of different dimensions. In accordance with at least one embodiment, the FEC dimensionally mapping maps the transmit data to a first subset of the plurality of different dimensions and maps the FEC data to a second subset of the plurality of different dimensions. In accordance with at least one embodiment, the FEC dimensionally mapping maps both at least a portion of the transmit data and at least a portion of the FEC data within a single dimension of the plurality of different dimensions. In accordance with at least one embodiment, the dimensionally mapping is a non-binary mapping, in accordance with at least one embodiment, the dimensionally mapping is selected from a group consisting of pulse amplitude modulation (PAM) dimensionally mapping, quadrature phase shift keying (QPSK) dimensionally mapping, and a quadrature amplitude modulation (QAM) dimensionally mapping.

In accordance with at least one embodiment communication system comprises a transmit data source configured to provide transmit data; an intra-symbol multi-dimensional modulator (ISMM), the ISMM comprising a dimensional mapper coupled to the transmit data source, the dimensional mapper configured to receive transmit data to provide a plurality of outputs for a plurality of different dimensions; a plurality of dimensional modulators coupled to the dimension mapper, the plurality of dimensional modulators configured to receive the plurality of outputs and to provide a plurality of modulated outputs for the plurality of different dimensions, the plurality of dimensional modulators configured to convey data distributed among a plurality of discrete locations within a symbol; a combiner configured coupled to the plurality of dimensional modulators, the combiner configured to receive the plurality of modulated outputs, to combine the plurality of plurality of modulated outputs, and to provide a transmit signal; a transmit filter coupled to the ISMM, the transmit filter configured to receive the transmit signal and to provide a filtered transmit signal; and a transmitter coupled to the transmit filter, the transmitter configured to transmit the filtered transmit signal. In accordance with at least one embodiment, the plurality of different dimensions is greater than two dimensions. In accordance with at least one embodiment, the dimensional mapper is a forward error correction (FEC) dimensional mapper, the FEC dimensional mapper configured to map the transmit data and FEC data among the plurality of outputs for the plurality of different dimensions. In accordance with at least one embodiment, the FEC dimensional mapper maps the transmit data to a first subset of the plurality of different dimensions and maps the FEC data to a second subset of the plurality of different dimensions. In accordance with at least one embodiment, the FEC dimensional mapper maps both at least a portion of the transmit data and at least a portion of the FEC data within a single dimension of the plurality of different dimensions In accordance with at least one embodiment, the dimensional mapper is selected from a group consisting of a non-binary mapper, a pulse amplitude modulation (PAM) dimensional mapper, a quadrature phase shift keying (QPSK) dimensional mapper, and a quadrature amplitude modulation (QAM) dimensional mapper.

Various alternative embodiments may include a use case for a satellite data modem, down-hole sensor communication for the oil/gas industry, cellular client and infrastructure communication, telephone and xDSL and a multitude of wireless and cable communication.

Similarly, while the present invention has been described herein as a signal modulation apparatus and means for data communication. The present invention may be readily used with arty number of communication systems or other similar devices now known or hereafter developed. For example, embodiments of the present invention may be used as a replacement for a SCADA modem (e.g., providing higher throughput and greater noise immunity than current modem systems), or as a replacement for the physical layer in IEEE 802 Ethernet systems (e.g., transmitting control and payload data in parallel, as described herein).

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In accordance with at least one embodiment, any elements, modules, components, devices, and the like described herein may be implemented using circuits, such as discrete or integrated circuits, consistent with electrical engineering practices.

The concepts of the present disclosure have been described above with reference to specific embodiments. However, one of ordinary skill in the art will appreciate that various modifications and changes can be made without departing from the scope of the present disclosure as set forth in the claims below. In particular, encoding and modulation relationships that allow transmission via a plurality of dimensions and recovery of the transmitted data from such transmission may be established according to a variety of relationships, such as using a Gram-Schmidt process, Legendre polynomials, Householder transformations, Givens rotations, Cholesky decomposition, another orthonormal function, combinations thereof, or the like. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to, problems, and any feature(s) that may cause any benefit, advantage, or solution to occur or become more pronounced are not to be construed as a critical, required, or essential feature of any or all the claims.

What is claimed is:

1. Apparatus comprising:
    an intra-symbol multi-dimensional modulator (ISMM), the ISMM comprising:
        a dimensional mapper configured to receive transmit data to provide a plurality of outputs for a plurality of different dimensions, wherein the plurality of different dimensions is greater than two dimensions;
        a plurality of dimensional modulators coupled to the dimension mapper, the plurality of dimensional modulators configured to receive the plurality of outputs and to provide a plurality of modulated outputs for the plurality of different dimensions, the plurality of dimensional modulators configured to convey data distributed among a plurality of discrete locations within a symbol, wherein the plurality of dimensional modulators employ dimensional definitions comprising amplitude changes from a nominal amplitude, wherein the amplitude changes are present at distinct locations along a carrier cycle of a carrier wave;
a combiner configured coupled to the plurality of dimensional modulators, the combiner configured to receive the plurality of modulated outputs, to combine the plurality of plurality of modulated outputs, and to provide a transmit signal; and
a transmit filter coupled to the ISMM, the transmit filter configured to receive the transmit signal and to provide a filtered transmit signal.

2. The apparatus of claim 1 wherein the dimensional mapper is a forward error correction (FEC) dimensional mapper, the FEC dimensional mapper configured to map the transmit data and FEC data among the plurality of outputs for the plurality of different dimensions.

3. The apparatus of claim 2 wherein the FEC dimensional mapper maps the transmit data to a first subset of the plurality of different dimensions and maps the FEC data to a second subset of the plurality of different dimensions.

4. The apparatus of claim 2 wherein the FEC dimensional mapper maps both at least a portion of the transmit data and at least a portion of the FEC data within a single dimension of the plurality of different dimensions.

5. The apparatus of claim 1 wherein the dimensional mapper is a non-binary mapper.

6. The apparatus of claim 1 wherein the dimensional mapper is selected from a group consisting of a pulse amplitude modulation (PAM) dimensional mapper, a quadrature phase shift keying (QPSK) dimensional mapper, and a quadrature amplitude modulation (QAM) dimensional mapper.

7. A method comprising:
performing intra-symbol multi-dimensional modulation (ISMM), wherein the performing the ISMM comprises:
dimensionally mapping transmit data to a plurality of outputs for a plurality of different dimensions, wherein the plurality of different dimensions is greater than two dimensions;
dimensionally modulating, at a plurality of dimensional modulators, the plurality of outputs over the plurality of different dimensions to provide a plurality of modulated outputs for the plurality of different dimensions, the dimensionally modulating performed to convey data distributed among a plurality of discrete locations within a symbol, wherein the plurality of dimensional modulators employ dimensional definitions comprising amplitude changes from a nominal amplitude, wherein the amplitude changes are present at distinct locations along a carrier cycle of a carrier wave;
combining the plurality of modulated outputs to provide a transmit signal; and
filtering, at a transmit filter, the transmit signal to provide a filtered transmit signal.

8. The method of claim 7 wherein the dimensionally mapping is forward error correction (FEC) dimensionally mapping, wherein the FEC dimensionally maps the transmit data and FEC data among the plurality of outputs for the plurality of different dimensions.

9. The method of claim 7 wherein the FEC dimensionally mapping maps the transmit data to a first subset of the plurality of different dimensions and maps the FEC data to a second subset of the plurality of different dimensions.

10. The method of claim 7 wherein the FEC dimensionally mapping maps both at least a portion of the transmit data and at least a portion of the FEC data within a single dimension of the plurality of different dimensions.

11. The method of claim 7 wherein the dimensionally mapping is a non-binary mapping.

12. The method of claim 7 wherein the dimensionally mapping is selected from a group consisting of pulse amplitude modulation (PAM) dimensionally mapping, quadrature phase shift keying (QPSK) dimensionally mapping, and a quadrature amplitude modulation (QAM) dimensionally mapping.

13. A communication system comprising:
a transmit data source configured to provide transmit data;
an intra-symbol multi-dimensional modulator (ISMM), the ISMM comprising:
a dimensional mapper coupled to the transmit data source, the dimensional mapper configured to receive transmit data to provide a plurality of outputs for a plurality of different dimensions, wherein the plurality of different dimensions is greater than two dimensions;
a plurality of dimensional modulators coupled to the dimension mapper, the plurality of dimensional modulators configured to receive the plurality of outputs and to provide a plurality of modulated outputs for the plurality of different dimensions, the plurality of dimensional modulators configured to convey data distributed among a plurality of discrete locations within a symbol, wherein the plurality of dimensional modulators employ dimensional definitions comprising amplitude changes from a nominal amplitude, wherein the amplitude changes are present at distinct locations along a carrier cycle of a carrier wave;
a combiner configured coupled to the plurality of dimensional modulators, the combiner configured to receive the plurality of modulated outputs, to combine the plurality of plurality of modulated outputs, and to provide a transmit signal;
a transmit filter coupled to the ISMM, the transmit filter configured to receive the transmit signal and to provide a filtered transmit signal; and
a transmitter coupled to the transmit filter, the transmitter configured to transmit the filtered transmit signal.

14. The communication system of claim 13 wherein the dimensional mapper is a forward error correction (FEC) dimensional mapper, the FEC dimensional mapper configured to map the transmit data and FEC data among the plurality of outputs for the plurality of different dimensions.

15. The communication system of claim 13 wherein the FEC dimensional mapper maps the transmit data to a first subset of the plurality of different dimensions and maps the FEC data to a second subset of the plurality of different dimensions.

16. The communication system of claim 13 wherein the FEC dimensional mapper maps both at least a portion of the transmit data and at least a portion of the FEC data within a single dimension of the plurality of different dimensions.

17. The communication system of claim 13 wherein the dimensional mapper is selected from a group consisting of a non-binary mapper, a pulse amplitude modulation (PAM) dimensional mapper, a quadrature phase shift keying (QPSK) dimensional mapper, and a quadrature amplitude modulation (QAM) dimensional mapper.

* * * * *